US012659443B2

(12) United States Patent (10) Patent No.: US 12,659,443 B2

Valli et al. (45) Date of Patent: Jun. 16, 2026

(54) VIEWPOINT SYNTHESIS WITH ENHANCED 3D PERCEPTION

(71) Applicant: Adeia Guides Inc., San Jose, CA (US)

(72) Inventors: Seppo Valli, Espoo (FI); Pekka Siltanen, Helsinki (FI)

(73) Assignee: Adeia Guides Inc., San Jose, CA (US)

( * ) Notice: Subject to any disclaimer, the term of this patent is extended or adjusted under 35 U.S.C. 154(b) by 225 days.

(21) Appl. No.: 18/214,265

(22) Filed: Jun. 26, 2023

(65) Prior Publication Data

US 2024/0430394 A1 Dec. 26, 2024

(51) Int. Cl.
| | |
|---|---|
| *H04N 13/117* | (2018.01) |
| *G06T 5/77* | (2024.01) |
| *G06T 7/194* | (2017.01) |
| *G06T 7/20* | (2017.01) |
| *G06T 7/40* | (2017.01) |
| *G06T 7/50* | (2017.01) |
| *G06T 15/04* | (2011.01) |

(52) U.S. Cl.
CPC .............. *H04N 13/117* (2018.05); *G06T 5/77* (2024.01); *G06T 7/194* (2017.01); *G06T 7/20* (2013.01); *G06T 7/40* (2013.01); *G06T 7/50* (2017.01); *G06T 15/04* (2013.01)

(58) Field of Classification Search
CPC ......... H04N 13/117; G06T 5/77; G06T 7/194; G06T 7/20; G06T 7/40; G06T 7/50; G06T 15/04; G06T 2207/10024; G06T 2207/10028; G06T 5/50; G06T 15/205
USPC ........................................................ 382/154
See application file for complete search history.

(56) References Cited

U.S. PATENT DOCUMENTS

| | | | |
|---|---|---|---|
| 10,330,936 B2 | 6/2019 | Fix et al. | |
| 11,184,599 B2 | 11/2021 | Harviainen et al. | |
| 11,543,655 B1 * | 1/2023 | Weber ................ | G02B 27/0075 |

(Continued)

FOREIGN PATENT DOCUMENTS

WO        2019183211 A1      9/2019

OTHER PUBLICATIONS

Zitnick, C.L., Kang, S.B., Uyttendaele, M., Winder, S. and Szeliski, R., 2004. High-quality video view interpolation using a layered representation. ACM transactions on graphics (TOG), 23(3), pp. 600-608. (Year: 2004).*

(Continued)

*Primary Examiner* — Chineyere Wills-Burns
*Assistant Examiner* — Emmanuel Silva-Avina
(74) *Attorney, Agent, or Firm* — HG LAW LLP

(57) ABSTRACT

Systems and methods relate to segmenting object(s) of the first image data from a first viewpoint; generating respective segment texture data and segment depth data for each segmented object; arranging the segmented object(s) into a configuration based on the second viewpoint; compiling depth data corresponding to each pixel location in the configuration based on the second viewpoint; forming a synthesized depth map based at least in part on a closest depth value for each overlapping depth value at each pixel location of the compiled depth data; forming a synthesized texture map based on correspondence between segment depth data and respective segment texture data; and generating multiple focal planes (MFPs) based on the synthesized texture map and the synthesized depth map to enable generating for display second image data based on the MFPs.

20 Claims, 29 Drawing Sheets

(56) References Cited

U.S. PATENT DOCUMENTS

| | | |
|---|---|---|
| 12,267,477 B2 | 4/2025 | Valli et al. |
| 2017/0188002 A1* | 6/2017 | Chan .................... H04N 13/122 |
| 2018/0270464 A1* | 9/2018 | Harviainen .......... H04N 13/344 |
| 2021/0133994 A1* | 5/2021 | Valli .................... G02B 27/017 |
| 2024/0080431 A1* | 3/2024 | Van Geest ................ G06T 7/50 |

OTHER PUBLICATIONS

Lee, C. and Ho, Y.S., Oct. 2009, View synthesis using depth map for 3D video. In Proceedings of 2009 APSIPA Annual Summit and conference, Sapporo, Japan (pp. 350-357). (Year: 2009).*
Akeley, Kurt , et al., "A Stereo Display Prototype with Multiple Focal Distances", ACM Trans. Graph. 23, 3, 804-813, 2004.
Schmeing, Michael , et al., "Faithful Spatio-Temporal Disocclusion Filling using Local Optimization", 21st International Conference on Pattern Recognition (ICPR 2012), 2012.
Matsuda, N., et.al., "Focal Surface Displays," ACM Transactions on Graphics, 36(4), 86:1-86:14, 2017.
Youtube, "EI 2020 Plenary: Quality Screen Time: Leveraging Computational Displays for Spatial Computing," https://www.youtube.com/watch?v=LQwMAI9bGNY, 2020.
Shade, J., et al., "Layered Depth Images," https://dl.acm.org/doi/pdf/10.1145/280814.280882, 1998.
U.S. Appl. No. 18/214,272, filed Jun. 26, 2023, Seppo Valli.

* cited by examiner

400

420

410

Foreground Object is
Occluding the Background

Foreground Object is
Disoccluding the Background

Pixel Luminances add up
After an Object is Moved

600
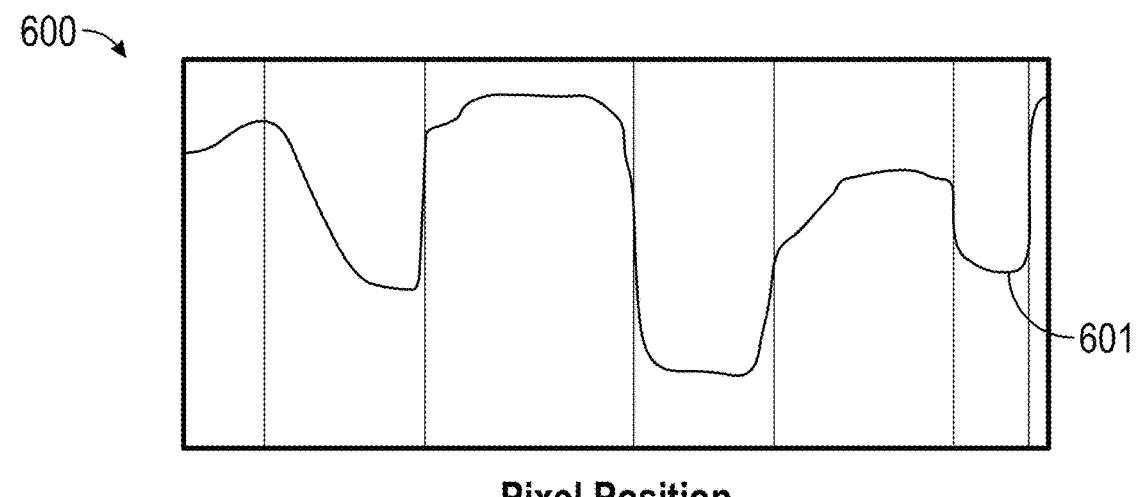
601
Pixel Position
610
601
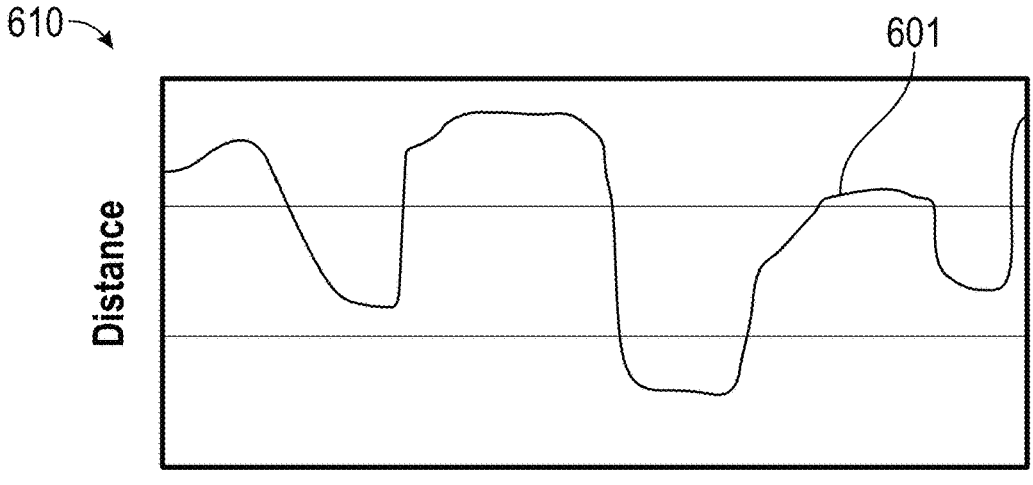
Distance
Pixel Position
620
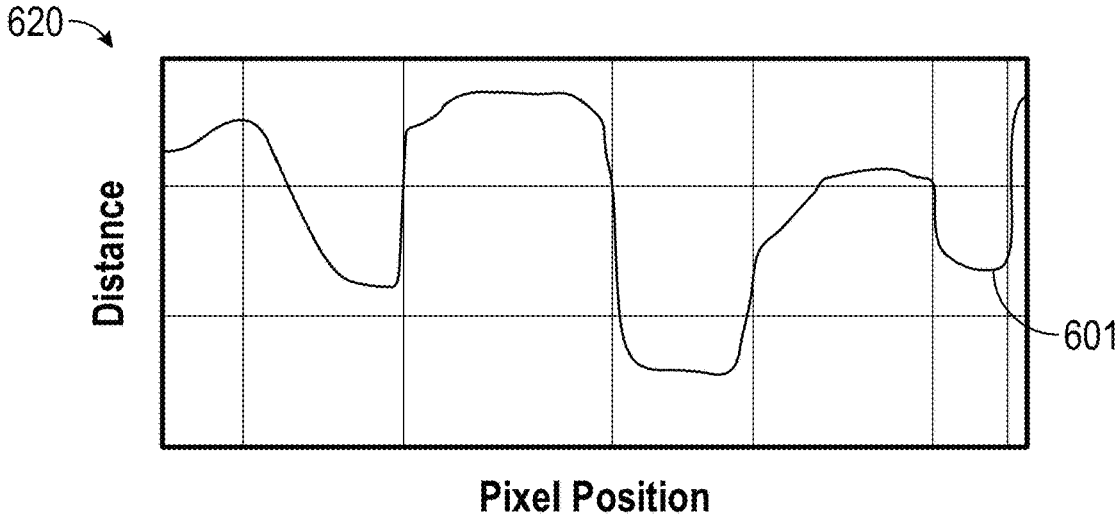
Distance
601
Pixel Position
FIG. 6

1110

1120

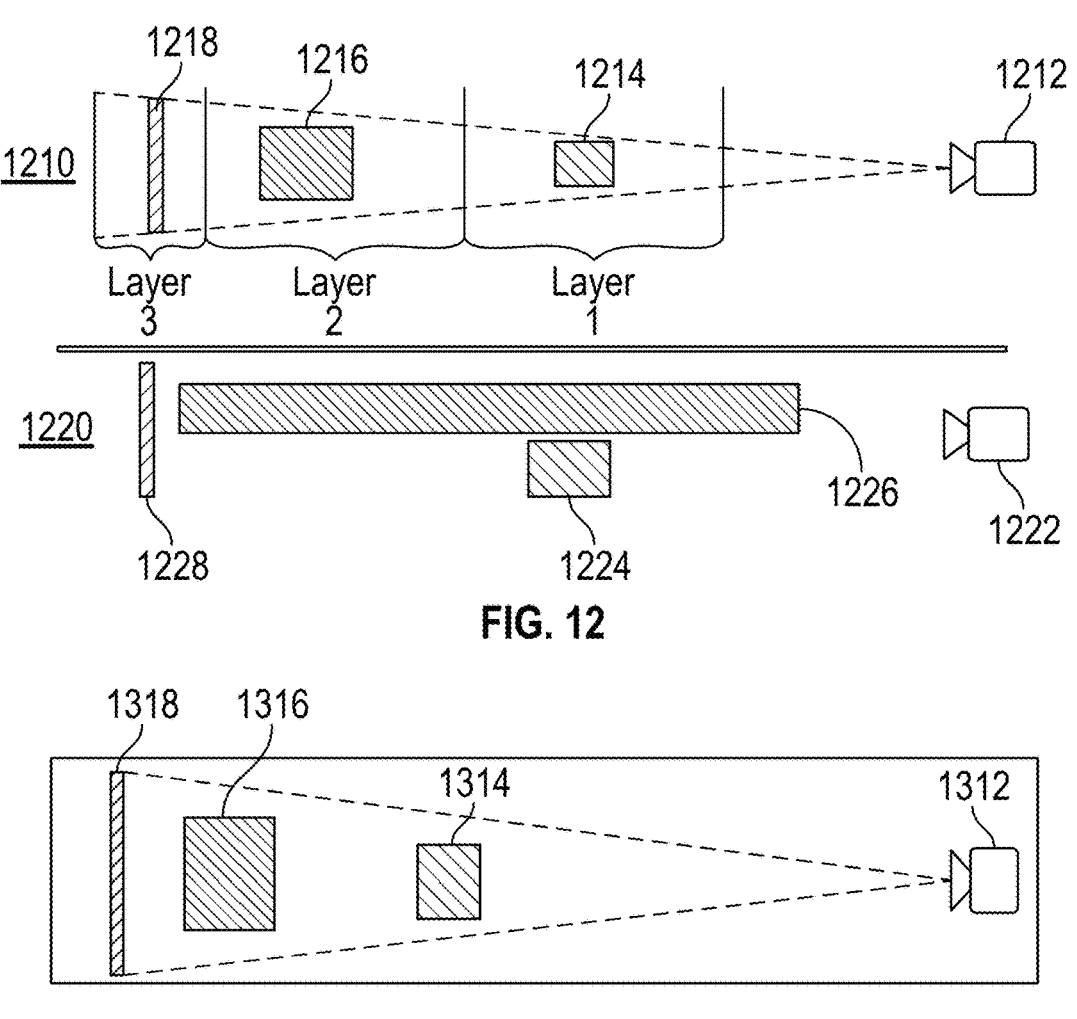
FIG. 12
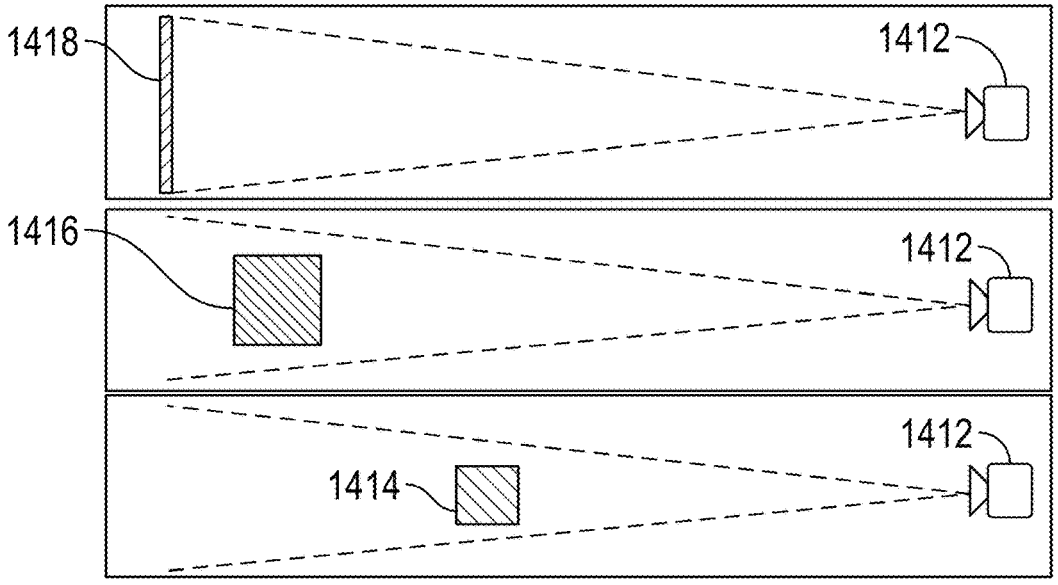
FIG. 13
FIG. 14

Hole

Second Layer

Hole

2510

2520

Inpainting

Inpainting 2611 2612 2621

2613 2614

2610 2620

User Input Interface

Display

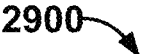
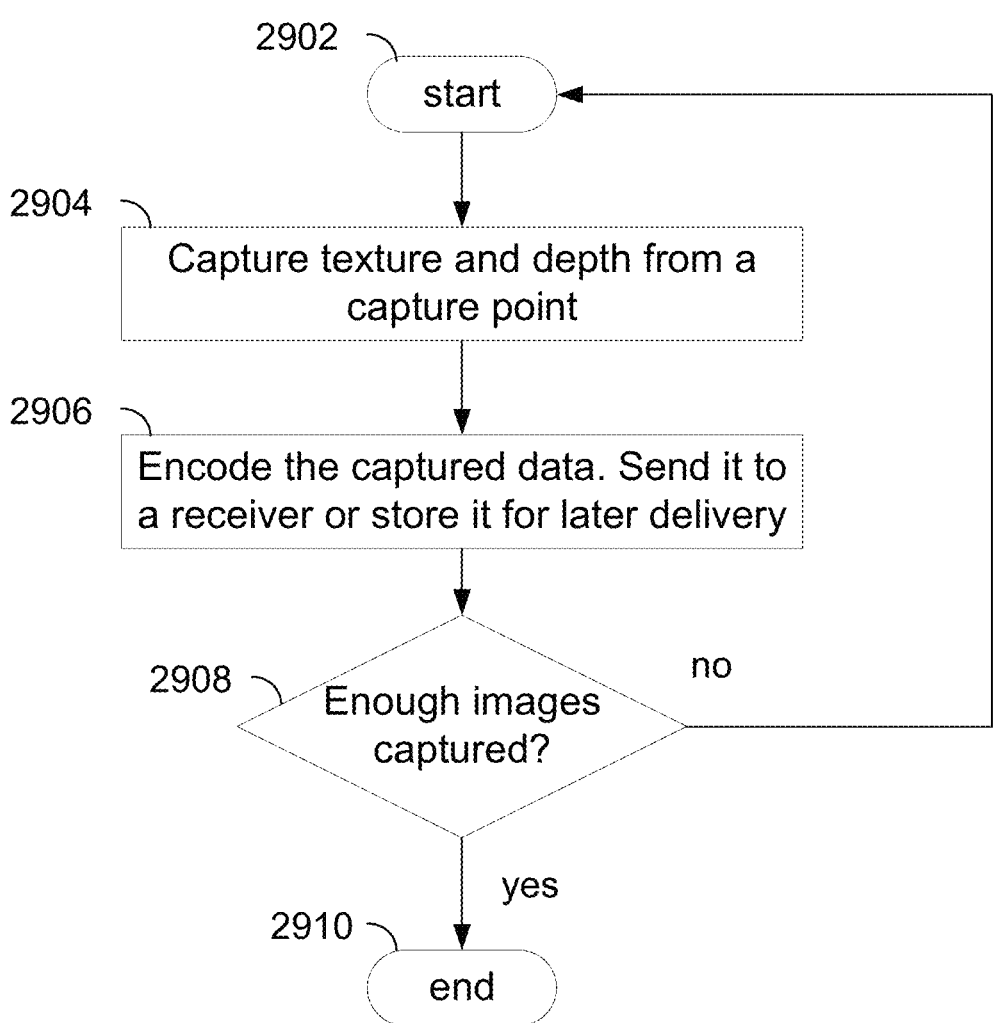
FIG. 29

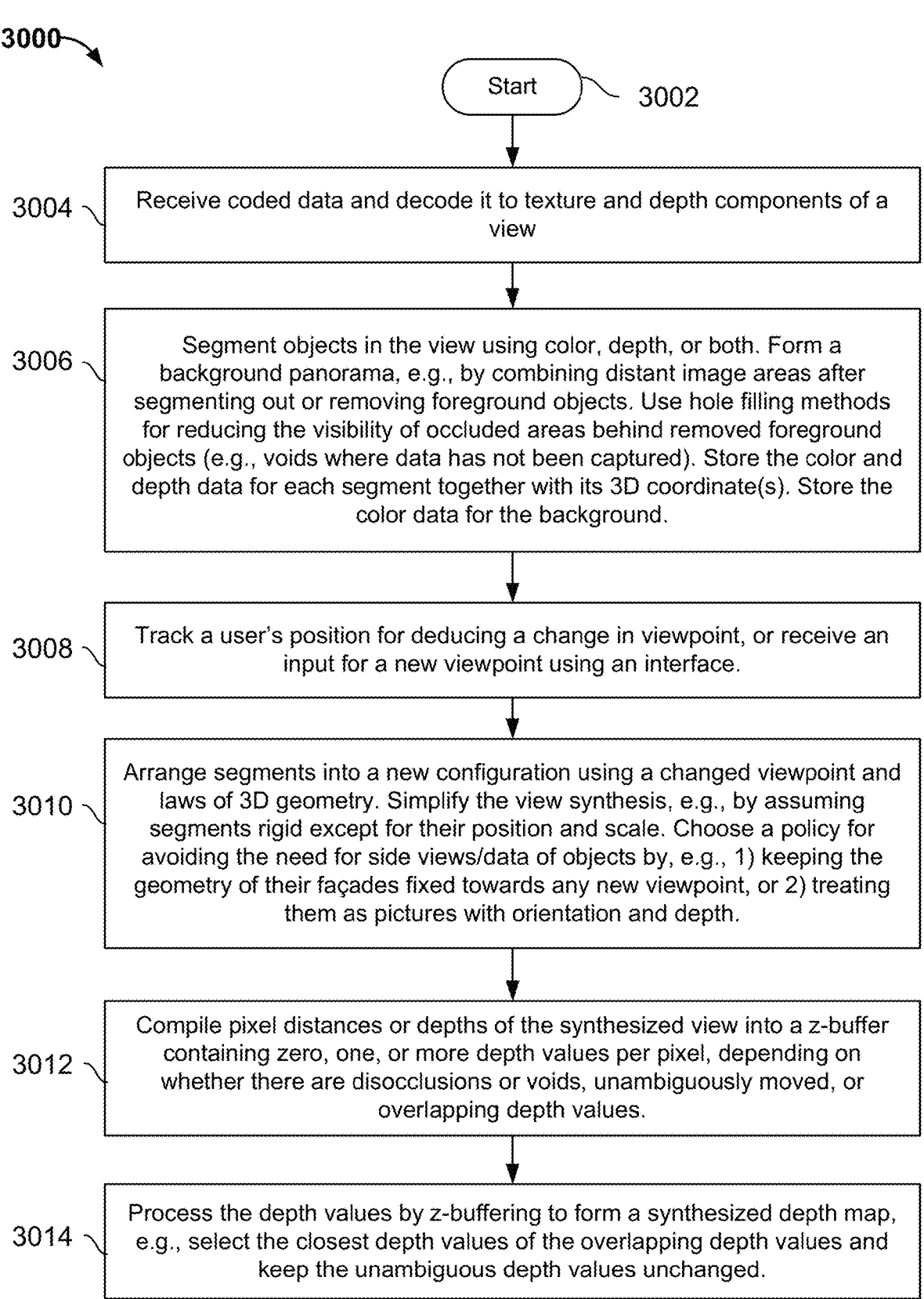

3000

Start — 3002

3004 — Receive coded data and decode it to texture and depth components of a view 3006 — Segment objects in the view using color, depth, or both. Form a background panorama, e.g., by combining distant image areas after segmenting out or removing foreground objects. Use hole filling methods for reducing the visibility of occluded areas behind removed foreground objects (e.g., voids where data has not been captured). Store the color and depth data for each segment together with its 3D coordinate(s). Store the color data for the background.

3008 — Track a user's position for deducing a change in viewpoint, or receive an input for a new viewpoint using an interface.

3010 — Arrange segments into a new configuration using a changed viewpoint and laws of 3D geometry. Simplify the view synthesis, e.g., by assuming segments rigid except for their position and scale. Choose a policy for avoiding the need for side views/data of objects by, e.g., 1) keeping the geometry of their façades fixed towards any new viewpoint, or 2) treating them as pictures with orientation and depth.

3012 — Compile pixel distances or depths of the synthesized view into a z-buffer containing zero, one, or more depth values per pixel, depending on whether there are disocclusions or voids, unambiguously moved, or overlapping depth values.

3014 — Process the depth values by z-buffering to form a synthesized depth map, e.g., select the closest depth values of the overlapping depth values and keep the unambiguous depth values unchanged.

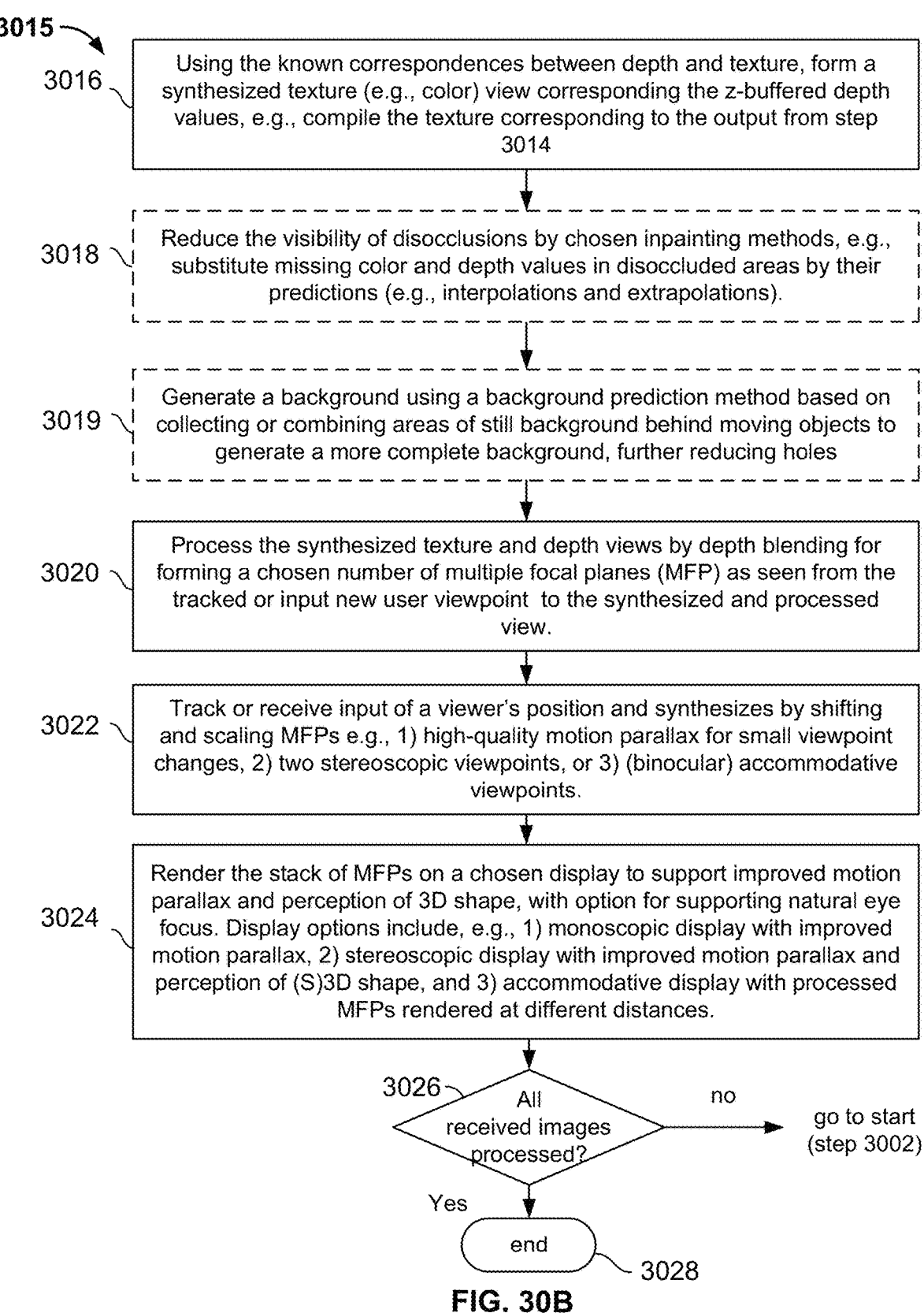

3016 — Using the known correspondences between depth and texture, form a synthesized texture (e.g., color) view corresponding the z-buffered depth values, e.g., compile the texture corresponding to the output from step 3014

3018 — Reduce the visibility of disocclusions by chosen inpainting methods, e.g., substitute missing color and depth values in disoccluded areas by their predictions (e.g., interpolations and extrapolations).

3019 — Generate a background using a background prediction method based on collecting or combining areas of still background behind moving objects to generate a more complete background, further reducing holes 3020 — Process the synthesized texture and depth views by depth blending for forming a chosen number of multiple focal planes (MFP) as seen from the tracked or input new user viewpoint to the synthesized and processed view.

3022 — Track or receive input of a viewer's position and synthesizes by shifting and scaling MFPs e.g., 1) high-quality motion parallax for small viewpoint changes, 2) two stereoscopic viewpoints, or 3) (binocular) accommodative viewpoints.

3024 — Render the stack of MFPs on a chosen display to support improved motion parallax and perception of 3D shape, with option for supporting natural eye focus. Display options include, e.g., 1) monoscopic display with improved motion parallax, 2) stereoscopic display with improved motion parallax and perception of (S)3D shape, and 3) accommodative display with processed MFPs rendered at different distances.

3026 — All received images processed?

no → go to start (step 3002)

Yes end — 3028

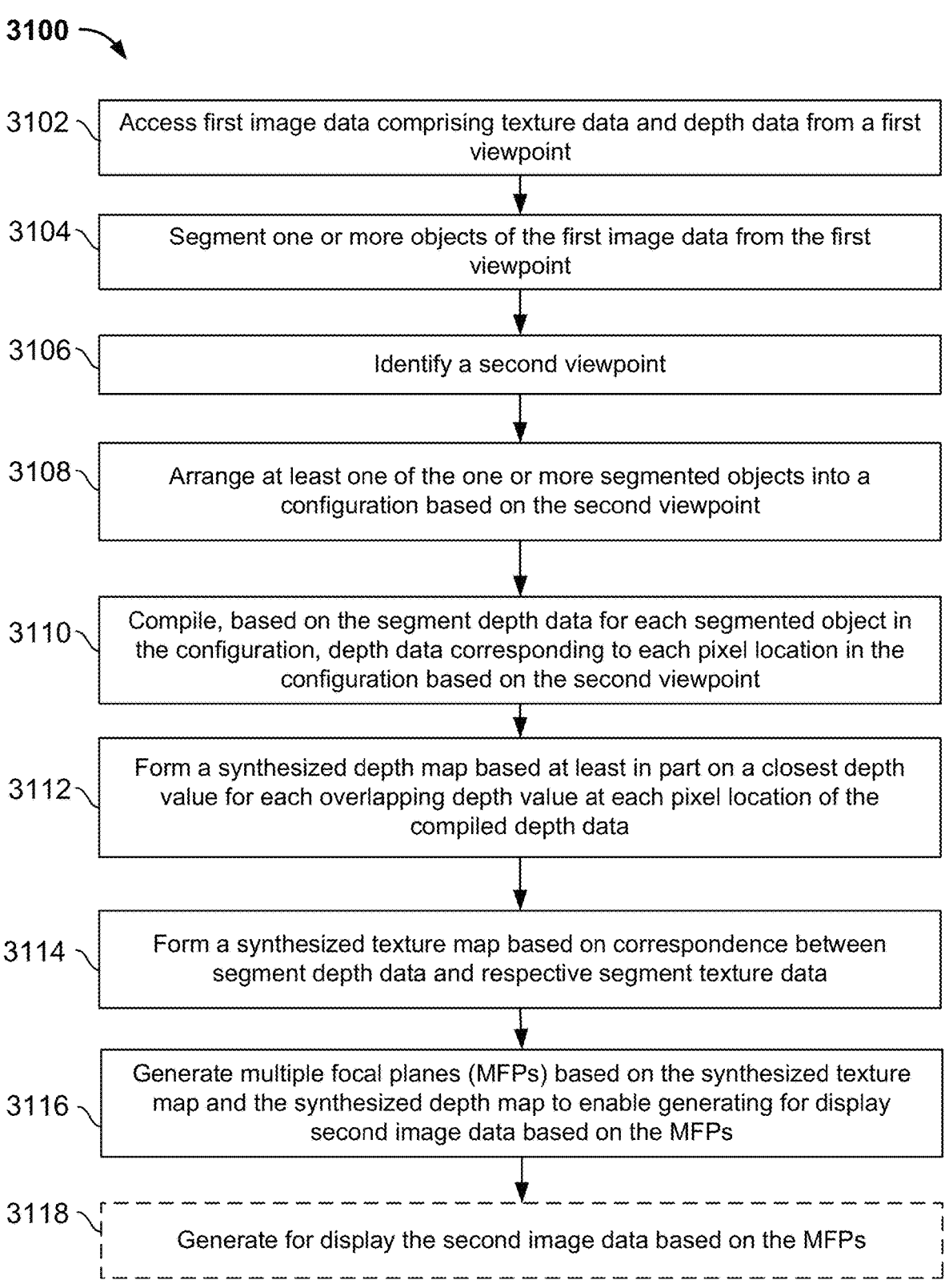

3102 — Access first image data comprising texture data and depth data from a first viewpoint 3104 — Segment one or more objects of the first image data from the first viewpoint 3106 — Identify a second viewpoint 3108 — Arrange at least one of the one or more segmented objects into a configuration based on the second viewpoint 3110 — Compile, based on the segment depth data for each segmented object in the configuration, depth data corresponding to each pixel location in the configuration based on the second viewpoint 3112 — Form a synthesized depth map based at least in part on a closest depth value for each overlapping depth value at each pixel location of the compiled depth data 3114 — Form a synthesized texture map based on correspondence between segment depth data and respective segment texture data 3116 — Generate multiple focal planes (MFPs) based on the synthesized texture map and the synthesized depth map to enable generating for display second image data based on the MFPs 3118 — Generate for display the second image data based on the MFPs

3216 — If the transformation revealed holes (areas where there are not texture/depth data), fill the holes on the focal planes for each layer e.g. using inpainting. Update luminance values of the inpainted pixels so that depth blending is correct, using e.g., interpolation between the luminance values on the hole edges.

3217 — Generate a background using a background prediction method based on collecting or combining areas of still background behind moving objects to generate a more complete background, further reducing holes.

3218 — Render the stack of MFPs on a chosen display to support improved motion parallax and perception of 3D shape, with option for supporting natural eye-focus. Display options include, e.g., 1) monoscopic display with improved motion parallax, 2) stereoscopic display with improved motion parallax and perception of (S)3D shape, and 3) accommodative display with processed MFPs rendered at different distances.

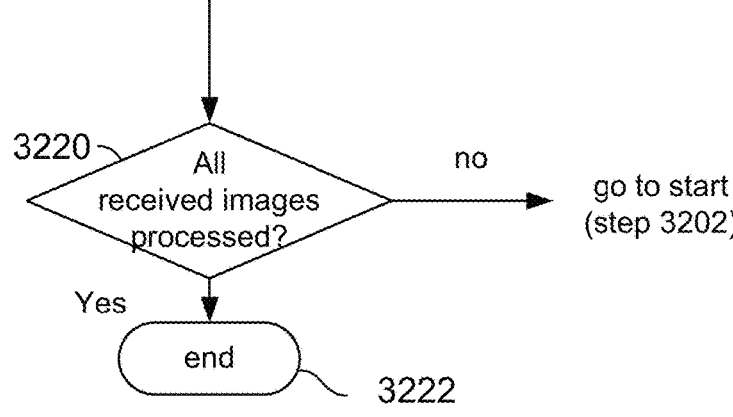

3220 — All received images processed?

no → go to start (step 3202)

Yes end

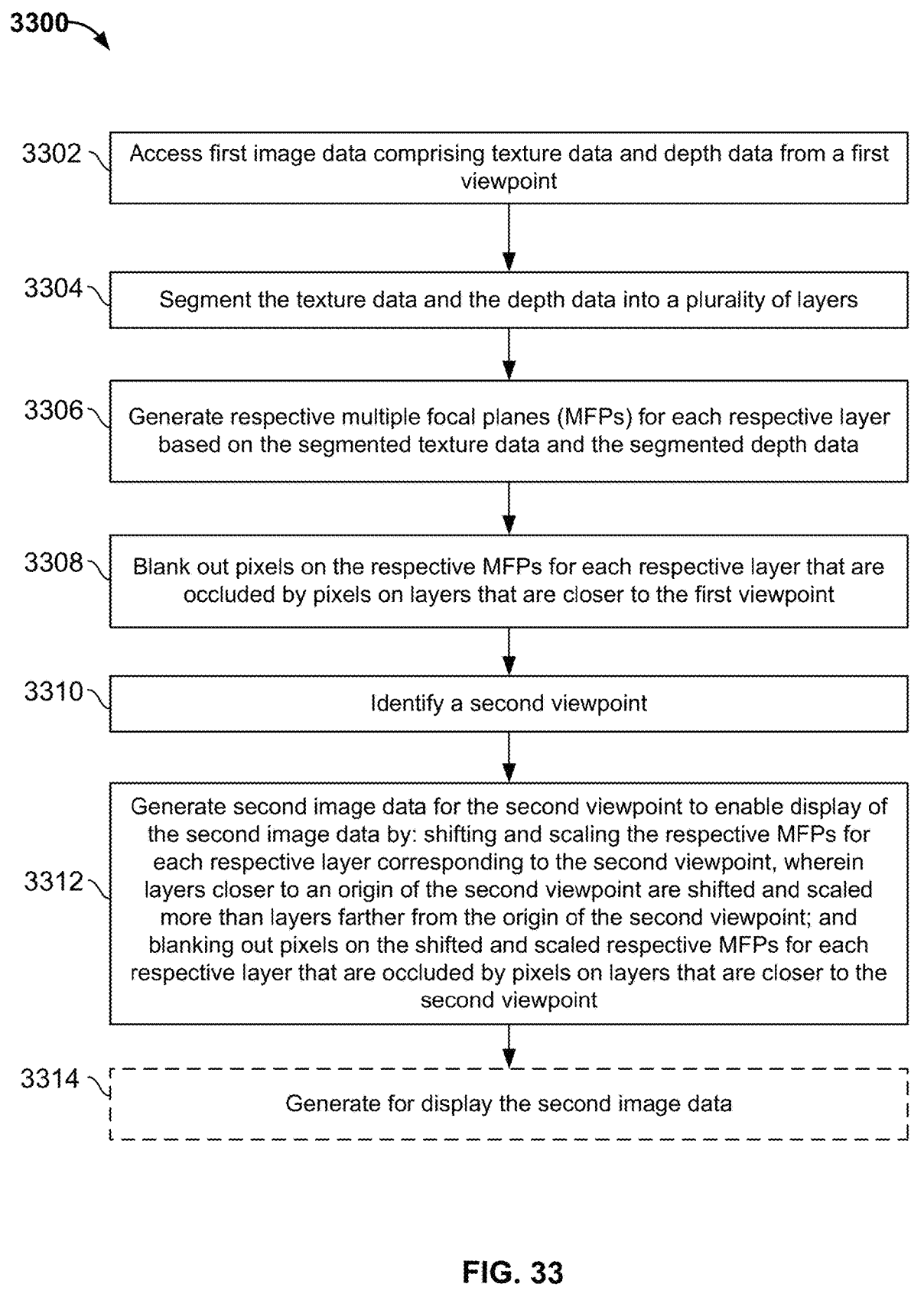

3302 — Access first image data comprising texture data and depth data from a first viewpoint 3304 — Segment the texture data and the depth data into a plurality of layers 3306 — Generate respective multiple focal planes (MFPs) for each respective layer based on the segmented texture data and the segmented depth data 3308 — Blank out pixels on the respective MFPs for each respective layer that are occluded by pixels on layers that are closer to the first viewpoint 3310 — Identify a second viewpoint 3312 — Generate second image data for the second viewpoint to enable display of the second image data by: shifting and scaling the respective MFPs for each respective layer corresponding to the second viewpoint, wherein layers closer to an origin of the second viewpoint are shifted and scaled more than layers farther from the origin of the second viewpoint; and blanking out pixels on the shifted and scaled respective MFPs for each respective layer that are occluded by pixels on layers that are closer to the second viewpoint 3314 — Generate for display the second image data

FIG. 33

VIEWPOINT SYNTHESIS WITH ENHANCED 3D PERCEPTION

BACKGROUND

This disclosure is generally directed to techniques for encoding and decoding video frames.

SUMMARY

In the real world, a person may freely navigate in a space and view details and surfaces of scenes from practically any possible direction. In 3D captured spaces, there may be approaches to try to support the same freedom. However, there are difficulties of capturing 3D spaces in high detail, as well as coding and delivering large amounts of data being produced to support the same freedom. Thus, approaches to mimic natural, real-world like viewing may use simplifications and approximations, which may lose relevant cues for natural perception, and may unduly increase the complexity of approaches.

In some approaches, a view may be enhanced using motion parallax. For example, to support motion parallax, frontal areas of a view may be moved relatively fast compared to areas that are farther back with respect to a viewpoint of a viewer (e.g., when a user is moving). However, although object or layer translation may emphasize a perceived 3D effect, the 2D nature of the billboard or 2D object or layer may be visible in the view. Also, the approaches may not support accommodation or freedom to focus eyes at any 3D surface point or voxels. A display may be used that supports accommodation using multiple focal planes (MFPs). However, use of focal plane shifting to simulate motion parallax may generate a corrupted image because a rendering result by summing transparent MFPs is distorted by the shifts (e.g., focal planes do not coincide pixel by pixel from a new viewpoint).

The present disclosure helps to address the problems described above, by, for example, providing systems and methods that support the perception of 3D shapes and focal distances when simulating viewpoint change. In some embodiments, non-transparent 2D billboards may be enhanced by transparent MFPs to support the perception of 3D shapes and focal distances in billboard-based scene synthesis or when simulating viewpoint change.

In some embodiments, a new view is synthesized by accessing a view, segmenting the view into objects, and moving the segmented objects depending on a viewer's position to synthesize a new view. When synthesizing a new view, each repositioned scene segment or object may change a depth map of the synthesized view. A depth map of the synthesized view may be generated by calculating distances of moved objects from a chosen virtual viewpoint, and supporting occlusions (e.g., by z-buffering). For every pixel, z-buffering may retain the closest or nearest depth and pixel value and occlude pixel or depth values farther behind. The depth map of the synthesized scene may be used to form multiple focal planes (MFPs) which may be used to improve 3D perception, small but high-quality binocular parallax, and support for accommodation. Use of the depth map of the synthesized scene to generate MFPs of a new view may avoid generating a corrupted image that can result from shifting focal planes to simulate a viewpoint change.

In some embodiments, a new view is synthesized using layered focal planes. A 3D scene may be divided into layers in a depth direction so that a small or minimum number of scene objects belong to two or more layers. Each layer may have its own texture and depth map, and a set of focal maps may be generated for each layer. Each set of layered focal maps can be translated or scaled so that the pixel values on the set of the layered focal planes coincide pixel by pixel from the simulated viewpoint. The separate sets of layered focal planes can be translated or scaled independently of each other to create a simulated viewpoint change effect. After translating the layers, objects on nearer layers may occlude objects that are farther away from a chosen viewpoint, and farther away pixels are blanked to not fuse with the pixels on the other layers. These disclosed techniques help to avoid corrupting images or corrupted images by blanking pixels that are farther away or occluded by nearer pixels. The disclosed techniques of using layered focal planes to simulate a viewpoint change may have an advantage of not having to generate a depth map for a simulated view, which may avoid capturing or forming depth maps by inverse blending from MFPs which may be prone to error.

In some embodiments, a system accesses first image data comprising texture data and depth data from a first viewpoint. For example, accessing the first image data may comprise the system receiving coded data and decoding the coded data to the texture data and the depth data. The system may segment one or more objects of the first image data from the first viewpoint. For example, segmenting the one or more objects of the first image data from the first viewpoint may be based on color, depth, or both color and depth. The system may generate respective segment texture data and segment depth data for each segmented object of the one or more segmented objects. The system may generate a background image by removing at least one object from the first image data with corresponding depth data closer or nearer to the first viewpoint than other depth data of the first image data and combining areas of the image data with corresponding depth data farther away from the first viewpoint. The system may fill one or more holes from the at least one removed object using spatial interpolation or extrapolation to predicting missing texture data of pixels. Generating a background may use a background prediction method based on collecting areas of still background behind moving objects which may generate a more complete background, thus further reducing the holes.

The system may identify a second viewpoint. For example, the system may track a position of a user and/or receive as an input a user position, and the system may identify the second viewpoint based on the tracked position and/or the received input. The system may arrange at least one of the one or more of the segmented objects into a configuration based on the second viewpoint. For example, the system may move at least one segmented object based on the second viewpoint. Moving the at least one segmented object may be based on 3D coordinates of the at least one segmented object and a scaling factor to define a position and a size of the at least one segmented object as viewed from the second viewpoint. The system may move at least one segmented object in a fixed pose. The system may move at least one segmented object to have a same orientation relative to the second viewpoint as a previous orientation relative to the first viewpoint.

The system may compile, based on the segment depth data for each segmented object in the configuration, depth data corresponding to each pixel location in the configuration based on the second viewpoint. The system may form a synthesized depth map based at least in part on a closest or nearest depth value for each overlapping depth value at each pixel location of the compiled depth data. The system may form a synthesized texture map based on correspondence between segment depth data and respective segment texture data. The system may generate multiple focal planes (MFPs) based on the synthesized texture map and the synthesized depth map to enable generating for display second image data based on the MFPs. The system may generate for display second image data based on the MFPs.

The system may identify a third viewpoint. The system may determine the third viewpoint is less than a threshold distance from the second viewpoint. In response to determining that the third viewpoint is less than a threshold distance from the second viewpoint, the system may generate modified MFPs by shifting and scaling the MFPs and generate for display modified image data based on the modified MFPs.

In some embodiments, a system accesses first image data comprising texture data and depth data from a first viewpoint. For example, a system may receive coded data and decode coded data to the texture data and the depth data. The texture data and the depth data from the first viewpoint may comprise first texture data and first depth data from the first viewpoint captured at a first time, and second texture data and second depth data from the first viewpoint captured at a second time. The first image data may further comprise one or more additional texture data and additional depth data from one or more additional viewpoints. The system may segment texture data and depth data into a plurality of layers. The system may generate respective multiple focal planes (MFPs) for each respective layer based on the segmented texture data and the segmented depth data. The system may blank out pixels on the respective MFPs for each respective layer that are occluded by pixels on layers that are closer to the first viewpoint. The system may blank out pixels by setting pixel luminance values to zero.

The system may identify a second viewpoint. For example, the system may track a position of a user, and identify the second viewpoint based on the tracking. The system may generate second image data for the second viewpoint to enable display of the second image data by shifting and scaling the respective MFPs for each respective layer corresponding to the second viewpoint, and blanking out pixels on the shifted and scaled respective MFPs for each respective layer that are occluded by pixels on layers that are closer to the second viewpoint. Layers closer to an origin of the second viewpoint may be shifted and scaled more than layers farther from the origin of the second viewpoint.

The system may fill in at least one hole in at least one of the shifted and scaled respective MFPs using data from a same depth layer to generate the second image data. In some embodiments, the system may segment one or more objects of the first image data from the first viewpoint on each layer. The system may fill in at least one hole generated from moving an occluding object in at least one of the shifted and scaled respective MFPs using a copy of the occluding object to generate the second image data. The copy of the occluding object may be moved in the depth direction to fill the hole. The system may fill in the at least one hole by setting a luminance value of a missing pixel to a luminance value calculated by blending functions using a new depth of a corresponding pixel of a moved copy of the occluding object to fill the hole, and setting a color value of the missing pixel to a color value of a corresponding pixel of the occluding object. The system may fill in the at least one hole by setting a luminance value of a missing pixel to a luminance value calculated by interpolating and/or extrapolating pixel luminance values on the hole edges, and setting a color value of the missing pixel to a color value calculated by interpolating and/or extrapolating pixel color values on the hole edges.

As a result of the use of these techniques, non-transparent 2D displays or billboards may be enhanced by transparent MFPs to support the perception of 3D shapes and focal distances when simulating viewport change. The disclosed techniques can be applied in viewing content on TVs, computer displays, flatscreens, and accommodative displays, for example.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 6 depicts an illustration of segmenting a view by texture, depth, or both texture and depth, in accordance with some embodiments of this disclosure;

FIG. 12 shows an example of 3D scene layering, in accordance with some embodiments of this disclosure;

FIG. 13 shows an example of a schematic of a first capture setup variation, in accordance with some embodiments of this disclosure;

FIG. 14 shows an example of a schematic of a second capture setup variation, in accordance with some embodiments of this disclosure;

FIG. 29 is a flowchart of an illustrative process for transmitting an image, in accordance with some embodiments of this disclosure;

FIG. 30A is a flowchart of an illustrative process for accessing an image and generating an enhanced image to a viewpoint, in accordance with some embodiments of this disclosure;

FIG. 30B is a flowchart of an illustrative process for accessing an image and generating an enhanced image to a viewpoint, in accordance with some embodiments of this disclosure;

FIG. 31 is a flowchart of another illustrative process for accessing an image and generating an enhanced image to a viewpoint, in accordance with some embodiments of this disclosure;

FIG. 32B is a flowchart of another illustrative process for accessing an image and generating an enhanced image to a viewpoint, in accordance with some embodiments of this disclosure; and FIG. 33 is a flowchart of another illustrative process for accessing an image and generating an enhanced image to a viewpoint, in accordance with some embodiments of this disclosure.

DETAILED DESCRIPTION

Figure 1A:
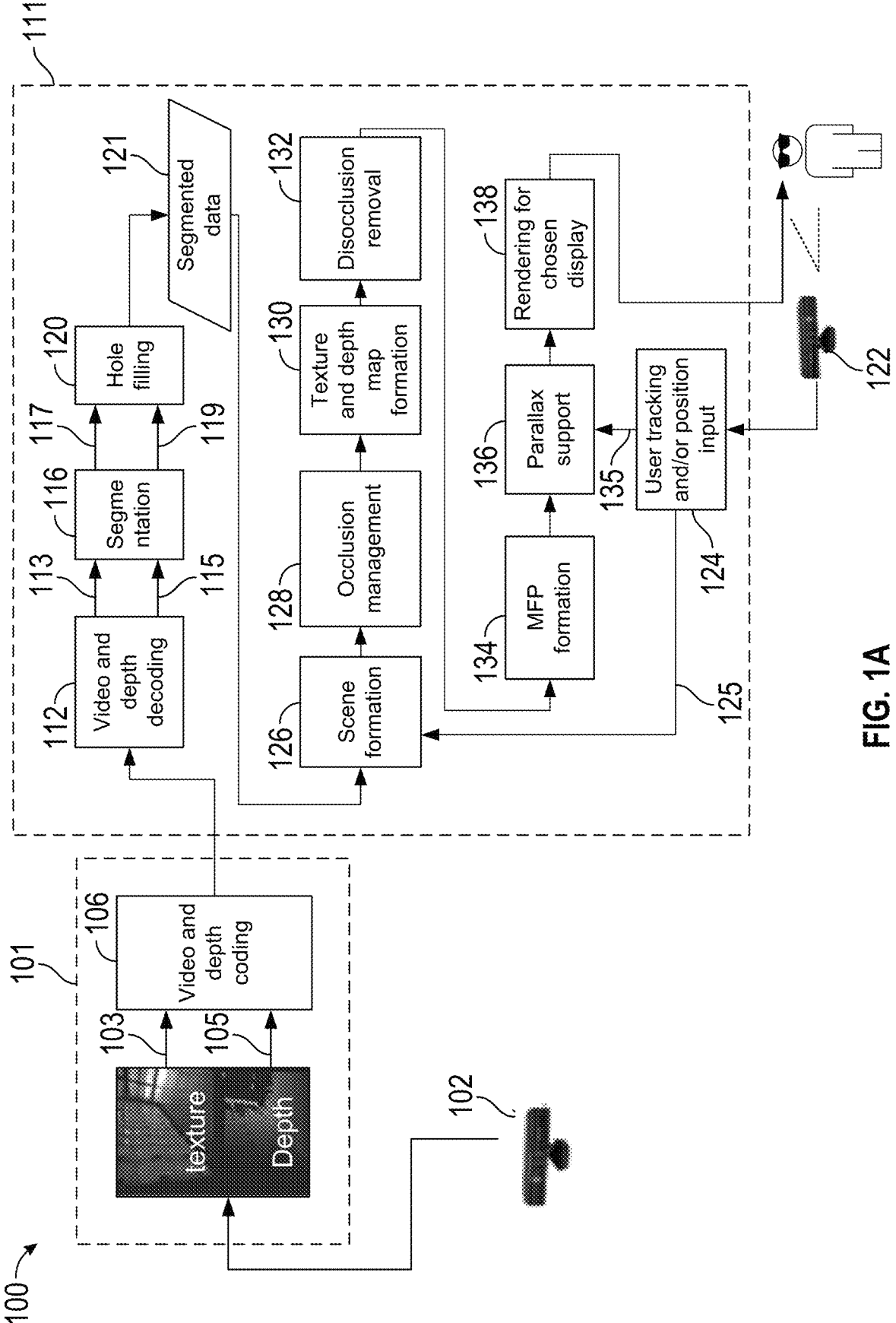
FIG. 1A depicts a system for transmitting and receiving image data for viewpoint synthesis with enhanced 3D perception, in accordance with some embodiments of this disclosure.

In some embodiments, the disclosed techniques combine/enhance 2D segment/layer ("billboard") based viewpoint synthesis by the ability of MFPs to support stereoscopic disparity and motion parallax, and accommodation. The disclosed techniques may combine coarse viewpoint synthesis with fine 3D shape support (e.g., stereoscopic/motion parallax and accommodation). In some embodiments, virtual viewpoints may be supported using DIBR/3D warping instead of shifting MFPs. In some embodiments, MFPs are used as they can also support natural accommodation. The disclosed techniques may include mutual/simultaneous segmentation and reorganization (e.g., shifting and scaling) of texture and depth data during scene formation to form a simulated view, and using depth data for supporting occlusions (e.g., by using z-buffering/ordering).

The techniques disclosed herein may help support detecting 3D shapes of objects and synthesizing small viewpoint changes (e.g., for binocular parallax or stereoscopy) with high quality at object edges (e.g., with reduced disocclusions or shearing). More particularly, the disclosed techniques may use multiple focal planes (MFPs) to support both 3D perception of segmented objects, and better quality at the edges of segmented objects. Use of MFPs may support natural eye focus with accommodative glasses displays. The disclosed techniques may not require changes to an existing front end (e.g., capture, formation, coding, and transmission of video plus depth format content) and may support 3D cues and adequate freedom for user mobility (e.g., viewing the received content from varying viewpoints). The processing required by the disclosed techniques may be made in the receiver or it may be shared between a thin client and a transmitter or an edge server.

When capturing and displaying visual content, a relevant objective is to enable a viewer to understand a view and recognize shapes and objects with ease. In some approaches, 2D views can be used to achieve this objective. Multiple factors may help perceive 3D information from 2D views. One factor may be a size of 2D objects in the view, which may be learned by experience. For example, a viewer may learn through real-world experience, the size of a car or a human. Nearby objects may seem to be bigger than objects that are farther away. Another relevant factor is how objects occlude each other, which may reveal the order of objects in the depth dimension and help with estimating the sizes of the objects. For example, nearby objects may occlude objects that are farther away from a viewer. A third factor which may reveal object positions and sizes is motion parallax or a phenomenon in which objects closer to a viewer may appear to move faster compared to objects that are farther away in a 3D scene (e.g., when a viewer is moving).

In some approaches, 2D rendering with support for motion parallax may be used to help enable perception of 3D shapes. New views or viewpoints may be synthesized using 2D renderings without sending any additional information, reducing a burden for transmitting data and enabling content interactions based on user motions (e.g., navigating in a 2D view). Thus, supporting motion parallax may been a relevant objective in 2D capture, delivery, and rendering approaches.

However, approaches using 2D views with motion parallax may have challenges in supporting natural perception of 3D objects and shapes. For example, a result of using such approaches may suffer from flattening or billboarding, when segmented 2D objects are moved and scaled to new configurations. When synthesizing views by content processing, a challenge may be to avoid disocclusions or revealing areas where information has not been captured. To avoid disocclusions, some approaches may combine multiple camera views and/or use extrapolation and filtering, or inpainting. Use of flat 2D objects may not be advantageous in supporting natural eye focus or accommodation.

In techniques disclosed herein, depth blending is used to generate a stack of transparent focal planes (MFPs). Illuminative MFPs may have each pixel value corresponding a set of additive luminance components which enable a viewer to focus or accommodate in between of the planes, and thus create an illusion for continuous 3D depth perception. MFPs may support high quality perception of 3D shapes, and MFPs may be used for creating small but high-quality binocular parallax by shifting and scaling the planes. Depth blending may prevent or reduce disocclusions with small shifts or viewpoint changes. Motion parallax may not be supported with large MFP shifts, as the rendering result by summing transparent MFPs may be distorted by the shifts. For example, information of an object at different depths may be split spatially and not be aligned when summing the MFPs.

Thus, it would be desirable to enhance 2D rendering with better support for perceiving 3D shapes. It may be desirable for approaches to use as few cameras as possible, with as few disocclusions or other defects as possible. However, achieving this objective may depend on the scene or content type (e.g., the use case).

In some embodiments, a system enhances non-transparent 2D billboards by transparent MFPs for supporting the perception of 3D shapes and/or focal distances in billboard-based scene synthesis. The system may use a depth map of a synthesized scene to perform depth blending for forming multiple focal planes (MFPs). The MFPs may be used for improving 3D perception, small but high-quality binocular parallax, and/or support for accommodation.

When synthesizing a new view, each repositioned scene segment may change a depth map. In some embodiments, a segment may refer to an object that is segmented from a scene or a segmented object. For example, a scene may be segmented to form objects and a background, and the segmented objects may be moved to form a synthesized scene or a configuration based on a new viewpoint. Despite how the depth map segments are moved, a depth map of the synthesized scene may be obtained by calculating the distances of moved objects from a chosen virtual viewpoint, and supporting occlusions. For example, occlusions may be supported by z-buffering. For every pixel, z-buffering retains the closest or nearest depth and pixel value to a viewpoint and occludes pixel or depth values farther behind.

The disclosed techniques may support 3D motion parallax or natural relations between objects of a captured scene. The approaches may be based on capturing a wide panorama of a view, and after segmenting the view into objects, moving the segmented objects depending on a viewer's position so that natural 3D like perception is supported. Some embodiments of the approaches form components of a 3D rendering using a video plus depth capture of a scene.

Perceiving 3D shape may be supported by using multiple focal planes (MFPs), based on texture and depth data captured from a view. In some embodiments, texture data may be color image data, e.g., YCbCr or RGB data, or color image data in any suitable color format, and depth data may be a depth map. High quality parallax effects may be supported for small viewpoint changes. For example, a small viewpoint change may be a swaying of a viewer's head side by side. High quality renderings may be displayed on stereoscopic screens, near-eye displays (NED), or on their accommodative versions. In some embodiments, rendered viewpoints may be processed to support natural accommodation (e.g., by MFP glasses).

FIG. 1A depicts a system 100 for transmitting and receiving image data for viewpoint synthesis with enhanced 3D perception, in accordance with some embodiments of this disclosure. System 100 may include a transmitter 101 and a receiver 111. The transmitter 101 may perform capturing and coding 106 of image data from a panorama view. The receiver 111 may perform decoding 112, scene segmentation 116, hole filling 120, user tracking and/or accessing position input 124, scene formation 126, occlusion management 128, texture and depth map formation 130, disocclusion removal 132, MFP formation 134, parallax support 136, and rendering for a chosen display 138.

In the shown embodiment, transmitter 101 (e.g., a server, when executing an image processing application) accesses image data including texture data 103 (e.g., video data) and depth data 105. The texture data 103 may be color image data, e.g., YCbCr or RGB data, or color image data in any suitable color format, and depth data 105 may be a depth map. In some embodiments, the image data may be accessed in a local database, provided by a sensor, or received from another remote device. In the shown embodiment, the image data is provided by a sensor device 102 (e.g., a texture and depth sensor, RGB-D sensor, or any suitable texture and depth sensor/camera). The sensor device 102 may be calibrated with a method to map 2D image coordinates and distances with real-world 3D coordinates and distances.

At 106, transmitter 101 may code video and depth data. Any suitable lossless or lossy encoding techniques may be used (e.g., MPEG, HLS, DivX, etc.). In some embodiments, any suitable protocols and tools (e.g., wrappers or containers) may be used. For example, to code data, transmitter 101 may use one or more of Secure Reliable Transport (SRT), Dynamic Adaptive Streaming over HTTP (MPEG-DASH), Real-Time Messaging Protocol (RTMP), Audio Video Interleave (AVI), any other suitable protocol, or any combination of the above. Once encoding is complete, transmitter 101 may transmit the encoded data over any kind of a network (e.g., network 2806 of FIG. 28).

The receiver 111 may receive the encoded data. At 112, the receiver performs decoding of the received encoded data. For example, receiver 111 may decode the received encoded data (e.g., using any suitable codec) to generate decoded video 113 and decoded depth data 115.

At 116, the receiver 111 may perform scene segmentation to generate a background 117 and segments 119 (e.g., segmented objects). For example, the receiver 111 may segment one or more objects of the image data from a first viewpoint. For example, segmenting the one or more objects of the image data from the first viewpoint may be based on color, depth, or both color and depth. The system may generate respective segment texture data and segment depth data for each segmented object of the one or more segmented objects. The system may generate a background image 117 by removing at least one object from the image data with corresponding depth data closer to the first viewpoint than other depth data of the image and combining areas of the image data with corresponding depth data farther away from the first viewpoint.

At 120, the receiver 111 may perform hole filling. Holes induced by segmentation are mitigated by hole-filling methods (e.g., interpolation and extrapolation, and background prediction). The receiver 111 may perform hole-filling 120 on the background 117 and/or segments 119. For example, the system may fill one or more holes from the at least one removed object using spatial interpolation or extrapolation to predicting missing texture data of pixels. The receiver 111 may store segmented data 121 in a suitable format. The segmented data 121 may be color and depth data for the segmented objects.

The receiver 111 may modify content based on user movements and interaction. At 124, the receiver 111 may perform user tracking and/or accessing position input (e.g., receive input of a user's position) to determine a viewpoint of a user. For example, the receiver 111 may track a position of a user and/or receive as an input a user position, and the receiver 111 may identify a second viewpoint based on the tracked position and/or the received input. In the embodiments shown in FIG. 1A, a sensor device 122 captures information of a user to perform user tracking (e.g., determine a viewpoint of a user). In some embodiments, a sensor device in a headset of a user may be used to track head motions of a user to determine a viewpoint of a user. In some embodiments, the receiver 111 may use a manual interface to support user input for a user viewpoint.

At 126, the receiver 111 performs scene formation by arranging the segments (e.g., segmented data 121) according to a tracked or input user viewpoint 125 to form a synthesized view. For example, the receiver 111 may move at least one segmented object based on a second viewpoint. The moving the at least one segmented object may be based on 3D coordinates of the at least one segmented object and a scaling factor to define a position and a size of the at least one segmented object as viewed from the second viewpoint. Segments may be positioned either by keeping their facade towards the tracked viewpoint, or by positioning and transforming the facade like a 2D picture or billboard in 3D. For example, the receiver 111 may move at least one segmented object in a fixed pose. The receiver 111 may move at least one segmented object to have a same orientation relative to the second viewpoint as a previous orientation relative to the first viewpoint. The 3D shape of these facades may be shown by using the captured texture and depth data. Using DIBR rendering on a stereoscopic display, a 3D shape may be changed depending on the viewpoint.

At 128, the receiver 111 may perform occlusion management to handle occlusions between rendered objects as seen from the tracked or input user viewpoint 125. Occlusions between rendered objects may be handled using z-buffering. For example, the receiver 111 may compile pixel depths of the synthesized view into a z-buffer which may have 0, 1, or more depth values per pixel, representing disocclusions (e.g., voids or no data for the pixel), unambiguously moved objects (e.g., only one depth value), or overlapping depth values (e.g., multiple depth values) respectively.

At 130, the receiver 111 may form a depth map for the synthesized view. For example, the receiver may form the synthesized depth map by selecting the closest depth values of overlapping depth values in the z-buffer, and keeping the unambiguous depth values unchanged. The receiver may form texture data for the synthesized view. For example, the receiver 111 may form synthesized texture data corresponding to the z-buffered depth values by compiling the texture data corresponding to depth values of the synthesized depth map.

At 132, the receiver 111 may remove disocclusions. The receiver 111 may reduce visibility of disocclusions by inpainting methods. For example, the receiver 111 may substitute missing color and depth values in disoccluded areas by their predictions (e.g., interpolations and extrapolations). In some embodiments, removal of disocclusions may be optional. In some embodiments, disocclusions remaining after hole-filling at 120 may be reduced.

At 134, the receiver 111 may form MFPs by using depth blending on the synthesized texture data and synthesized depth map. A chosen number of MFPs may be output.

At 136, the receiver 111 may shift and scale the MFPs to support small, high-quality binocular parallax, disparity and/or accommodation, depending on the type of the display(s) the output is rendered for. At 136, the receiver 111 may receive a user tracked or user input viewpoint 135, and the MFPs may be shifted and scaled to support a change in the viewpoint. For example, the receiver 111 may identify a third viewpoint. The receiver 111 may determine the third viewpoint is less than a threshold distance from the second viewpoint. In response to determining that the third viewpoint is less than a threshold distance from the second viewpoint, the receiver 111 may generate modified MFPs by shifting and scaling the MFPs and generate for display modified image data based on the modified MFPs. Apart from accommodative displays rendering MFPs at different distances, a stereoscopic output image may be obtained by summing luminance(s) of corresponding MFP pixels towards corresponding two eyepoints.

At 138, the receiver 111 may render the MFPs for the for chosen display. For example, the display may be a glasses-type display.

Although the embodiments of FIG. 1A show one frame of image data (e.g., texture image 103 and depth map 105), the system 100 may process a sequence of frames for a session.

In the embodiments of FIG. 1A, the operations for manipulating the content may be made at a receiver 111, and additional information from a transmitter 101 may not be used when synthesizing new views for a viewer. Thus, creating new viewpoints to captured content may be performed by reusing or recycling previously received content. In some embodiments, the operations for manipulating the content may be distributed between a transmitter and receiver. For example, captured user motions (e.g., tracked or user input viewpoint) may be delivered to a transmitter, and most of the manipulation of content may be performed at the transmitter except for the decoding of received data, tracking a viewer and/or accessing position input, and rendering the output at the receiver. This may be beneficial with thin client devices having only little computing power. A restriction to the distributed versions may be network delays, possibly affecting to the quality (QoE) perceived by a viewer. It may also be possible to split the operations between a transmitter and receiver. For example, by performing the scene segmentation and new viewpoint formation in the transmitter, and the rest of the operations (e.g. MFP formation and manipulation) in the receiver.

In some embodiments, non-transparent 2D billboards are enhanced by transparent MFPs to better support the perception of 3D shapes and/or focal distances when simulating viewpoint change.

In some embodiments, simulating viewpoint change may performed using a depth map of the synthesized scene. Depth and texture representation of a scene may be used by depth blending for forming MFPs. Layered focal planes may be used to simulate large viewpoint changes.

In some embodiments, a system may capture a 3D scene (e.g., using RGBD cameras or any suitable cameras). Although RGBD camera(s) may be used in various embodiments of this disclosure, in alternative embodiments, any suitable texture or depth sensor(s) may be used or any suitable color/depth camera(s) may be used, and other formats than RGB (e.g., YCbCr) can be used for representing color (texture) information. The system may divide the captured data into layers in the depth direction so that as few scene objects as possible belong to two or more layers. The system may divide the texture and depth representation so that each layer has its own texture and depth map. The system may generate a set of focal maps for each layer using layered texture depth representations.

The system may translate or scale each set of layered focal maps so that pixel values in the set of layered focal planes coincide pixel by pixel from the simulated viewpoint. The system may translate or scale separate sets of layered focal planes independently of each other to create a simulated viewpoint change effect. The system may use layered focal planes approaches to avoid summing pixel values of focal planes resulting in a corrupted image. The incorrect summing of pixel values may be because objects on nearer layers occlude objects that are farther away. The system may avoid the incorrect summing by blanking pixels that are farther away so they do not fuse with pixels of other layers. Blank pixels may refer to pixels that do not emit light, so the pixels may be fused with any other pixels of other layers. In some embodiments, blank pixels may be implemented as transparent pixels.

The system may calculate occluded pixels by a ray tracing algorithm following a light ray from the eye point and blanking pixels that are behind any of the lighted pixels on the focal planes that are on the layers nearer to the viewpoint. This can be implemented using pixel by pixel value comparisons between layered focal planes.

Because the capturing texture and depth with a single RGBD camera cannot capture anything behind objects, disocclusions may occur, leaving holes with no texture in the simulated scene. Disocclusions can be mitigated by using several RGBD cameras or shooting the scene so that different layers are filmed during different times so that no occlusions between layers occur. If disocclusions cannot be avoided, the system may use inpainting methods for filling the holes.

MFPs may support high quality parallax effects for small viewpoint changes within each layered focal plane set. For example, small viewpoint changes may be a swaying of a viewer's head side by side. High quality renderings may be displayed on stereoscopic screens and near-eye-displays (NED), and on accommodative versions of the displays.

A system may process rendered viewpoints to support natural accommodation. For example, the system may process rendered viewpoints for multiple focal plane (MFP) glasses.

The system may support changing virtual viewpoints by using a compilation of MFP stacks in space. The system may support changing viewpoints without z-buffering or depth map data.

In some embodiments, virtual viewpoints and occlusions are based on z-buffering after acquiring and/or having depth map data.

In some embodiments, virtual viewpoints and occlusions are based on MFP data. Not using depth maps may avoid either capturing or forming depth maps by inverse depth blending from MFPs which may introduce errors. To use blanking of pixel data may require availability of MFP data along a line of sight.

Figure 1B:
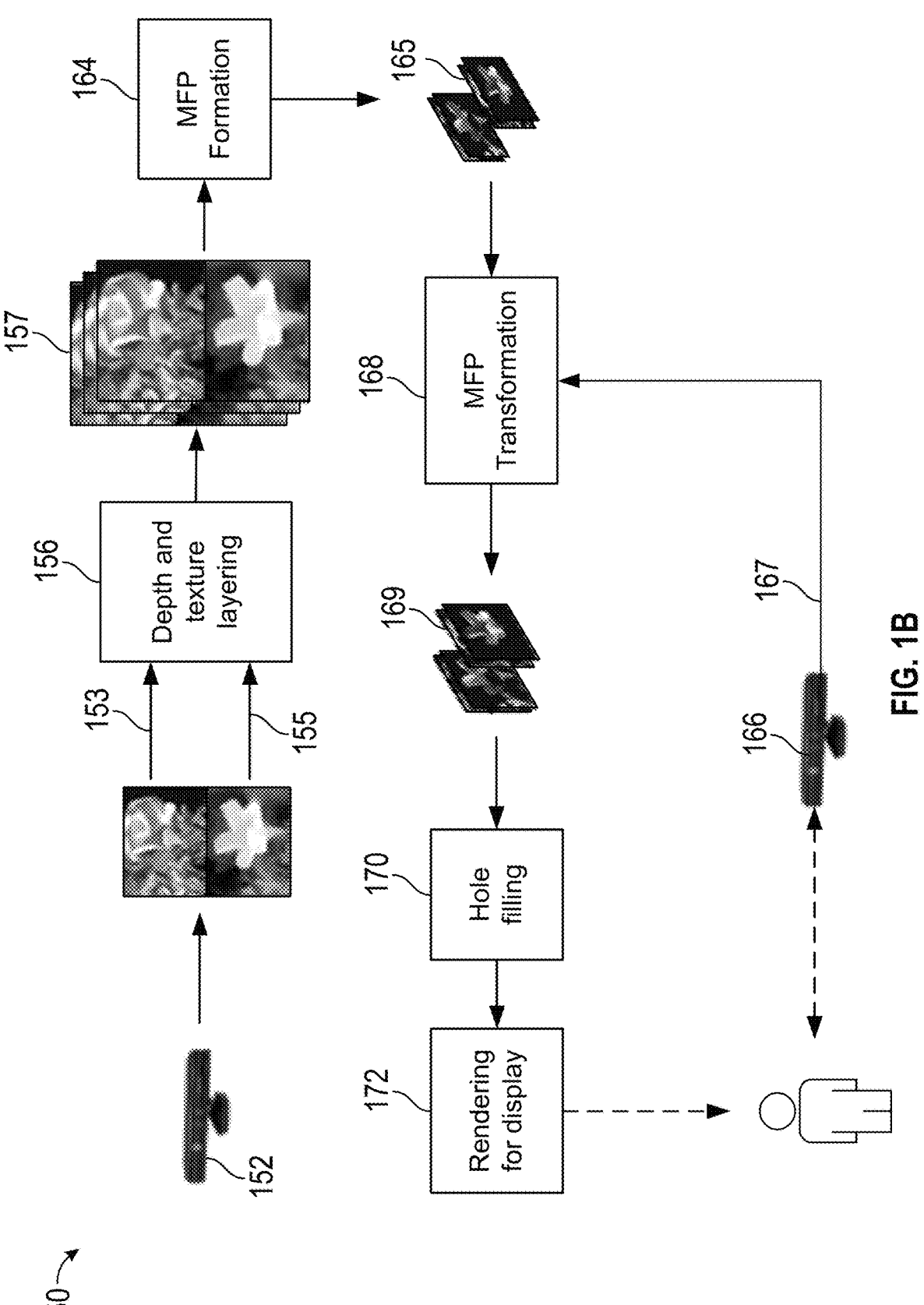
FIG. 1B depicts a system for simulating motion parallax using layered focal planes, in accordance with some embodiments of this disclosure.

FIG. 1B depicts a system 150 for simulating motion parallax using layered focal planes, in accordance with some embodiments of this disclosure.

In the shown embodiment, the image data is provided by a sensor device 152 (e.g., a texture and depth sensor, RGB-D sensor, or any suitable texture and depth sensor/camera) and includes texture data 153 (e.g., video data) and depth data 155. The texture data 153 may be color image data, e.g., YCbCr or RGB data, or color image data in any suitable color format, and depth data 155 may be a depth map. In some embodiments, the image data is accessed in a local database or received from another remote device. For example, the system may receive coded data and decode coded data to texture data and depth data.

In some embodiments, the image data comprises texture data and the depth data from a first viewpoint. The texture data and the depth data may comprise first texture data and first depth data from the first viewpoint captured at a first time, and second texture data and second depth data from the first viewpoint captured at a second time. The image data may further comprise one or more additional texture data and additional depth data from one or more additional viewpoints.

At 156, the system 150 may perform depth and texture layering to generate texture data and depth data for each layer 157. For example, the system 150 may segment texture data 153 and depth data 155 into a plurality of layers.

At 164, the system 150 may perform MFP formation to generate a set of layered MFPs 165. For example, the system 150 may generate respective multiple focal planes (MFPs) for each respective layer based on the segmented texture data and the segmented depth data.

At 168, the system 150 may perform MFP transformation based on user position data 167. The system 150 may receive user position data 167 from a sensor device 166. For example, the system 150 may track a position of a user, and identify the second viewpoint based on the tracking. The system may perform user tracking and/or accessing position input, and identify the second viewpoint based on the user tracking and/or accessing position input. The system 150 may generate a set of transformed and layered MFPs 169. For example, the system 150 may shift and scale the respective MFPs for each respective layer corresponding to the second viewpoint. The system 150 may blank out pixels on the shifted and scaled respective MFPs for each respective layer that are occluded by pixels on layers that are closer to the second viewpoint. Layers closer to an origin of the second viewpoint may be shifted and scaled more than layers farther from the origin of the second viewpoint. The system 150 may blank out pixels at 168 by setting pixel luminance values to zero.

At 170, the system 150 may perform hole filling. For example, system 150 may fill in at least one hole in at least one of the shifted and scaled respective MFPs using data from a same depth layer. The system 150 may fill in at least one hole generated from moving an occluding object in at least one of the shifted and scaled respective MFPs using a copy of the occluding object. The system 150 may fill in the at least one hole by setting a luminance value of a missing pixel to a luminance value of a corresponding pixel of the occluding object, and setting a color value of the missing pixel to a color value of a corresponding pixel of the occluding object. The system 150 may fill in the at least one hole by setting a luminance value of a missing pixel to a luminance value of a corresponding pixel of the occluding object, and setting a color value of the missing pixel to a color value of a corresponding pixel of a background.

At 172, the system 150 renders for display the stack of MFPs. For example, the system 150 may generate second image data for the second viewpoint by shifting and scaling the respective MFPs for each respective layer corresponding to the second viewpoint, blanking out pixels on the shifted and scaled respective MFPs for each respective layer that are occluded by pixels on layers that are closer to the second viewpoint, and filling in at least one hole of the shifted and scaled MFPs. The system 150 may render for display the second image data.

Figure 2A:
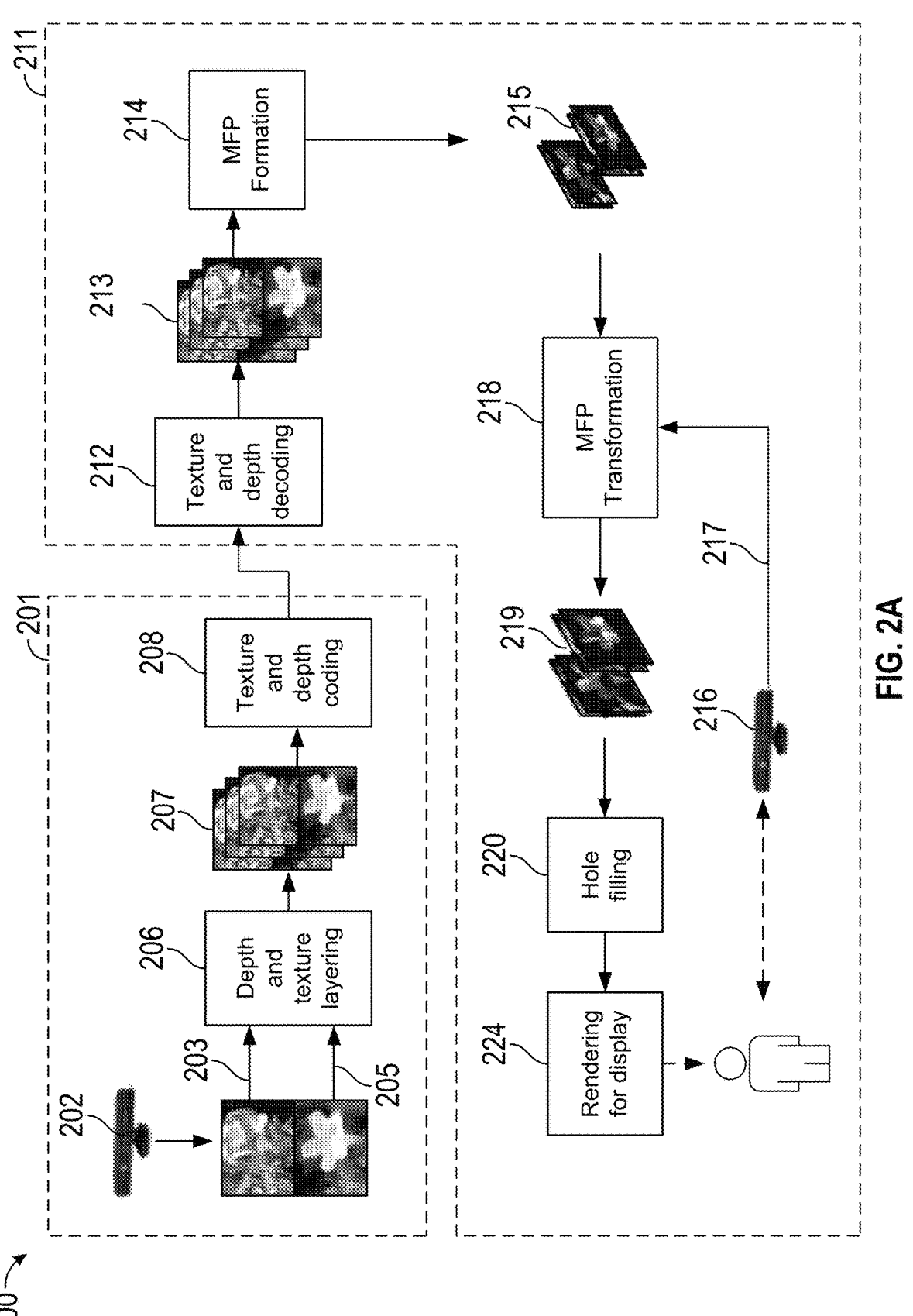
FIG. 2A depicts another system for transmitting and receiving image data for simulated motion parallax using layered focal planes, in accordance with some embodiments of this disclosure.

FIG. 2A depicts a system 200 for transmitting and receiving image data for simulated motion parallax using layered focal planes, in accordance with some embodiments of this disclosure.

In some embodiments, system 200 of FIG. 2A may be similar to system 150 of FIG. 1B, except system 200 of FIG. 2A includes a transmitter 201 and a receiver 211, and at 208, the transmitter 201 encodes texture and depth data for each layer 207 to be transmitted to a receiver 211 which at 212, decodes the received encoded data to decoded texture and depth data for each layer 213.

The transmitter 201 may perform capture of image data, depth and texture layering 206, and texture and depth coding 208. The receiver 211 may perform texture and depth decoding 212, MFP formation 214, MFP transformation 218, hole filling 220, user tracking and/or accessing position input, and rendering for display 224.

At 208, transmitter 211 may code texture and depth data for each layer 207. Any suitable lossless or lossy encoding techniques may be used (e.g., MPEG, HLS, DivX, etc.). In some embodiments, any suitable protocols and tools (e.g., wrappers or containers) may be used. For example, to code data, transmitter 101 may use one or more of Secure Reliable Transport (SRT), Dynamic Adaptive Streaming over HTTP (MPEG-DASH), Real-Time Messaging Protocol (RTMP), Audio Video Interleave (AVI), any other suitable protocol, or any combination of the above. Once encoding is complete, transmitter 201 may transmit the encoded data over any kind of a network (e.g., network 2806 of FIG. 28).

The receiver 211 may receive the encoded data. At 212, the receiver 211 performs decoding of the received encoded data. For example, receiver 211 may decode the received encoded data (e.g., using any suitable codec) to generate decoded texture and depth data for each layer 213.

In some embodiments, the sensor device 202, texture data 203, depth data 205, depth and texture layering 206, texture data and depth data for each layer 207, MFP formation 214, set of layered MFPs 215, sensor device 216, user position data 217, MFP transformation 218, set of layered and transformed MFPs 219, hole filling 220, rendering for display 224 of FIG. 2A corresponds to (e.g., is similar to or the same as) sensor device 152, texture data 153, depth data 155, depth and texture layering 156, texture data and depth data for each layer 157, MFP formation 164, set of layered MFPs 165, sensor device 166, user position data 167, MFP transformation 168, set of transformed and layered MFPs 169, hole filling 170, rendering for display 172 of FIG. 1B, respectively.

Figure 2B:
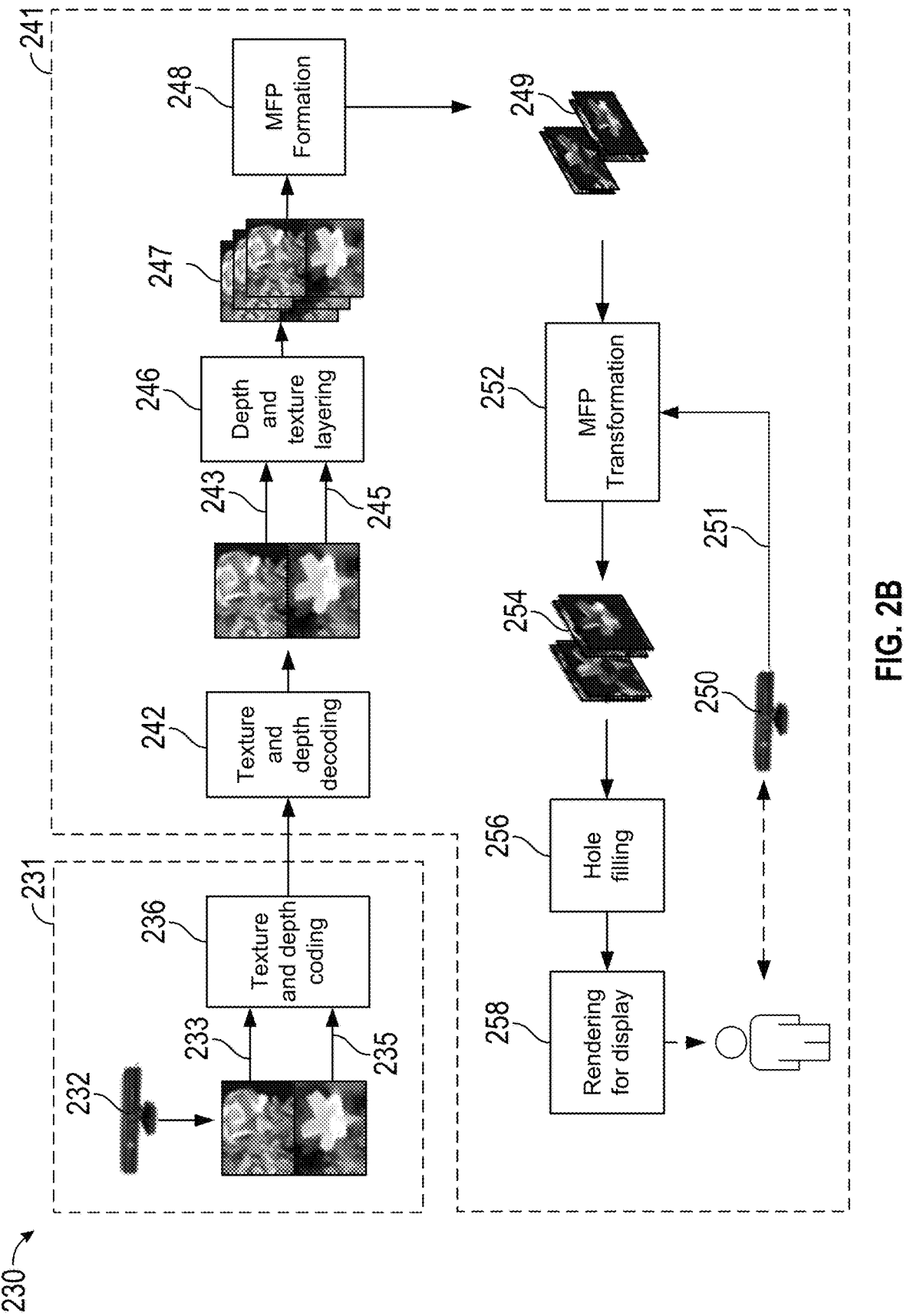
FIG. 2B depicts another system for transmitting and receiving image data for simulated motion parallax using layered focal planes, in accordance with some embodiments of this disclosure.

FIG. 2B depicts another system 230 for transmitting and receiving image data for simulated motion parallax using layered focal planes, in accordance with some embodiments of this disclosure. In some embodiments, system 230 of FIG. 2B may be similar to system 150 of FIG. 1B, except system 230 of FIG. 2B includes a transmitter 231 and a receiver 241, and at 236, the transmitter 231 encodes texture data 233 and depth data 235 to be transmitted to a receiver 241 which at 242, decodes the received encoded data to decoded texture data 243 and decoded depth data 245.

The transmitter 231 may perform capture of image data and texture and depth coding 236. The receiver 241 may perform texture and depth decoding 242, depth and texture layering 246, MFP formation 248, MFP transformation 252, hole filling 256, user tracking and/or accessing position input, and rendering for display 258.

At 236, transmitter 231 may code texture data 233 and depth data 235. Any suitable lossless or lossy encoding techniques may be used (e.g., MPEG, HLS, DivX, etc.). In some embodiments, any suitable protocols and tools (e.g., wrappers or containers) may be used. For example, to code data, transmitter 101 may use one or more of Secure Reliable Transport (SRT), Dynamic Adaptive Streaming over HTTP (MPEG-DASH), Real-Time Messaging Protocol (RTMP), Audio Video Interleave (AVI), any other suitable protocol, or any combination of the above. Once encoding is complete, transmitter 201 may transmit the encoded data over any kind of a network (e.g., network 2806 of FIG. 28).

The receiver 241 may receive the encoded data. At 242, the receiver performs decoding of the received encoded data. For example, receiver 241 may decode the received encoded data (e.g., using any suitable codec) to generate decoded texture data 243 and decoded depth data 245.

In some embodiments, the sensor device 232, texture data 233, depth data 235, depth and texture layering 246, texture data and depth data for each layer 247, MFP formation 248, set of layered MFPs 249, sensor device 250, user position data 251, MFP transformation 252, set of transformed and layered MFPs 254, hole filling 256, rendering for display 258 of FIG. 2B corresponds to (e.g., is similar to or the same as) sensor device 152, texture data 153, depth data 155, depth and texture layering 156, texture data and depth data for each layer 157, MFP formation 164, set of layered MFPs 165, sensor device 166, user position data 167, MFP transformation 168, set of transformed and layered MFPs 169, hole filling 170, rendering for display 172 of FIG. 1B, respectively.

Figure 2C:
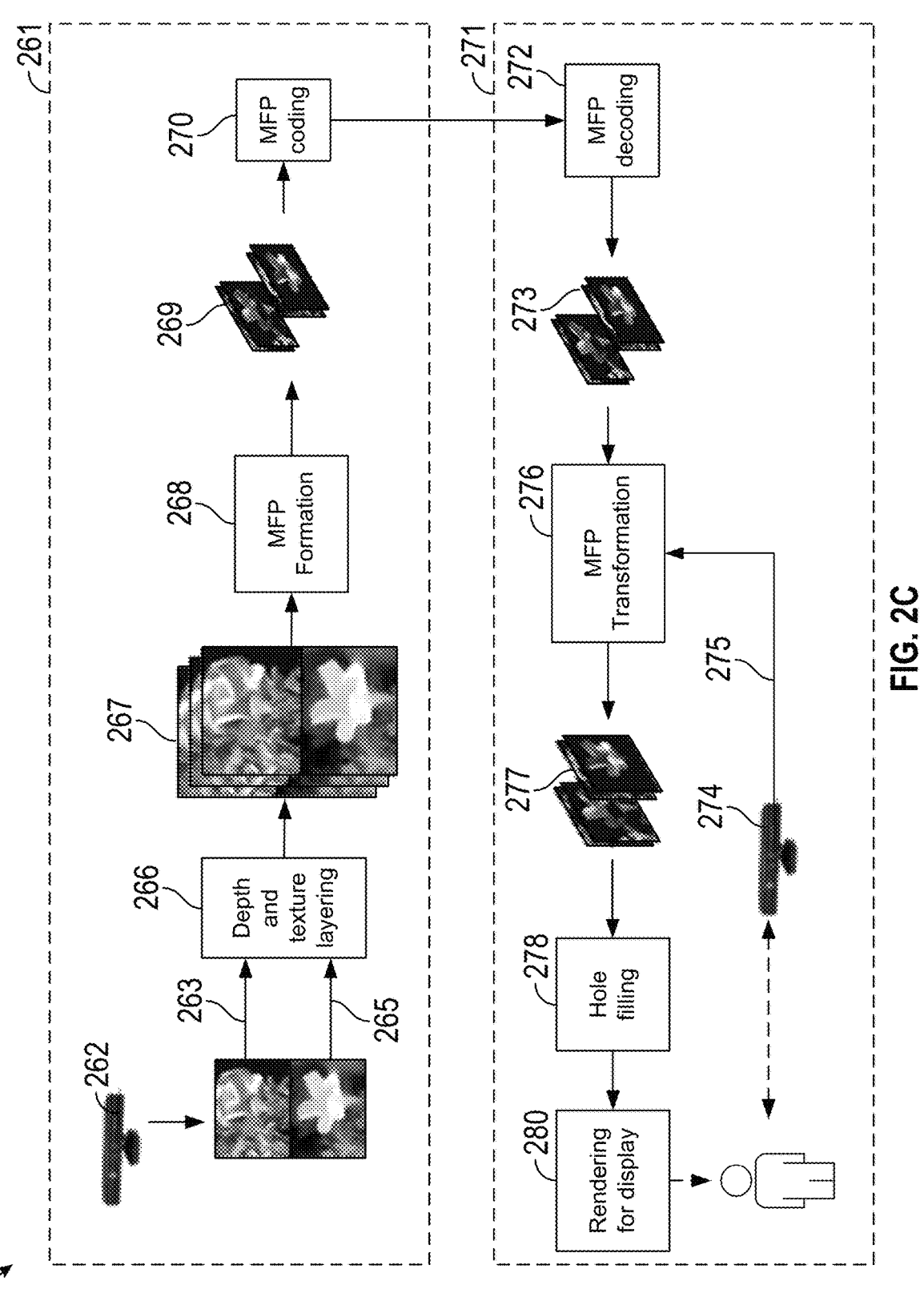
FIG. 2C depicts another system for transmitting and receiving image data for simulated motion parallax using layered focal planes, in accordance with some embodiments of this disclosure.

FIG. 2C depicts another system 260 for transmitting and receiving image data for simulated motion parallax using layered focal planes, in accordance with some embodiments of this disclosure. In some embodiments, system 260 of FIG. 2C may be similar to system 150 of FIG. 1B, except system 260 of FIG. 2C includes a transmitter 261 and a receiver 271, and at 270, the transmitter 261 encodes a set of layered MFPs 269 to be transmitted to a receiver 271 which at 272, decodes the received encoded data to a decoded set of layered MFPs 273.

The transmitter 261 may perform capture of image data, depth and texture layering 266, MFP formation 268, and MFP coding 270. The receiver 271 may perform MFP decoding 272, MFP transformation 276, hole filling 278, user tracking and/or accessing position input, and rendering for display 280.

At 270, transmitter 261 may code a set of layered MFPs 269. Any suitable lossless or lossy encoding techniques may be used (e.g., MPEG, HLS, DivX, etc.). In some embodiments, any suitable protocols and tools (e.g., wrappers or containers) may be used. For example, to code data, transmitter 101 may use one or more of Secure Reliable Transport (SRT), Dynamic Adaptive Streaming over HTTP (MPEG-DASH), Real-Time Messaging Protocol (RTMP), Audio Video Interleave (AVI), any other suitable protocol, or any combination of the above. Once encoding is complete, transmitter 261 may transmit the encoded data over any kind of a network (e.g., network 2806 of FIG. 28).

The receiver 271 may receive the encoded data. At 272, the receiver performs decoding of the encoded data. For example, receiver 271 may decode the received encoded data (e.g., using any suitable codec) to generate decoded set of layered MFPs 273.

In some embodiments, the sensor device 262, texture data 263, depth data 265, depth and texture layering 266, texture data and depth data for each layer 267, MFP formation 268, set of layered MFPs 269, sensor device 274, user position data 275, MFP transformation 276, set of transformed and layered MFPs 277, hole filling 278, rendering for display 280 of FIG. 2C corresponds to (e.g., is similar to or the same as) sensor device 152, texture data 153, depth data 155, depth and texture layering 156, texture data and depth data for each layer 157, MFP formation 164, set of layered MFPs 165, sensor device 166, user position data 167, MFP transformation 168, set of transformed and layered MFPs 169, hole filling 170, rendering for display 172 of FIG. 1B, respectively.

In the real world, a person may freely navigate in a space and view details and surfaces from practically any possible direction. A 3D captured space may support this same freedom, but the approaches may be limited by difficulties of capturing the 3D spaces in high detail, as well as coding and delivering the large amounts of data being produced. Approaches that mimic natural, real-world like viewing may be simplifications and approximations, which may lose relevant cues for natural perception.

In some approaches, 2D videos (e.g., cartoon animations and 2D side-scrolling games) may use motion parallax to ease up generating or synthesizing views and increasing the level of realism. For example, objects in frontal areas of a 2D side-scrolling game may move sideways relatively fast whereas objects in areas that are farther behind the frontal areas move less, and the background (e.g., sky) may stay fixed. Although object/layer and corresponding texture and color translation may emphasize a perceived 3D effect, the 2D nature of a billboard may be visible in the animation.

In some approaches, 360 degree videos or video layers in a depth dimension may enable viewers to view or navigate in a large panorama, up to a shape of a full sphere. Approaches for 360 degree videos may approximate motion parallax. For example, approaches may produce and shift spherical, co-centric video layers to support perception of 3D by a moving viewer. However, approaches that support 3D perception in 360 degree videos may have deficiencies. Although object relations and positions may support 3D motion parallax, the objects may be flat like billboards and may not support 3D shapes. Although small viewpoint changes may enable stereoscopic rendering (S3D) the result may remain a compilation of flat objects in 3D space. The approaches may not support accommodation or freedom of focusing eyes at any 3D surface points or voxels.

In some approaches, immersive 3D content is produced by modelling or 3D capturing. However, the approaches may be complex. For example, capturing a view by one camera may be preferred for simplicity. However, when using a view from one camera, objects closer to the camera occlude objects farther away from the camera. When a geometry is changed to support 3D navigation and/or parallax, disocclusions may occur. In some embodiments, disocclusions are areas that are revealed where information has not been captured. Disocclusions may show up as black in renderings.

Figure 3:
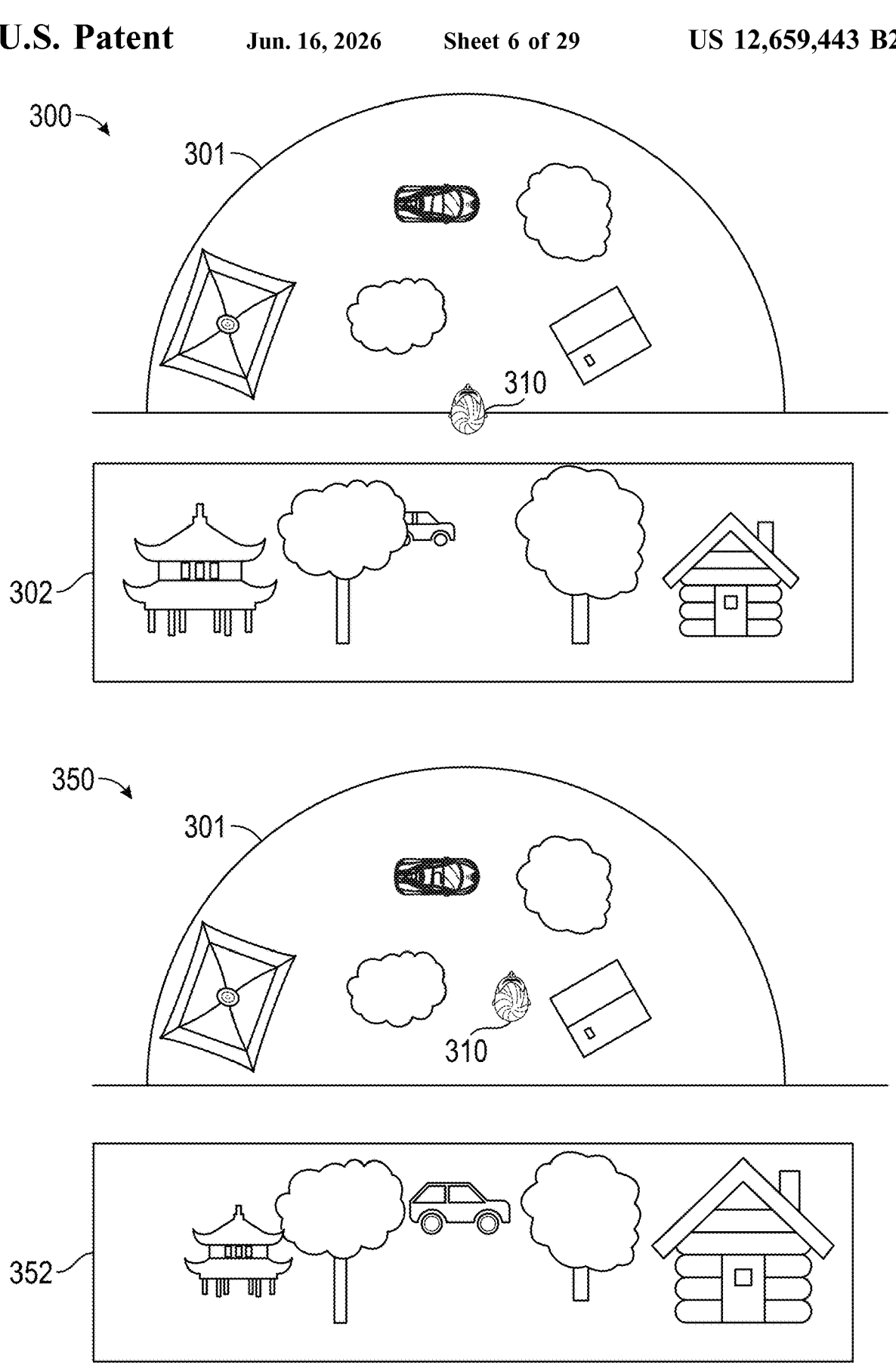
FIG. 3 shows a simplified illustration of spaces captured from two viewpoints, in accordance with some embodiments of this disclosure.

FIG. 3 shows a simplified illustration of spaces 301 captured from two viewpoints 300 and 350, in accordance with some embodiments of this disclosure. In the first viewpoint 300, a viewer 310 may view a space 301 from a first position. In the second viewpoint 350, a viewer 310 may view a space 301 from a second position. The images 302 and 352 may illustrate a corresponding panorama view (e.g., opened cylinder) of the first viewpoint 300 and the second viewpoint 350, respectively, with a size of the objects in the view changing corresponding to their distances to the viewer. For example, as a viewer 310 moves closer to the car from the first viewpoint 300 to the second viewpoint 350, a size of the car increases from the corresponding view 302 of the first viewpoint 300 to the corresponding view 352 of the second viewpoint 350. When a viewer changes a viewpoint, the changes in object positions and sizes may create a 3D motion parallax effect, giving information on 3D properties and relations of the objects.

Instead of the viewer 310 moving or changing position in space 301 as shown in FIG. 3, the viewer movement may be simulated by moving the scene (the "world") with respect to the viewer. However, even though objects in the world may move consistently (e.g., same amount to same direction, when a viewer changes position), the viewer 310 may perceive their movements and/or scales differently due to motion parallax. Correspondingly, a simplified view in 352 may be synthesized (e.g., by segmenting, moving, rotating, and scaling the objects of 301).

Using the laws of 3D geometry, changes corresponding to a viewer 310 moving in the scene, or dualistically the scene moving with respect to the viewer, may be synthesized/approximated from one view without capturing and transmitting another view. This above principle may be used in approaches for supporting 3D perception and interaction, both for easing up content production (e.g., animations in 2D) and for reducing the need for content delivery.

In some approaches, representation of moving objects may be based on their distance from a viewer or from a synthesized viewpoint. A view may be decomposed into image planes, layers, or surfaces (e.g., spheres) at different depths, which may then be moved with respect to each other to mimic viewpoint changes.

A real-world view may include light field generated by all light sources, scattered light, and reflected light in the 3D space. Multiple focal planes (MFPs) may approximate a light field from a viewer's eye-point or viewpoint by decomposing the view into additive transparent layers in the depth dimension. Luminance(s) of these layers may sum up pixel by pixel into a 2D projection of the view. If rendered at different distances in the space, MFPs may allow a viewer to accommodate or focus on and in between of these layers, and thus may have a better 3D perception than when seeing a 2D view on a flat display.

Figure 4A:
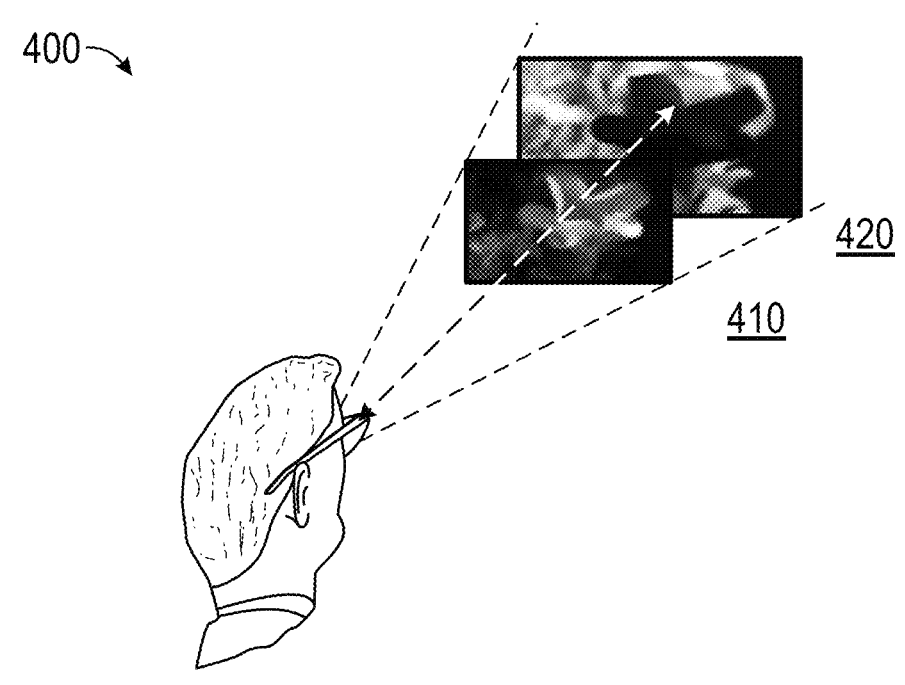
FIG. 4A shows an example of a viewer seeing the sum of luminance(s) of aligned MFPs, in accordance with some embodiments of this disclosure.

FIG. 4A shows an example 400 of a viewer seeing the sum of luminance(s) of aligned MFPs, in accordance with some embodiments of this disclosure. For example, a viewer may view a stack of two focal planes 410 and 420. While FIG. 4A illustrates an example of viewing two focal planes, a multiple focal plane (MFP) stack may have any suitable number of focal planes (e.g., 3, 4, 5 or more focal planes). Focal planes may be used to synthesize a high-quality stereoscopic viewpoint and binocular parallax by shifting and scaling MFPs. In some embodiments, focal planes may be transparent display elements. In some embodiments, different optical elements (e.g. spatial light modulators, lenses or mirrors) may be used in MFP displays to create the focal planes at desired distances from the viewer. MFP displays may support correct accommodation and convergence.

Figure 4B:
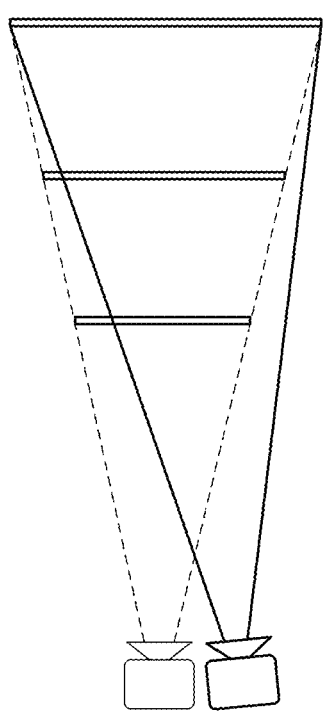
FIG. 4B shows an example of using a small focal plane shift to simulate motion parallax, in accordance with some embodiments of this disclosure.
Figure 4C:
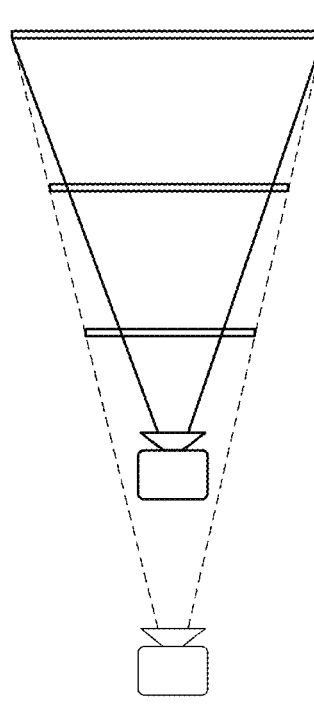
FIG. 4C shows another example of using a small focal plane shift to simulate motion parallax, in accordance with some embodiments of this disclosure.

In some approaches, focal planes may be used to synthesize a high-quality stereoscopic viewpoint and binocular parallax by slightly shifting and scaling MFPs. These approaches may be used to create small viewpoint change for simulating motion parallax as shown in FIGS. 4B and 4C. FIG. 4B shows an example of using a small focal plane shift to simulate motion parallax, in accordance with some embodiments of this disclosure. For example, in FIG. 4B a camera may shift to the side. FIG. 4C shows another example of using a small focal plane shift to simulate motion parallax, in accordance with some embodiments of this disclosure. For example, in FIG. 4C, a camera may shift closer.

Figure 5A:
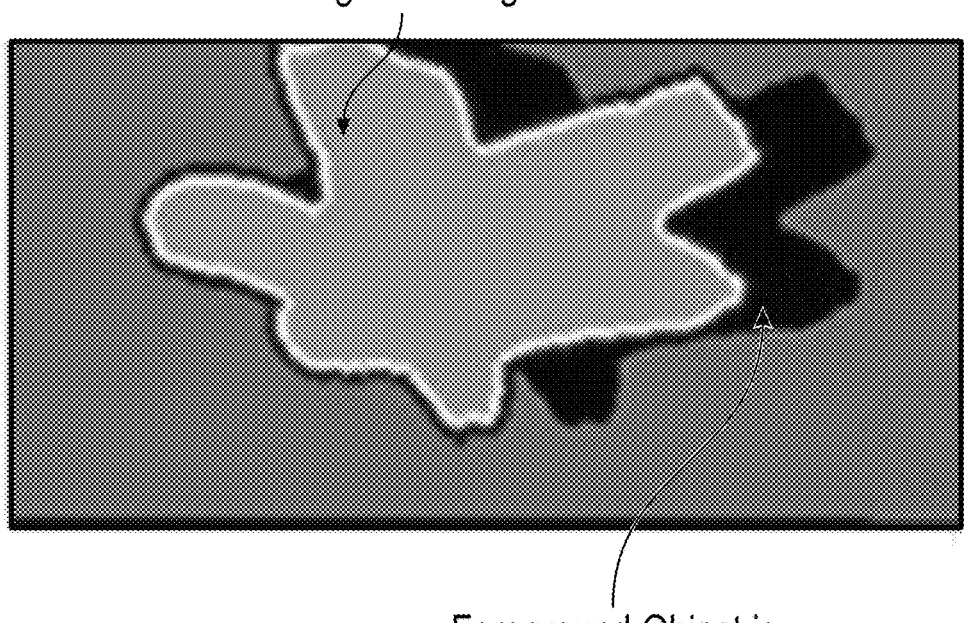
FIG. 5A shows an example of the effect of shifting two non-transparent 2D image planes, in accordance with some embodiments of this disclosure.
Figure 5B:
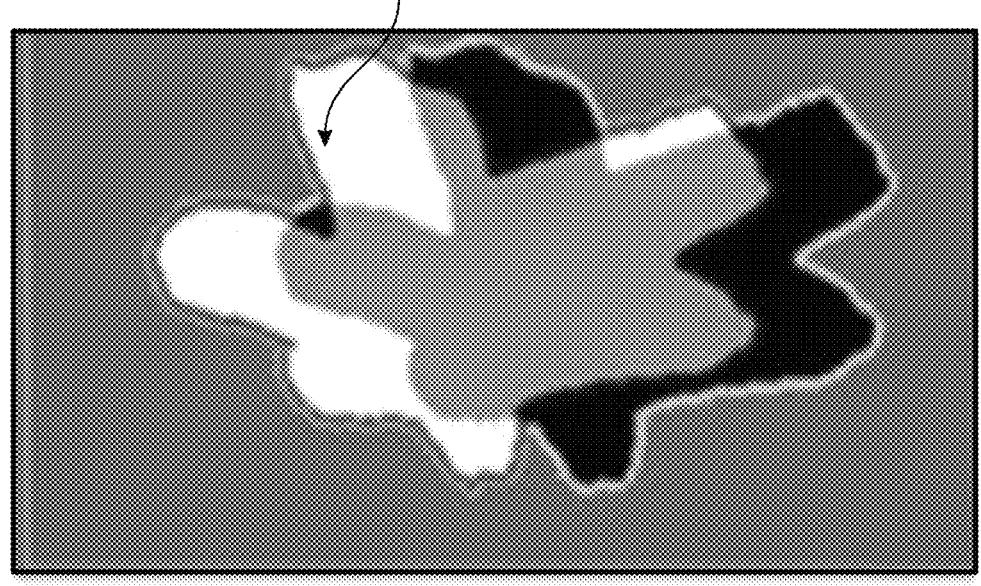
FIG. 5B shows an example of the effect of shifting two MFPs with transparency, in accordance with some embodiments of this disclosure.

FIG. 5A shows a schematic illustration for the effect of shifting two non-transparent or occluding 2D image planes, in accordance with some embodiments of this disclosure. FIG. 5B shows a schematic illustration for the effect of shifting two MFPs with transparency on overlapping areas (e.g., luminance(s) adding up), in accordance with some embodiments of this disclosure. In both FIGS. 5A-5B, disocclusions show up as black areas. For simplicity, the flower depicted in FIGS. 5A-5B is illustrated with reduced detail.

FIGS. 5A-5B illustrate two ways for approximating motion parallax, both of which may be based on moving 2D segments of a scene into a new configuration. For example, in FIGS. 5A-5B, the scene includes a flower over a background. FIG. 5A illustrates a focal object in front to occlude the layer behind. FIG. 5B illustrates a focal object in front that adds up MFP luminance(s) on overlapping areas. In FIG. 5B, focal planes are transparent, so when the focal plane for the flower is transferred sideways, areas where the luminance is overlapped add up and shows up brighter (e.g., lighter areas of FIG. 5B).

In some embodiments, both approaches may be used. Each approach may have different advantages or disadvantages. For example, larger motion parallax (e.g., larger object shifts) may be of higher quality when using occluding (non-transparent) objects (e.g., approaches illustrated in FIG. 5A). On the other hand, MFPs may produce less disocclusions when a synthesized motion parallax is small. Small MFP shifts may be used for synthesizing disparity for stereoscopic or accommodative 3D renderings. FIG. 5B may illustrate a problem of MFP transparency with large object shifts and may not show benefits of MFPs in synthesizing small viewpoint changes. For example, a problem may be smearing as a result of adding up of luminances, which may corrupt or lower the quality of the view.

Both approaches may be challenged by disocclusions (e.g., shown as black in FIGS. 5A-5B). Disocclusions may be mitigated at least partly by hole-filling and inpainting methods.

2D rendering approaches with motion parallax may support large viewpoint changes, but synthesized views may be prone to billboarding and flattening, as well as visible disocclusions. On the other hand, scene decompositions into multiple focal planes (MFPs) may support stereoscopic and 3D perception better (e.g., producing less disocclusions, and supporting accommodation), but may be limited in ability to support large viewpoint changes due to the additive nature ("transparency") of focal planes.

In some embodiments, approaches use non-transparent 2D billboards, enhanced by using transparent MFPs for supporting the perception of 3D shapes and focal distances. These approaches may better support motion parallax when synthesizing new viewpoints to a captured content. A parallax may depend on the distance of objects in a captured view. Correspondingly, knowledge of pixel distances or depth may be used both when forming non-transparent focal layers (e.g., video layers) or MFPs. However, when forming 2D video layers, the usage of pixel distances may be approximative, as pixels may be mapped to each nearest video layer (e.g., box filtering approach). Due to this discretization or quantization of depth information, small differences in pixel distances may be lost and objects may flatten, or the quantization may induce step-like structures and shears to object surfaces, when video layers are moved into a new configuration.

When forming MFPs, distance information may be used to blend pixel luminance(s) to neighboring focal planes. MFPs may preserve distance information, and a depth map may be reconstructed based on the ratios between focal plane luminance(s).

In some embodiments, the disclosed techniques captures depth from the scene. An example input to the approaches is a video plus depth signal (e.g., texture and depth map), for which both capturing and coding methods are available. The emergence of high-quality motion tracking may help enable this approach. High-quality motion tracking may be used to deduct a viewer's position and orientation relating his/her environment, and may provide content for which a new viewpoint with motion parallax and other 3D cues is synthesized.

The output from the disclosed techniques may be rendered for various displays. Motion parallax may improve the result with a monoscopic display. Better 3D support may be obtained with displays supporting stereoscopic (S3D) or accommodative rendering. Corresponding display options may include flat screens and near eye displays (NEDs) (e.g., glasses).

In some embodiments, a system captures and manipulate views. For example, both texture (e.g., color) and depth data (e.g., depth map) may be captured from a scene. For a live content, a sequence of such images may be captured. This format may be referred to as video plus depth (V+D) format for which efficient coding and transmission methods are available. Captured views may be wide views (e.g., 360 degree panoramas), enabling more freedom for viewpoint changes and user mobility.

In some embodiments of the approach, a single panorama camera captures a view. In some embodiments, a panorama camera may use a group of imaging sensors to various directions, from which the views are combined or stitched to a panorama. For each pixel of a panorama, the camera used may also capture the distance of the pixel. For example, there may be a depth sensor capturing distances to the corresponding visual view. Additionally or alternatively, the distances may be derived by triangularization from two or more visual views from differing viewpoints (e.g., slightly differing viewpoints).

The disclosed techniques may improve the quality when synthesizing a panorama capture for new viewpoints (e.g., virtual viewpoints). The synthesis may be desirable for various reasons. For example, the synthesis may reduce data to be transmitted, or may ease up content production in animation. Animation may be used for offline content production, or for real-time, interactive animation of scenes (e.g., during a computer game).

In some embodiments, a system segments captured views for objects. Captured views may be segmented for detecting separate objects in the view. Depth data and/or video data may be used for the segmentation. As both texture and depth may be captured from the same physical view, the correspondence between texture and depth data may be tracked and maintained. Thus, when segmenting a view, there may be a set of color pixels and known distances by the system for each of the segmented objects/image areas.

FIG. 6 depicts an illustration of segmenting a view by texture, depth, or both texture and depth, in accordance with some embodiments of this disclosure. The curve 601 inside images 600, 610, and 620 may be a cross section of a scene surface. The vertical axis may be the distance of a surface pixel in the scene, and the horizontal axis may be the horizontal position of the pixel.

Image 600 may illustrate a principle of segmenting a view for objects based on texture. In image 600, vertical lines illustrate borders of object or texture segments. For example, borders of object segments may be detected by a segmentation algorithm. Image 610 may illustrate a principle of segmenting a view for objects based on depth. In image 610, horizontal lines may indicate distances from a camera (e.g., a depth sensor). Image 620 may illustrate a principle of segmenting a view for objects based on both texture and depth. In image 620, both texture and depth are used for segmenting a view. When both texture and depth are used, the accuracy and consistency of segmented objects may be improved.

Texture and depth data may be associated and known for every captured point or voxel. When a scene is segmented and rearranged into a new configuration, pixel colors may follow the moving objects and may be known, except for disocclusions, and the depth data may be modified based on object movements in the geometry.

In some embodiments, a system forms a background panorama. After segmenting objects by their color and/or depth, a background panorama may be formed. For example, a system may combine distant image areas after removing or segmenting out foreground objects. Background may be assumed to reside at a zero-parallax distance. A zero-parallax distance may refer to such a long distance that the background's perspective remains unchanged with viewpoint changes, or moderate viewpoint changes. At the same time, closer objects may indicate motion parallax by changing their position and size.

In some embodiments, the system reduces holes and disocclusions. If one or a few cameras are used for data capture, removing foreground objects may result with holes. Holes may refer to areas where color or distance data has not been obtained. In some embodiments, a distinction is made between holes and disocclusions. Holes may refer to big non-luminous (e.g., black) holes produced by segmenting out objects while a disocclusions may refer to a narrow (e.g., non-luminous) stripe beside moved objects. Due to the different scale, approaches for reducing holes or disocclusions may be different. For example, holes and disocclusions may be reduced at different stages of the process.

Reducing holes may be referred to as "hole-filling," and reducing disocclusions may be referred to as "disocclusion removal." Both operations may be based on inpainting missing pixels or object areas with spatial interpolation and extrapolation methods. Various inpainting methods may be used for reducing the visibility of holes or disocclusions. These methods may include various interpolation and/or extrapolation methods for predicting missing color values due to a segmented out or repositioned/moved object.

Holes or discontinuities or gaps may be caused not from MFPs, but synthesizing a view from a new 3D viewpoint without data captured behind occluding objects. MFPs may be used to reduce the visibility of such gaps using depth blending (e.g., blending and/or filtering data in the depth dimension). A relatively small number of MFPs formed by depth blending may reduce and/or prevent discontinuities in depth perception. If stereoscopic or S3D rendering is used, the complexity for supporting rendering or display of the content may be low. As MFPs are shown simultaneously, viewing MFPs may not require eye tracking, and the eye can focus freely on or between MFPs due to depth blending. With simultaneous rendering, high frames per second (FPS) and flicker may be avoided in accommodative rendering.

In some embodiments, a system may capture several viewpoints or capture a viewpoint on-demand. Holes and disocclusions may be reduced by varying approaches for capturing a scene. In some embodiments, capturing a view by several sensors and viewpoints is one way to reduce holes and disocclusions. However, when transmitting captured data (e.g., in a video plus depth format), the capture may be restricted to one viewpoint at a time. In some embodiments, complying with a capture of one viewpoint at a time, the movements of a viewer may be delivered from the receiver to the transmitter that is equipped with a matrix of cameras for capturing a view from a detected viewpoint. The transmitter may capture a scene complying with the desired viewpoint and may encode and transmit the corresponding video plus depth data to the receiver. The result may be a panorama having less holes or disocclusions.

In some embodiments, a system manipulates captured views by moving objects on the background panorama. To support natural 3D motion parallax and/or different viewpoints (e.g., moving viewpoints), objects of the scene may be moved according to the laws for 3D geometry. Moving of objects may be made over a background panorama formed from the scene.

In a virtual reality (e.g., 3D) scene, projection of each voxel may be calculated independently when changing a viewpoint to the scene. In the disclosed techniques, the views may not be virtually generated, and they may not contain enough information for voxel-level transformations. Instead, volume segments may be assumed to retain their shape when moving, and after being moved, to keep their facade towards the new viewpoint. These approaches may compromise realism, but may avoid needing to capture data from object sides and in part may prevent shears and disocclusions when moving objects.

For a rigid volume segment, one 3D coordinate and a scaling factor may be used to describe simple movement. When making the segmentation, this coordinate may be defined. For example, the coordinate may be the center of gravity of the segment, or some other descriptive and unambiguous point.

Approximating a scene from a changed virtual viewpoint may comprise moving and scaling volume segments on a background panorama, so that the volume segments meet the new viewpoint by their positions and sizes. In some embodiments, a configuration in 3D geometry may refer to position and sizes of volume segments. However, the original perspectives of the captured segments may restrict the orientations that can be shown in a new configuration.

As illustrated by FIG. 6, objects may be segmented based on depth, color (pixel values), or both. Segmentation results may be unidentical for different cases, but a concern or condition for natural occlusions may remain the same. For example, closer surfaces and corresponding pixels may occlude or block surfaces and pixels that are farther behind. Correspondingly, in segmentation approaches, an approximation for a combined depth map or scene surface with realistic occlusions may be obtained. Using both color and depth or distance values may produce the most or a more accurate result.

When rendering 2D billboards or video frames in 3D, a 3D object may be presented either in a fixed pose in space or the object may be turned towards each changed viewpoint. The object as a fixed pose in space may be a stereoscopic screen seen from various directions. The object being turned towards each changed viewpoint may keep the same 3D facade of the object irrespective of the viewing direction. Both approaches may be simplifications and approximations, which may avoid the need of having information from the sides of objects available.

In some embodiments, a system forms a depth map after moving objects. As mentioned above, manipulating of object positions in a view may be associated with moving corresponding object pixels in spatial and depth dimensions (e.g., x, y, and z, correspondingly). For each manipulated depth map there may be a texture view complying with the changed object positions. Depth data may have a particularly relevant role in supporting motion parallax. At each time, object positions may be determined by using the knowledge on corresponding pixel distances.

Figure 7:
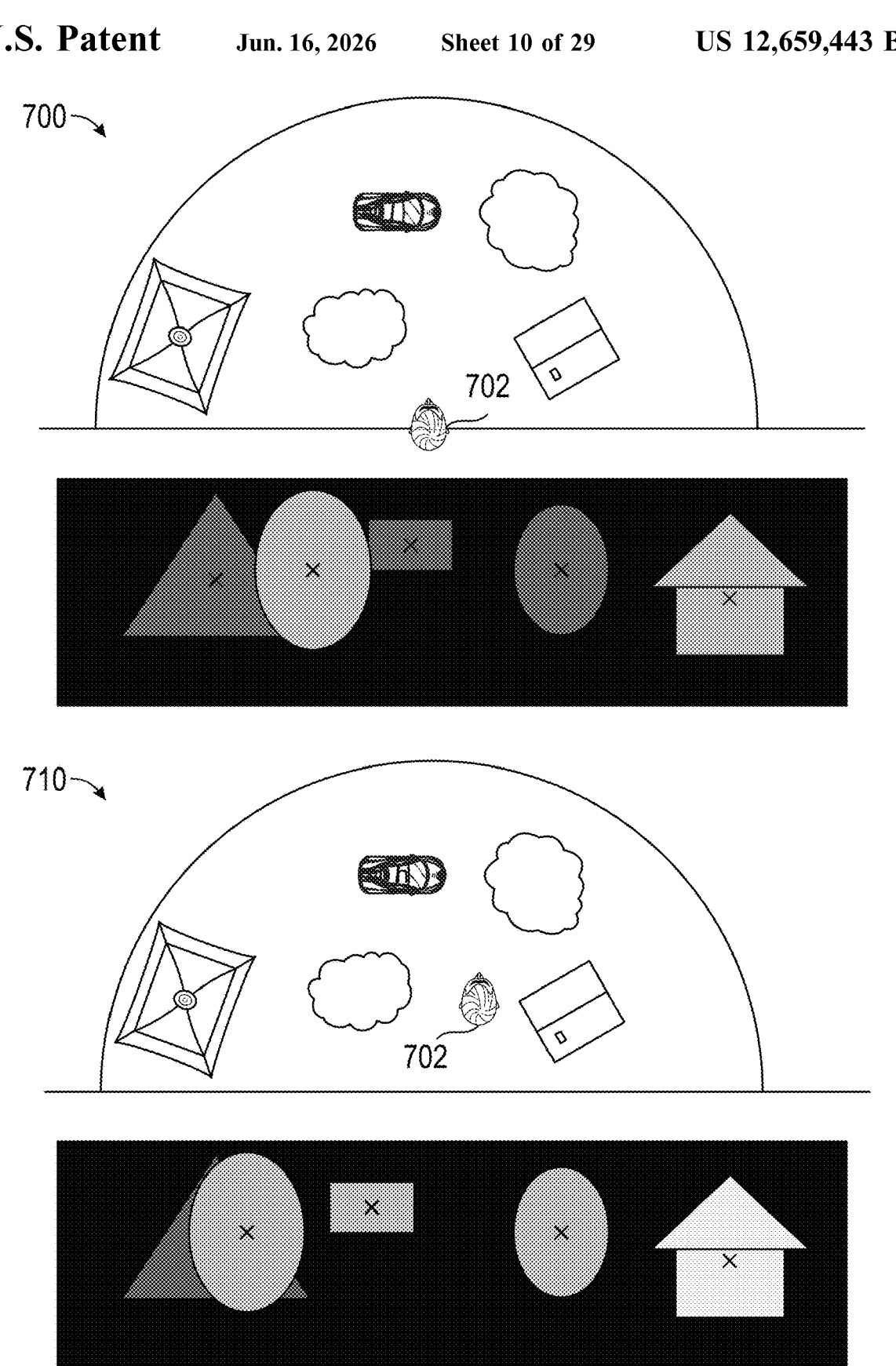
FIG. 7 shows an example of moving objects in a view to produce a changed viewpoint, in accordance with some embodiments of this disclosure.

FIG. 7 shows an example of moving objects in a view to produce a changed viewpoint, in accordance with some embodiments of this disclosure. The illustration shown in FIG. 7 may be made for depth data, although texture and depth data are associated and known for every captured point. In some embodiments, an illustration may be made for depth data and/or texture data. FIG. 7 may correspond to FIG. 3 and may illustrate moving extracted objects sideways, according to the laws of geometry, to meet a new user viewpoint. FIG. 7 may illustrate how depth maps are manipulated when moving objects. Object textures may be moved accordingly, based on a known (e.g., stored) link between the colors and distances of each object.

A depth map for each moving object may be obtained by moving the depth data corresponding the object, calculating its new distance from the chosen virtual viewpoint, and changing corresponding depth values accordingly. In some embodiments, texture/color components may be modified afterwards using the correspondences or link between depth and color values of objects/segments. Although luminance may be used in various embodiments of this disclosure, in alternative embodiments, any suitable color component or texture may be used, and other formats than RGB (e.g., YCbCr) can be used for representing color (texture) information.

Moving parts of depth maps by segments produces areas where there may be either 1) several overlapping depth values, or 2) disoccluded areas without captured depth values. In the first case, the closest depth value (and corresponding pixel color) may be used to comply with occlusions in the real-world. For the latter, depth values may be set, e.g., to a background depth value. For example, a zero parallax distance may be set to 15 meters.

The operation of occluding farther away pixels by the closest pixels in rendering may be supported by z-buffering. In more general, the operation relates to rendering with real-world occlusions, and may be referred to as "occlusion management".

Z-buffering may create correct occlusions. Z-buffering can be applied to a depth map segmented directly by its values or segmented indirectly by the object pixels in the image space. Z-buffering can also be applied to a depth map formed as the combination of texture and depth segmentations (e.g., for increasing the precision of the segmentation result). For example, FIG. 6 may show in 600 segmenting a depth map indirectly by pixel objects in image space, in 610 segmenting a depth map directly by its values, and in 620 segmenting a depth map as a combination of texture and depth segmentations.

In some embodiments, a system forms and uses focal planes (MFPs) based on the formed depth map. FIG. 7 illustrates depth maps for an original panorama view 700 and a synthesized panorama view 710. Whether original or synthesized, a depth map can be used to form a stack of multiple focal planes for supporting the formation and perception of high-quality 3D renderings. These renderings may improve 2D based scene synthesis by removing billboarding and flattening, and for supporting higher quality 3D perception.

Focal planes may be generated by depth blending, which may split or blend a pixel's luminance value to both the back residing and the front residing focal plane(s). The closer to a focal plane that a pixel is located, the bigger the value may be, and correspondingly the smaller the value may be, the farther the pixel resides from the focal plane.

The functions for calculating the blended values may vary, but the functions comply with the partition of unity property. The perceived luminance may be obtained as the sum of the corresponding blended pixel luminance(s) over all focal planes.

The number and positions of focal planes may vary. A higher number of focal planes may be used to produce better quality 3D perception (e.g., for 3D shape and/or accommodation), and smaller number of focal planes may be used to keep the corresponding image processing and rendering complexity lower. In some embodiments, a fixed separation distance between successive MFPs may be chosen. In some embodiments, the separation distance between focal planes may be varying and nonlinear. For example, separation distance may be dioptric, for complying with the human visual system.

In some embodiments, focal planes may be replaced by any focal shape or surface (e.g., cylinders, spheres, etc.). In some embodiments, depth blending uses texture and depth map data that is agnostic of the shape from which this data is projected. However, the used source geometry may affect to the result when shifting and/or scaling MFPs for perceiving motion parallax, disparity, or accommodation.

Using 2D view synthesis with support for 3D perception may be applied in various approaches. The options include but are not limited to the following:

In some embodiments, focal surfaces are a stack of MFP planes, which are shifted and scaled to synthesize small viewpoint changes for binocular parallax and/or for stereo-scopic (S3D) rendering, and/or to support natural accom-modation/eye focus.

In some embodiments, focal surfaces are panorama sur-faces of cylindrical or spherical surfaces, freeform shapes, or parts (segments) of such geometries.

In some embodiments, segmenting a view by its depth value is associated/linked to segmenting the view by its color values, and vice versa. For example, color and depth values and their positions in any segment may be known at all times by a system. If a segment's position is changed, the positions of corresponding pixels in the space may be known or can be deduced.

In some embodiments, depth maps of planar, spherical, cylindrical, freeform shapes, or crops of them are segmented based on color values of corresponding texture images.

In some embodiments, depth maps of planar, spherical, cylindrical, freeform shapes, or crops of them are segmented based on depth values of corresponding depth map pixels.

In some embodiments, each segment of a depth map and corresponding color values are moved to comply with a virtual new viewpoint. Moving may be based on one or more 3D coordinates of a segment and a scaling factor, together defining the position and size of the segment as seen from the new viewpoint.

In some embodiments, a moved 3D segment is presented in a fixed pose in space. This may cause the segment to warp like a stereoscopic screen seen from various directions.

These embodiments may be understood as a version for rendering 3D billboards (3D pictures or video frames) in 3D (e.g., in a virtual world).

In some embodiments, a moved 3D segment may be turned towards each changed viewpoint. For example, an object may keep the same 3D facade irrespective of the viewing direction. As a result, the 3D segment may not be warped.

In some embodiments for thin clients, user motions are delivered to the transmitter, which makes the segmentation and compilation to new configurations for coding and trans-mission. For example, this may free the receiver from corresponding computations, but may compromise quality of experience (QoE) by network delays.

In some embodiments for thin clients, the segmentation and compilation of objects is made in the transmitter, but the formation and shifting of MFPs is made in the receiver.

In some embodiments for thin clients, both the segmen-tation and compilation of objects, and the formation and shifting of MFPs are made in the transmitter.

In some embodiments using multi-camera capture, the movements of a viewer are delivered from the receiver back to the transmitter, which is equipped with a matrix of cameras for capturing a view from a detected viewpoint. The transmitter may capture the scene complying with the desired viewpoint and may encode and transmit correspond-ing video plus depth data to the receiver. The result may be a panorama content having less holes or disocclusions.

In a multi-camera embodiment, the segmentation and compilation of objects is made in the transmitter, but the formation and shifting of MFPs is made in the receiver.

In a multi-camera embodiment, both the segmentation and compilation of objects, and the formation and shifting of MFPs are made in the transmitter.

In some embodiments for forming a more consistent background panorama, a background prediction is used that collects still pixels/areas of a scene while foreground objects may be moving. By upkeeping a prediction of a still background, the amount and occurrences of holes and disocclu-sions may be reduced in the disclosed techniques.

In some embodiments, a transmitter is described to cap-ture texture and depth data only from one camera viewpoint. However, in other embodiments, there may be a set of cameras capturing a view from several viewpoints to capture more complete data, e.g., to reduce possible disocclusions when synthesizing new viewpoints.

Examples of use cases may include various immersive content delivery cases using motion interaction (e.g., enhanced 360 degrees panoramas, telepresence renderings, AR/MR renderings, computer games, etc.). An example specific use case may be an enhanced virtual window, mimicking a real world window on a large flat screen.

Benefits of the disclosed techniques may be support for advanced 3D cues, including motion parallax, perception of 3D objects in high quality, and even natural eye focus. In one example, the disclosed techniques may capture only one panorama with corresponding pixel distances which makes content production and delivery straightforward, but may be more sensitive to discocclusions than a multi-camera approach.

In some embodiments, stereoscopic (S3D) glasses may be used for rendering (e.g., 3D support without supporting accommodation). In some embodiments, MFP rendering is used without using accommodative glasses and DIBR/3D warping is used instead of stereoscopic/parallax synthesis.

Layered Focal Planes Approach

In the real world, a person may freely navigate in a space and view details and surfaces from practically any possible direction. In 3D captured spaces, the ability to support such freedom may be limited by the difficulties of capturing 3D spaces in high detail, as well as coding and delivering the large amounts of data being produced.

In some approaches, mimicking natural, real-world like viewing may use simplifications and approximations, which may lose relevant cues for natural perception, and may unduly increase the complexity of approaches.

When viewing 3D objects on a display device, there may be multiple factors that help the viewer to perceive 3D information (e.g., the distance or depth of an object from the viewer). One factor or depth cue may be a size of the object. For example, nearby objects may seem to be bigger. Another depth cue may be occlusion. For example, nearby objects may occlude objects that are far away. A third depth cue may be motion parallax. For example, nearby objects may seem to move faster than objects that are far away (e.g., when the viewer is moving).

These depth cues may be implemented in a 2D rendering of the 3D scene. These depth cues may allow simulation of new 3D viewpoints, without calculating or sending any new 3D information. These approaches of using 2D rendering of the 3D scene may reduce the need for transmitting data, and enable content interactions based on user motions (e.g., simulating 3D navigation in a 2D view).

Figure 8:
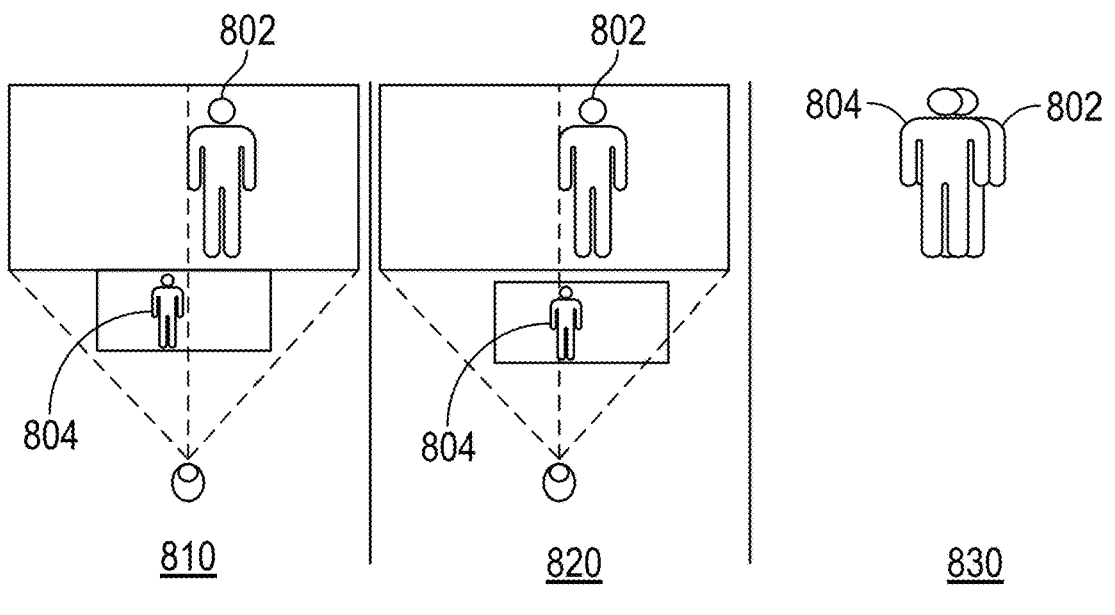
FIG. 8 shows an example of a viewpoint change that is simulated by moving layers with respect to the viewpoint, in accordance with some embodiments of this disclosure.

A viewpoint change may be simulated by moving layers with respect to a viewpoint. FIG. 8 shows an example viewpoint change that is simulated by moving layers with respect to the viewpoint, in accordance with some embodi-ments of this disclosure. For example, the nearer layer may be shown as shifted to the right. At 810, the viewer may see the FIGS. 802 and 804 positioned in the two layers that have transparent background side by side. At 820, when moving the nearer layer to the right, the FIGS. 802 and 804 may seem to be moved as if the viewer has moved into a new viewpoint. A view based on the simulated viewpoint change of 820 may be shown at 830. Because the figures are opaque, when the nearer FIG. 804 moves it may occlude the farther away FIG. 802. The simulated viewpoint change of FIG. 8 may fulfill the use of two depth cues: occlusion and motion parallax. Eye point change in a depth direction may be simulated by scaling the size of the layers.

There may be limitations to using of 2D views with motion parallax to enable perception of 3D shapes. For example, when segmented 2D objects are moved and scaled to different configurations, a viewer may notice flattening or billboarding. Another challenge is avoiding disocclusions. Disocclusions may refer to revealing areas where information has not been captured. To avoid disocclusions, some approaches may be to combine multiple camera views, extrapolation, and/or filtering (e.g., inpainting).

Figure 9:
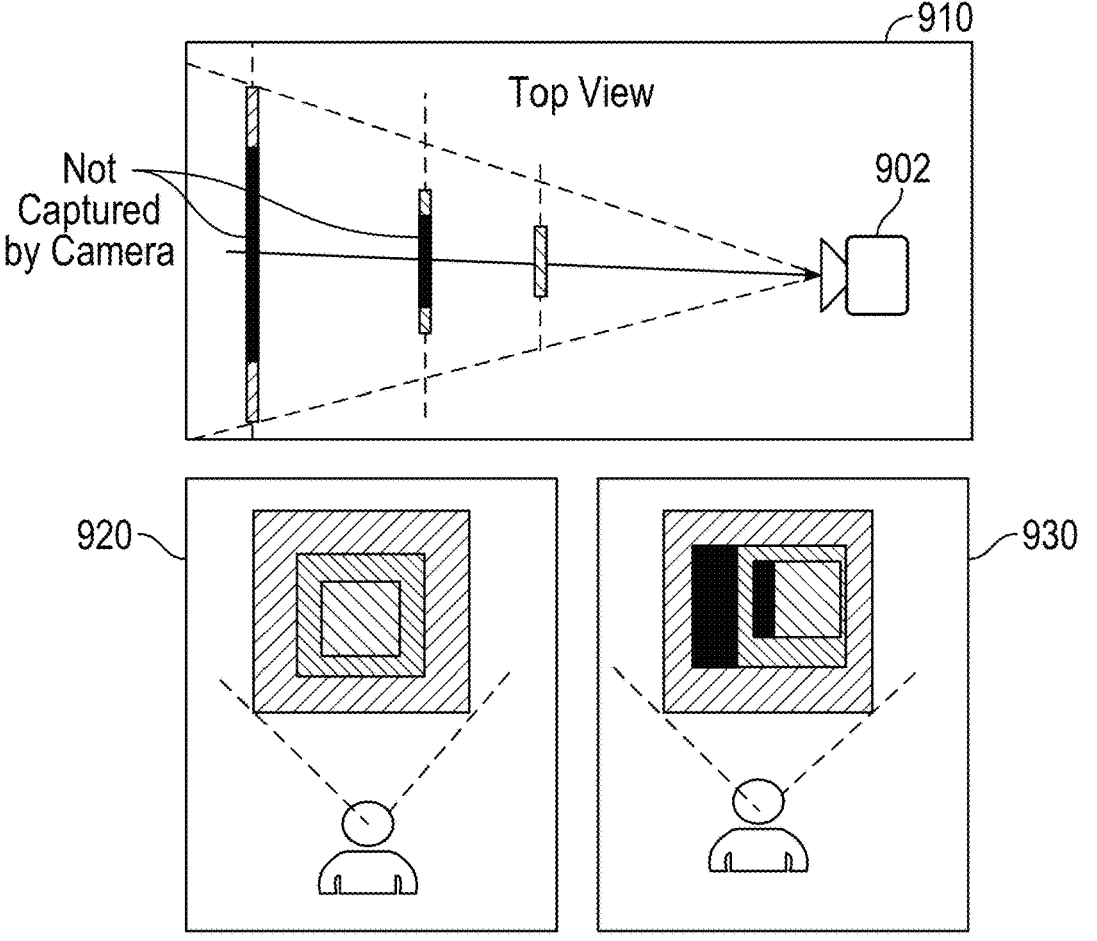
FIG. 9 shows an example of revealing areas not captured by camera when simulating eyepoint movement, in accordance with some embodiments of this disclosure.

FIG. 9 shows how areas not captured by a camera 902 are revealed when simulating the eyepoint or viewpoint movement from 920 to 930, in accordance with some embodiments of this disclosure. For example, the simulation of the viewpoint movement from 920 to 930 may be performed by translating layers. A viewpoint at 920 may be similar or the same as a camera viewpoint with no disocclusions. A simulated viewpoint movement at 930 may reveal areas not captured by a camera 902 as shown in the top view at 910 and revealed in 930.

Two depth cues when simulating 3D navigation in 2D may be convergence (vergence) and accommodation. When a viewer tries to focus on distant objects, eye muscles may change a focal length of an eye lens. A brain of a viewer may use muscle response to interpret distance and depth of an object being viewed. In a stereoscopic display, two eyeballs may focus on the same object, and in doing so converge, which may be used to interpret the depth. An example of a stereoscopic display may be a near-eye-display (NED). Convergence may be used in NEDs, but supporting natural accommodation may not, so a focus of a viewer may be fixed on the display despite of real object distances.

Thus, there is a need to enhance 2D rendering approaches with better support for perceiving 3D shapes. It would be desirable for approaches to support occlusions, motion parallax, accommodation, and convergence, while suffering from as few disocclusions as possible. The ability for approaches to better support perceiving 3D shapes may depend on the scene or content type, as well as on a capture or camera set-up used to capture a 3D scene.

Figure 10:
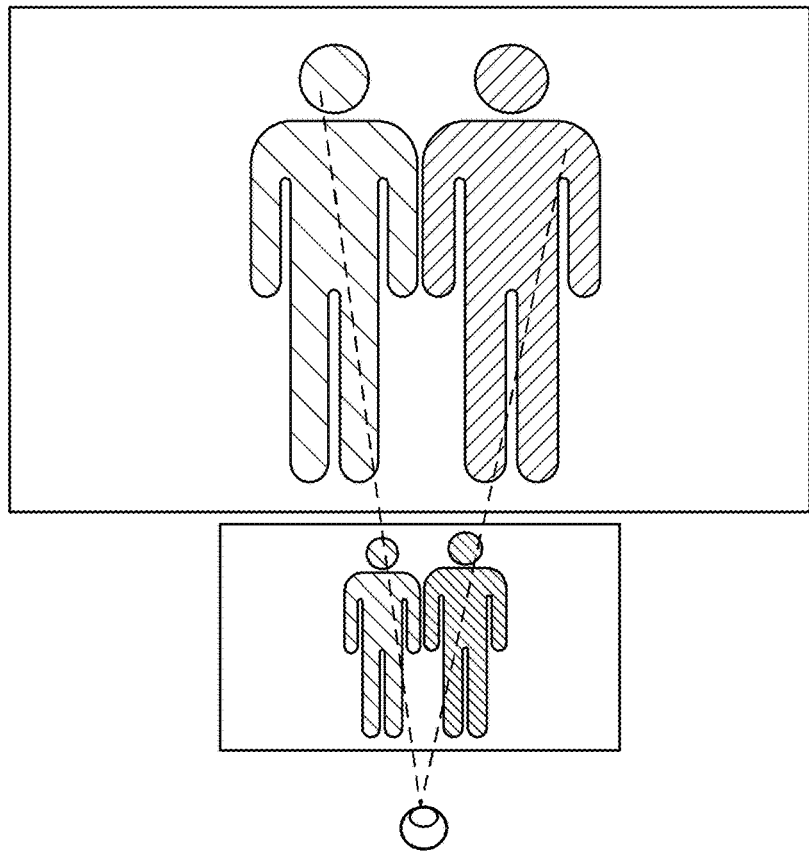
FIG. 10 shows an example of light rays from the focal planes to the viewpoint, in accordance with some embodiments of this disclosure.

FIG. 10 shows an example of light rays from focal planes to a viewpoint, in accordance with some embodiments of this disclosure. The luminance of the focal planes may sum up correctly pixel by pixel, and pixel colors of the focal planes may coincide pixel by pixel.

Figure 11:
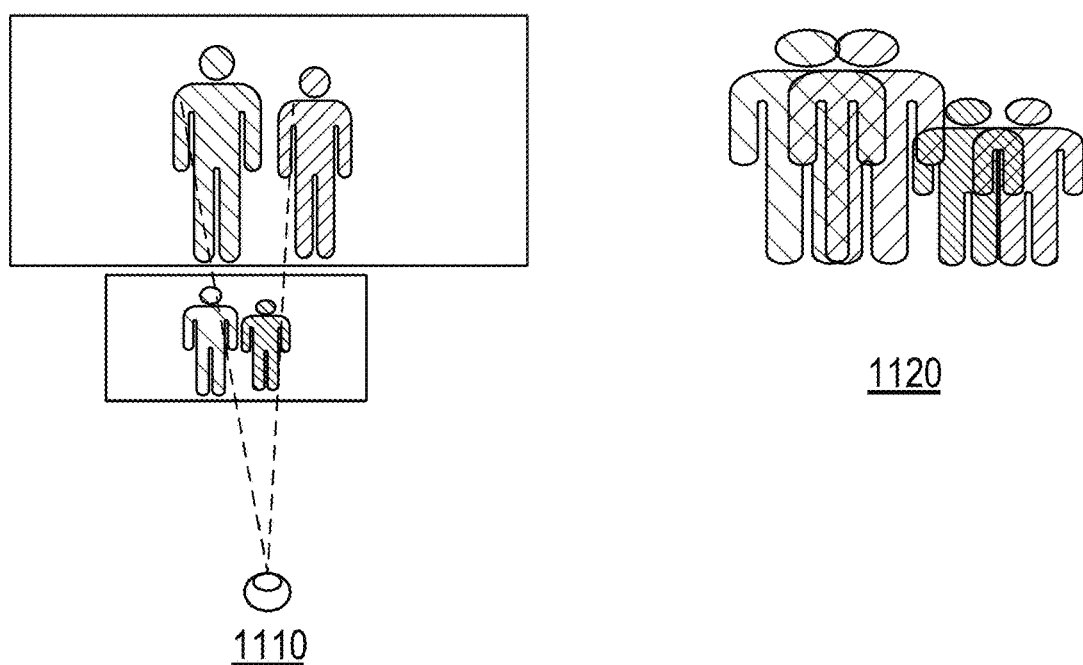
FIG. 11 shows an example of a problem of shifting focal planes for simulating viewpoint changes, in accordance with some embodiments of this disclosure.

FIG. 11 shows an example of a problem of shifting focal planes for simulating viewpoint changes, in accordance with some embodiments of this disclosure. Small focal plane shifts may be used to simulate motion parallax. However, focal plane shifting may not be used when simulating larger motion parallax. If focal plane shifting is used to simulate viewpoint changes, focal planes may not coincide pixel by pixel from the new viewpoint. Because additive planes are transparent, a viewer does not perceive motion parallax, but instead sees a corrupted image. In FIG. 11, an example of this problem is shown, where a nearer focal plane is shifted left in 1110 and a corrupted image is shown in 1120.

In some approaches for an MFP display, all virtual information may be rendered on a display plane whose focal depth is closest to the depth of the virtual information. This may cause a discontinuity of depth within viewed content when a user views side-by-side objects rendered on different depth planes. In some approaches, depth-blending algorithms may vary the intensity or luminance of rendered pixels according to a virtual object's depth and a focal plane depth.

In some approaches that use pixel depths, MFPs capture depth of the 3D scene. An input may be a video plus depth data (texture and depth map), for which both capturing (e.g. RGBD cameras) and coding methods are available. High-quality motion tracking techniques may help enable viewpoint simulation. High-quality motion tracking techniques may deduce a viewer's position and orientation relating his/her environment, and the content for which a new viewpoint with motion parallax and other 3D cues is synthesized. Various approaches for position tracking may include both outside-in approaches using devices tracking from outside of a viewer and inside-out approaches using devices carried by the viewer.

The output of the disclosed techniques may be rendered for various displays. Motion parallax may improve the result with a monoscopic display, but better 3D support may be obtained with displays supporting stereoscopic (S3D) or accommodative rendering. Corresponding display options may include flat screens and near eye displays (NEDs) (e.g., glasses).

In some embodiments, 3D scene capture is used. A 3D scene may be captured using depth cameras that provide both depth and color data as the output in real-time. Depth information may be represented as a depth map, which may be created by a 3D depth sensor, such as a pair of cameras or a time-of-flight (ToF) sensor. An RGBD camera (or any suitable texture and depth sensor) output may be processed to enable a pixel-to-pixel merging of color data and depth information to deliver both in a single frame. There may be other methods than using cameras for capturing a 3D scene, such as reconstructing 3D information from a single camera image frame. Any suitable method that can create pixel-by-pixel color and depth data may be used. Although color/depth cameras may be referred to as RGBD cameras, other formats than RGB (e.g., YCbCr) can be used for representing color (texture) information.

In some embodiments, an RGBD camera output is stored as a texture image and a depth map. A depth map may be represented as an image where each pixel value corresponds to the depth (distance of the surface of scene object) measured from the camera. One RGBD camera may produce one texture image/depth map pair. However, there may also be specific depth map representations. For example, a depth map representation may be a layered depth image (LDI), in which multiple depths may exist for a single line of sight, allowing storing texture/depth values even on surfaces that are occluded from camera viewpoint. In some embodiments LDI may be used instead of multiple depth maps when manipulating layered texture/depth data.

Depth maps may be stored as 8 bit images where 256 different values can be represented. However, cameras may use more bits for storing depth maps, allowing for better accuracy, and the representations may contain control bits that can be used to store other pixel-by-pixel information than just depth.

In some embodiments, a 3D scene may be captured so that it allows layering the scene into parallel layers in depth direction so that as few scene objects as possible belong to two layers. Optimal layer division may be estimated by a user of the capture set-up, or may be automatically estimated by a system from the depth camera data.

The 3D scene geometry may affect how well the layering can be made. FIG. 12 shows an example of 3D scene layering, in accordance with some embodiments of this disclosure. At 1210, an RGBD camera 1212 may be pointed to a scene including objects 1214, 1216, and 1218. A scene layering may have a scene geometry in which each object 1214, 1216, and 1218 can each correspond to a layer 1, layer 2, and layer 3, respectively. At 1220, an RGBD camera 1222 may be pointed to a scene including objects 1224, 1226, and 1228. The configuration of objects 1224, 1226, and 1228 may be problematic for 3D scene layering. The example at 1220 includes objects 1224, 1226, and 1228, in which one object 1226 occupies most of the 3D scene in depth direction.

FIG. 13 shows an example of a schematic of a first capture setup variation, in accordance with some embodiments of this disclosure. In FIG. 13, one RGBD camera 1312 can be used for capturing the whole scene including objects 1314, 1316, and 1318 from one shooting angle. This capture method may result in one texture and depth presentation, and may be simple to implement. However, because the scene objects occlude each other, this capture method may produce disocclusions where no texture or depth values are captured behind scene objects.

FIG. 14 shows an example of a schematic of a second capture setup variation, in accordance with some embodiments of this disclosure. In FIG. 14, texture and depth is captured separately for each predefined layer using one or more RGBD cameras 1412 from a fixed viewpoint(s) and set(s) of camera parameters. For example, each layer may be filmed at different times and the objects of the other layers may be removed. For example, when object 1418 is filmed at a first time, objects 1416 and 1414 may be removed. When object 1416 is filmed at a second time, objects 1418 and 1414 may be removed. When object 1414 is filmed at a third time, objects 1418 and 1416 may be removed. This may correspond to filming a person in front of a solid color screen in a movie production, where the background is filmed separately. Each layer's texture/depth images may be programmatically manipulated so that only objects belonging the corresponding layer are captured (e.g. background removed). This method may produce less disocclusions than the previous variation of FIG. 13. This capture method may result in one texture/depth image for each layer that may have the same amount of pixels.

Figure 15:
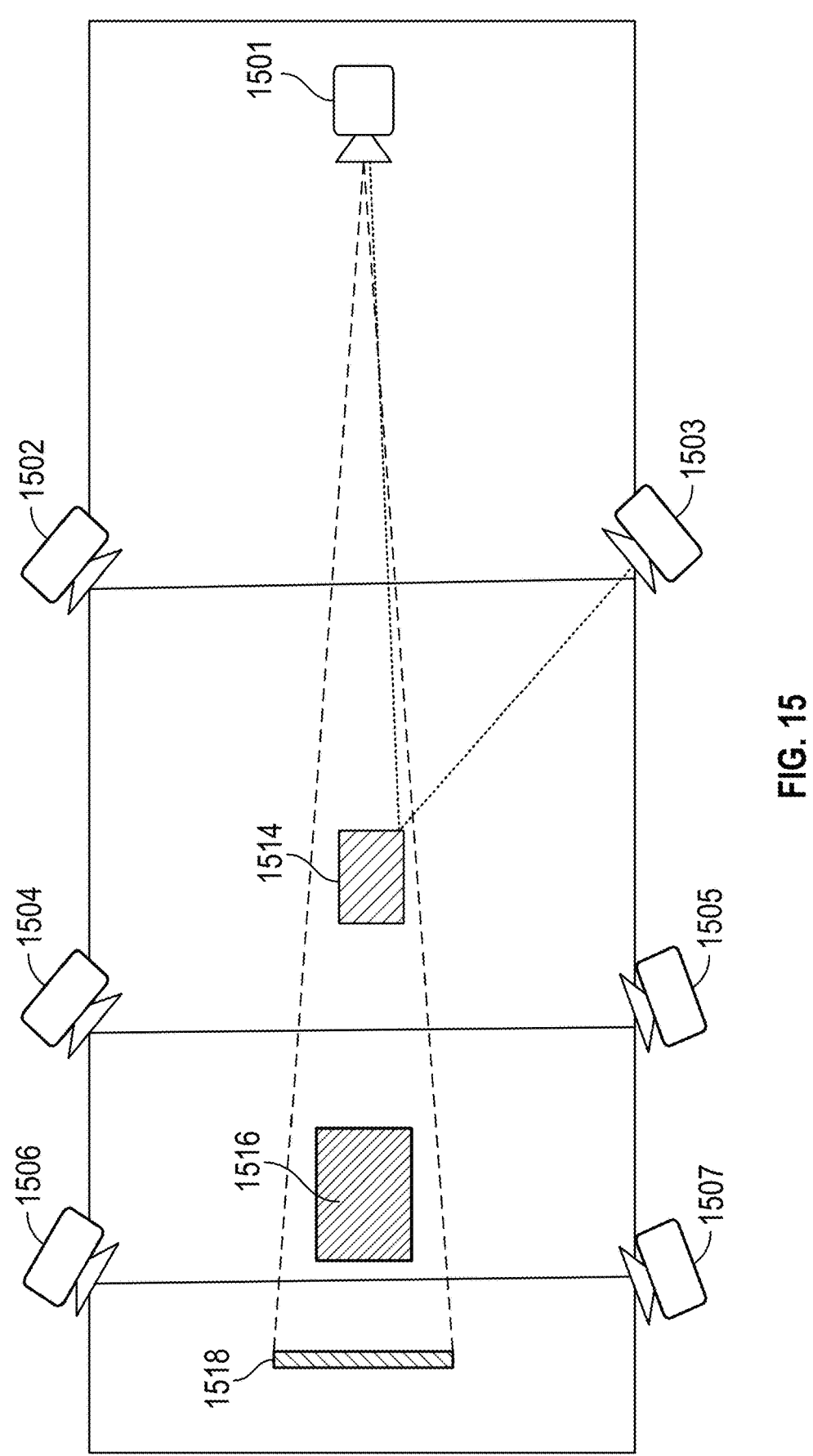
FIG. 15 shows an example of a schematic of a third capture setup variation, in accordance with some embodiments of this disclosure.

FIG. 15 shows an example of a schematic of a third capture setup variation, in accordance with some embodiments of this disclosure. In FIG. 15, texture and depth may be captured with multiple RGBD cameras 1502, 1503, 1504, 1505, 1506, and 1507 for each layer, in predefined positions. FIG. 15 may show a virtual RGBD camera 1501. The scene in FIG. 15 may include objects 1518, 1516, and 1514. The depth of a point on a scene object's surface can be estimated if the point is visible by at least two cameras. For example, depth of a point a scene object surface 1518 may be visible from cameras 1506 and 1507, depth of a point on a scene object surface 1516 may be visible from cameras 1504 and 1505, and depth of a point on a scene object surface 1514 may be visible from cameras 1502 and 1503. For the remaining occluded pixels, the depth may not be measured but may be interpolated or extrapolated. Because the camera positions are known, the texture/depth from the virtual RGBD camera 1501 shooting direction can be computed. There may be also real RGBD camera shooting from the virtual camera position to maximize or increase the quality of the computed depth/texture values. This capture variation may result in one texture/depth image for each layer that each have the same amount of pixels, from the same (virtual)

RGBD camera shooting direction. This method may produce less disocclusions than the previous variation of FIG. 14.

In another variation, pure virtual 3D content may be used as input. In this variation, the whole capture set-up may be replaced by 3D geometry computations, meaning that the number of disocclusions can be minimized or reduced. This capture method variation results in one texture/depth image for each layer that may each have the same amount of pixels, from the same (virtual) RGBD camera shooting direction. However, it may require a complete 3D model of the scene.

In some embodiments, RGBD cameras may be moved around the scene to get optimal shooting directions.

In some embodiments, a system may analyze a scene that was previously captured. The system may generate a set of layered texture and depth presentations based on the captured result.

Figure 16:
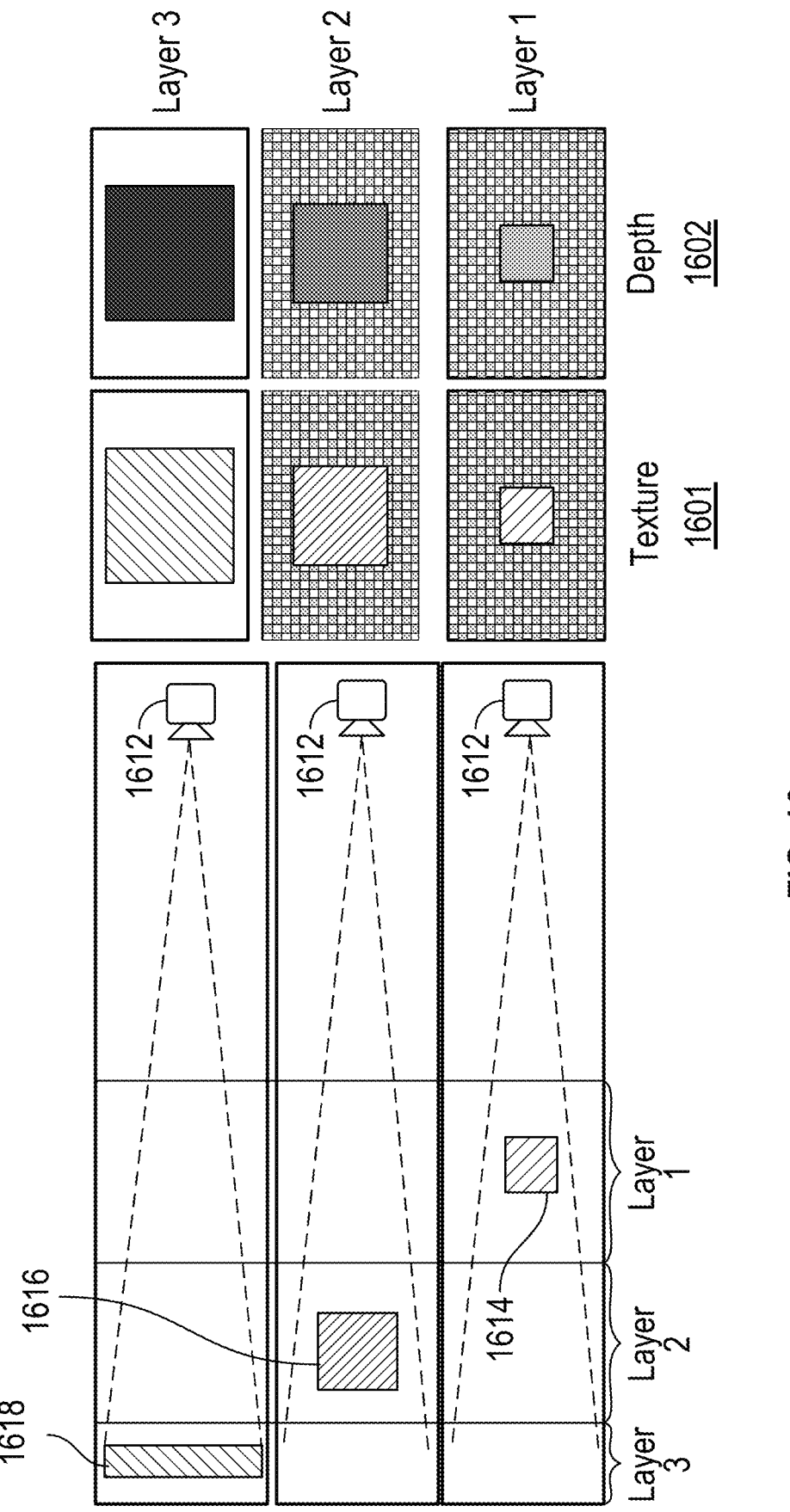
FIG. 16 shows an example of dividing depth maps into layers, in accordance with some embodiments of this disclosure.

FIG. 16 shows an example of dividing depth maps into layers, in accordance with some embodiments of this disclosure. In some embodiments, the camera 1612 and objects 1614, 1616, and 1618 of FIG. 16 correspond to (e.g., is similar to, the same as) the camera 1412 and objects 1414, 1416, and 1418 of FIG. 14, respectively. If the captured scene is several texture/depth images from one camera shooting direction, the system can divide the data into several texture/depth images, one for each predefined layer. In the depth maps shown in the rightmost column 1602 of the FIG. 16, a darker shade refers to larger distance.

Because each layer has a predefined maximum and minimum depth, the captured depth map data can be used to select texture/depth image pixels that fall within those limits. A system may mark blank pixels whose depth does not fall within the limits in the resulting layer texture/depth map image. This kind of "blank" information may not be included in standard data formats, but it can be stored similarly as several image formats store transparency information for each pixel. For example, the "blank" information may be stored using an alpha channel that stores transparency information for each pixel, or by using additional control bits for pixels representation like some RGBD camera data formats. In some variations, the system may use a different method for storing the disoccluded pixels and those pixels that are out of a layer's depth range.

In the texture images in column 1601 and depth maps in column 1602 of FIG. 16, the chessboard pattern refers to blank areas. In FIG. 16, the last layer may have color/depth data for all the pixels, because the background objects behind the last focal plane are blended to the last focal plane.

If the capture result is one texture/depth image, those texture/depth image pixels whose depth does fall within the layer limits may be selected for the texture image and depth map of that layer. Pixels outside layer limits and pixels without texture information (disocclusions) may be marked blank.

Figures 17, 18:
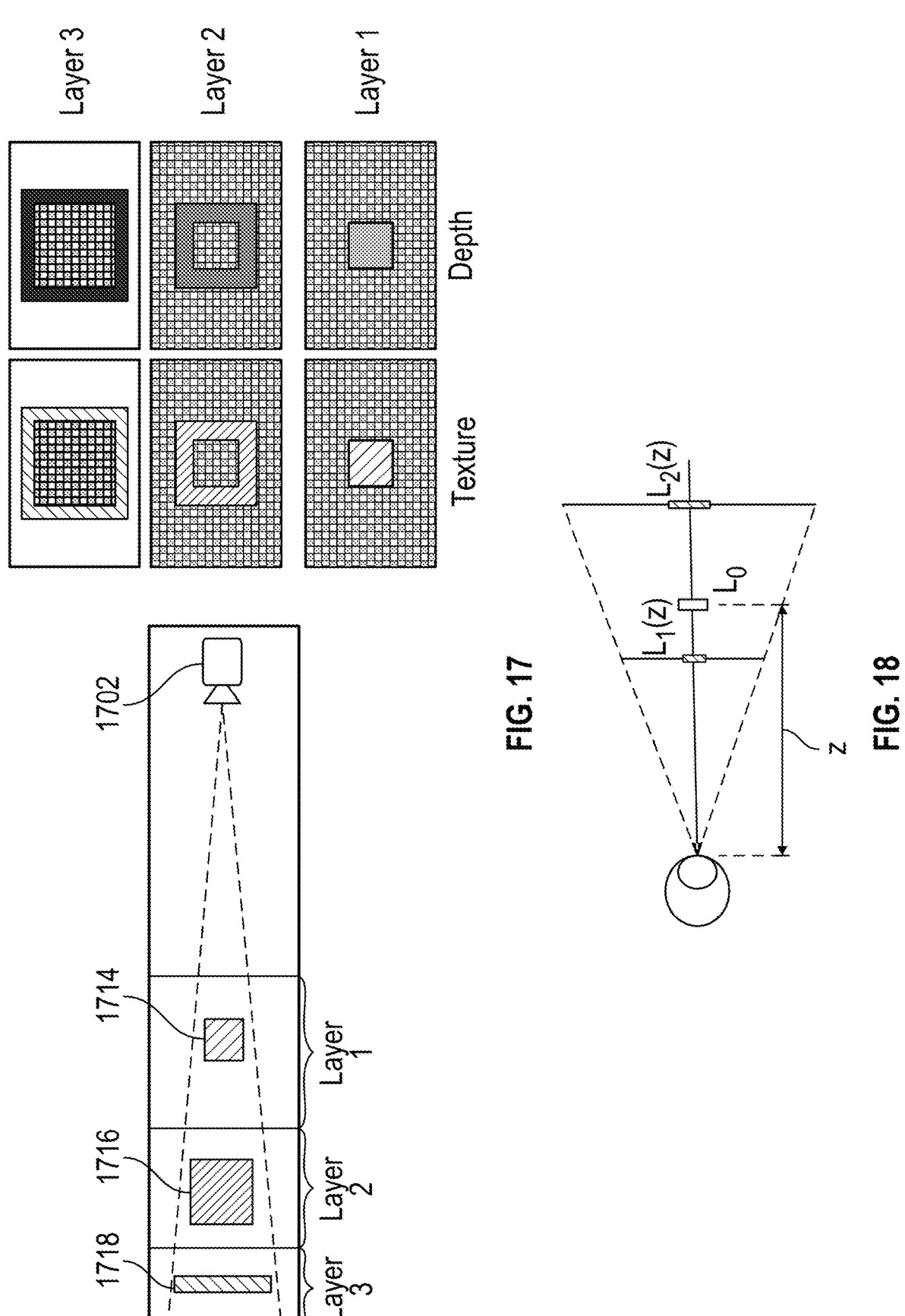
FIG. 17 shows another example of dividing depth maps into layers, in accordance with some embodiments of this disclosure.
FIG. 18 shows a principle of forming focal planes L1 and L2 by depth blending, in accordance with some embodiments of this disclosure.

FIG. 17 shows another example of dividing depth maps into layers, in accordance with some embodiments of this disclosure. In some embodiments, the camera 1702 and objects 1714, 1716, and 1718 of FIG. 17 correspond to (e.g., is similar to, the same as) the camera 1312 and objects 1314, 1316, and 1318 of FIG. 13, respectively. If only one camera is used at one time for a capture (e.g., in FIG. 17), more disocclusions may be present, and may require more work in a hole filling step. Result of this step may be a set of texture/depth images that each contain information of only one layer. In the depth maps shown in FIG. 17 (and in other embodiments of this disclosure), a darker shade may refer to larger distance, and in the texture image and depth maps shown in FIG. 17, the chessboard pattern may refer to blank areas.

In some embodiments, multiple focal planes (MFPs) are generated using depth blending. Depth blending may be an approach for generating a stack of transparent focal planes. Light emitting MFPs may be used, and each pixel value may correspond to a set of additive luminance components, which allow a viewer to focus or accommodate in between of the planes, and thus create an illusion for continuous 3D depth perception. In the following, depth blending to two adjacent focal planes may be described in detail, but more than two focal planes may be used.

FIG. 18 shows a principle of forming focal planes $L_1$ and $L_2$ by depth blending, in accordance with some embodiments of this disclosure. In FIG. 18, when two pixels on two adjacent focal planes overlap along the line of sight, they may be perceived as a fused, single-depth pixel. Pixel luminance values on the two focal planes may be weighted according to the ratio of distances from the rendered pixel to each focal plane. By changing the luminance ratio between the two pixels on different focal planes, a viewer's eyes may accommodate between the two focal planes even though there is not a physical pixel. When the weights or blending functions are chosen so that all the pixel luminance values sum to one, the luminance of the scene object may remain unchanged at all rendered distances.

Depth blending between the two focal planes can be made using the Equation 1:

$$L_0 = L_1(z) + L_2(z) = w_1(z)L_0 + w_2(z)L_0, \qquad \text{Equation 1}$$

where $w_1$ and $w_2$ are depth-weighted blending functions, $L_0$ is luminance value of a pixel at depth z and $L_i(z) = w_i(z)L_0$ is the pixel luminance value on $i^{th}$ focal plane. Blending functions $w_i$ may be chosen so that sum of blending function values $w_i(z)$ for the planes i . . . n_of_planes is 1 (partition of unity). Pixels at focal planes $L_1$ and $L_2$ may be perceived as a fused pixel at $L_0$.

Layered focal planes may be focal planes that are formed independently for each depth layer. Layered focal planes may have qualities of focal planes. For example, layered focal planes may enable eyes of a user to accommodate at any depth. Layered focal planes can be transformed without corrupting the fused image if following approaches described in this disclosure which allows the simulation of viewpoint change.

Within each depth layer, any number of focal planes may be generated. The examples in this disclosure may describe use of two focal planes (e.g., front and back planes). However, any suitable number of focal planes may be used (e.g., 3, 4, 5 or more focal planes). Implementation constraints of the display technology may require that as few focal planes as possible are used.

Figure 19:
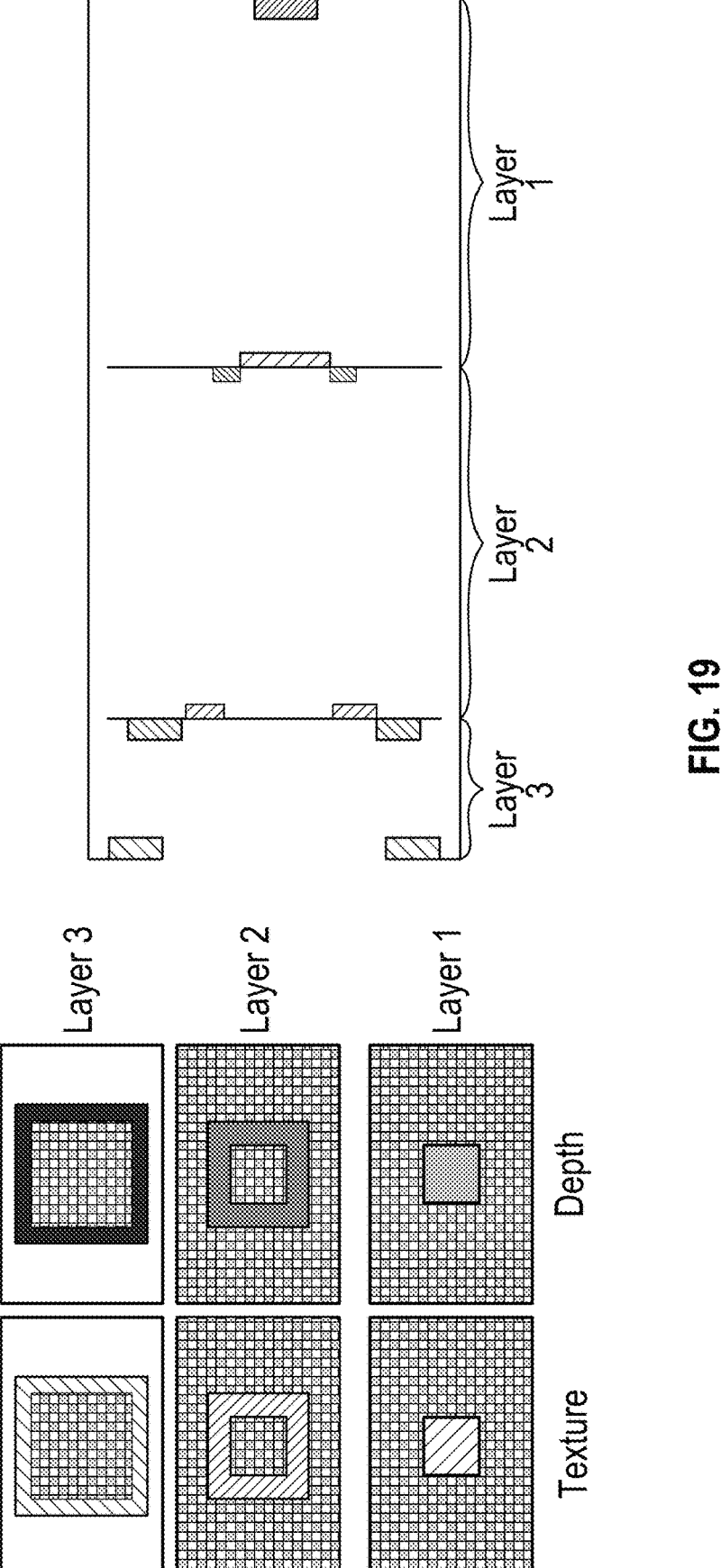
FIG. 19 shows an example of generating layered focal planes, in accordance with some embodiments of this disclosure.

Depth blending may be used to calculate back and front focal planes for each layer using texture and depth of each layer as input, with Equation 1. For example, a system may generate focal planes for each layer by using depth blending applied to the texture and depth of each layer. In addition to this focal plane generation method, additional operations may be used to avoid corrupted pictures. With focal planes, on each line of sight from the viewer's eye point, there may be only one texture/depth value to be blended. However, when using layered focal planes, the depth layers may have several texture/depth values on the same line of sight, each on a different depth layer. FIG. 19 shows an example how textures and depth maps of each layer may be blended to the layered focal planes. In the focal plane images as shown on the right side of FIG. 19 (and in other embodiments of the disclosure), different patterns of the pixels on the focal planes may illustrate different luminance values after the blending operation. The color values of what is represented by the different patterns of pixels as shown on the right side of FIG. 19 may be those of the original capture, as depth blending may be made only for luminance values. In the depth maps shown in FIG. 19 (and in other embodiments of this disclosure), a darker shade may refer to larger distance, and in the texture image and depth maps shown in FIG. 19, the chessboard pattern may refer to blank areas.

If there are several texture/depth values of pixels on a line of sight, only the value of the pixel that is closest to the viewer may be blended on the corresponding focal planes, and the other focal plane pixels on the other layers may be set blank. This is because each layered font/back focal plane pair fulfills partition of unity (sum of pixels is the original pixel luminance) and none of the other pixels along the line of sight should emit any more light.

FIG. 19 shows an example of generating layered focal planes, in accordance with some embodiments of this disclosure. Because there is no texture/depth information for all the pixels at all the depth layers, those focal plane pixels may be set blank, so they do not emit any light.

Figures 20, 21:
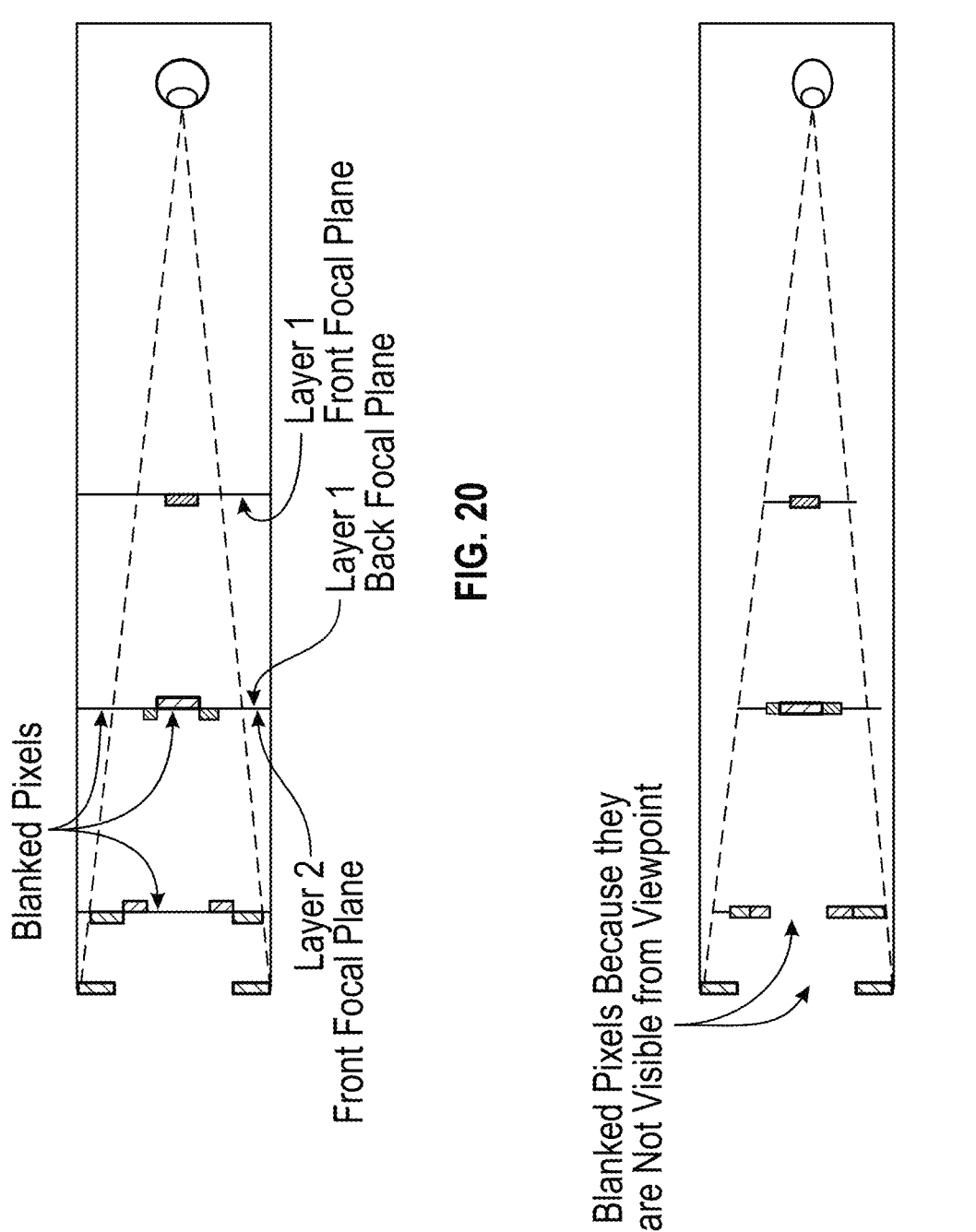
FIG. 20 shows an example of forming layered focal planes, in accordance with some embodiments of this disclosure.
FIG. 21 shows an example of back and front focal planes combined, in accordance with some embodiments of this disclosure.

FIG. 20 shows an example of forming layered focal planes, in accordance with some embodiments of this disclosure. In FIG. 20, the back and front focal planes may be placed as close to each other as possible to create as realistic depth perception of the fused pixel. Implementation of the display device may set restriction on how close to each other the focal planes are placed.

In FIGS. 19 and 20, front and back focal planes are created using a focal plane transformation step. However, there may be other variations in which adjacent focal planes are combined to a single focal plane to be placed at a correct depth.

FIG. 21 shows an example of back and front focal planes combined, in accordance with some embodiments of this disclosure. In FIG. 21, adjacent focal planes may be combined to a single focal plane that can be placed at the correct depth. As shown in FIG. 21, the adjacent focal planes can be combined into a single focal plane by pixel operations. If several texture/depth values of pixels are on a line of sight, only the pixel value that is closest to the viewer may be blended on the corresponding focal planes, and the other focal plane pixels may be set blank. For example, the two leftmost planes in FIG. 21 include blanked pixels because they are not visible from the viewpoint.

Combining the focal planes may be preferred in implementations, because of less dependency on display device restrictions such as a maximum number of focal planes or minimum distance between focal planes.

In some embodiments, a user's position may be tracked so that the system knows the user's location, which defines the viewpoint to be simulated. Viewpoint change may not be simulated by shifting focal planes, because the focal planes may be transparent and the pixels on the line of sight should coincide pixel by pixel from the new viewpoint. However, a simulated viewpoint may be made using layered focal planes.

Figure 22:
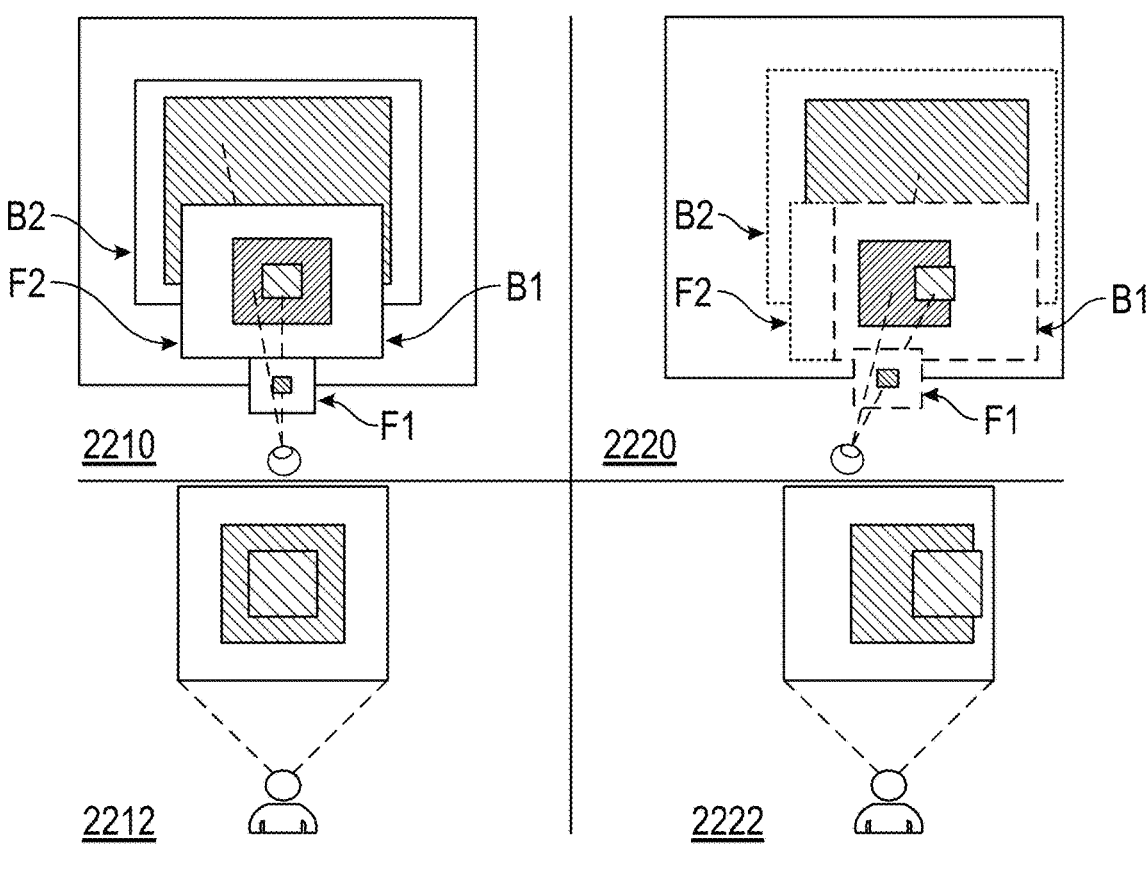
FIG. 22 shows an example of simulating viewpoint change using layered focal planes, in accordance with some embodiments of this disclosure.

FIG. 22 shows an example of simulating viewpoint change using layered focal planes, in accordance with some embodiments of this disclosure. In FIG. 22, when using layered focal planes, a simulation of the viewpoint change can be made. A set of layered focal planes is shown for a first viewpoint at 2210, and an example corresponding image as seen by a user is shown at 2212. A translated set of layered focal planes is shown for a second viewpoint at 2220, and an example corresponding image as seen by a user is shown at 2222. Each set of layered focal planes may be translated or scaled so that the pixel values on the set of the layered focal planes coincide pixel by pixel from a simulated viewpoint at 2220. In 2220, the first front focal plane F1 and the first back focal plane B1 are translated so that the pixels on the line of sight coincide. Also, in 2220, the second front focal plane F2 and the second back focal plane B2 are translated so that the pixels on the line of sight coincide.

Because the first focal planes F1 and B1 are closer to the viewer than the second focal planes F2 and B2, the first focal planes F1 and B1 are moved more, to create correct parallax illusion. The viewer perceives the focal plane shifting as change of a viewpoint as illustrated in FIG. 22.

Figure 23:
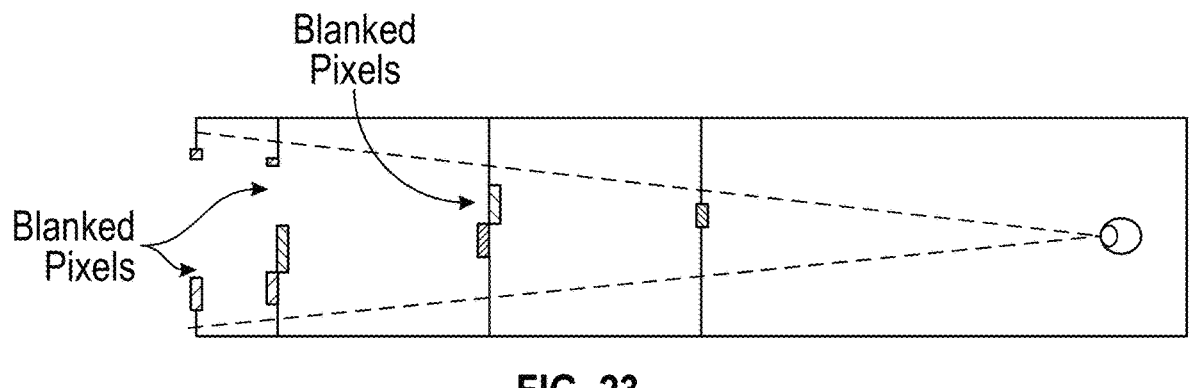
FIG. 23 shows an example of blank pixels after shifting layered focal planes, in accordance with some embodiments of this disclosure.

FIG. 23 shows an example of blank pixels after shifting layered focal planes, in accordance with some embodiments of this disclosure. Using layered focal planes may avoid corrupted image caused by summing the pixel values of the focal planes. In FIG. 23, because this incorrect summing is caused by the objects on nearer layers overlapping the farther away objects after translating the layers, the farther away pixels can be blanked so that they do not corrupt the nearby pixels. The occluded pixels may be calculated by a ray tracing algorithm by following a light ray from the eye point and blanking all the pixels that are behind any of the lighted pixels on the layered focal planes nearer to the viewpoint.

Because a light ray from the eye point through all the focal planes intersects all the focal planes at same pixel position, ray tracing can be implemented by simple pixel by pixel comparisons between the layered focal planes. A pixel $P_i(x,y)$, where x,y are the pixels coordinates and i is the layer number, at any focal plane is set blank if any of the pixels $P_j(x,y)$ is not blank and layer j is closer to the viewpoint than layer i.

If the viewpoint changes so that the new viewpoint is closer to or farther from the 3D scene objects in the depth direction, the viewpoint change may be simulated by scaling the layered focal planes so that the layers closer to the viewer are scaled more than the layers farther away. Within each layer, focal planes may be scaled so that the pixels on the line of sight coincide, and occluded pixels are blanked similarly as described above.

Combined movement in depth and sideward direction may be simulated by combining shifting and scaling operations. There may be a need to set limits to the amount of shifting or scaling. For example, moving sideward may result too large disoccluded areas or forward movement may cause the simulated viewpoint to be between focal planes. In these cases, recapturing the scene from the new viewpoint may be needed.

Figures 24, 25, 26:
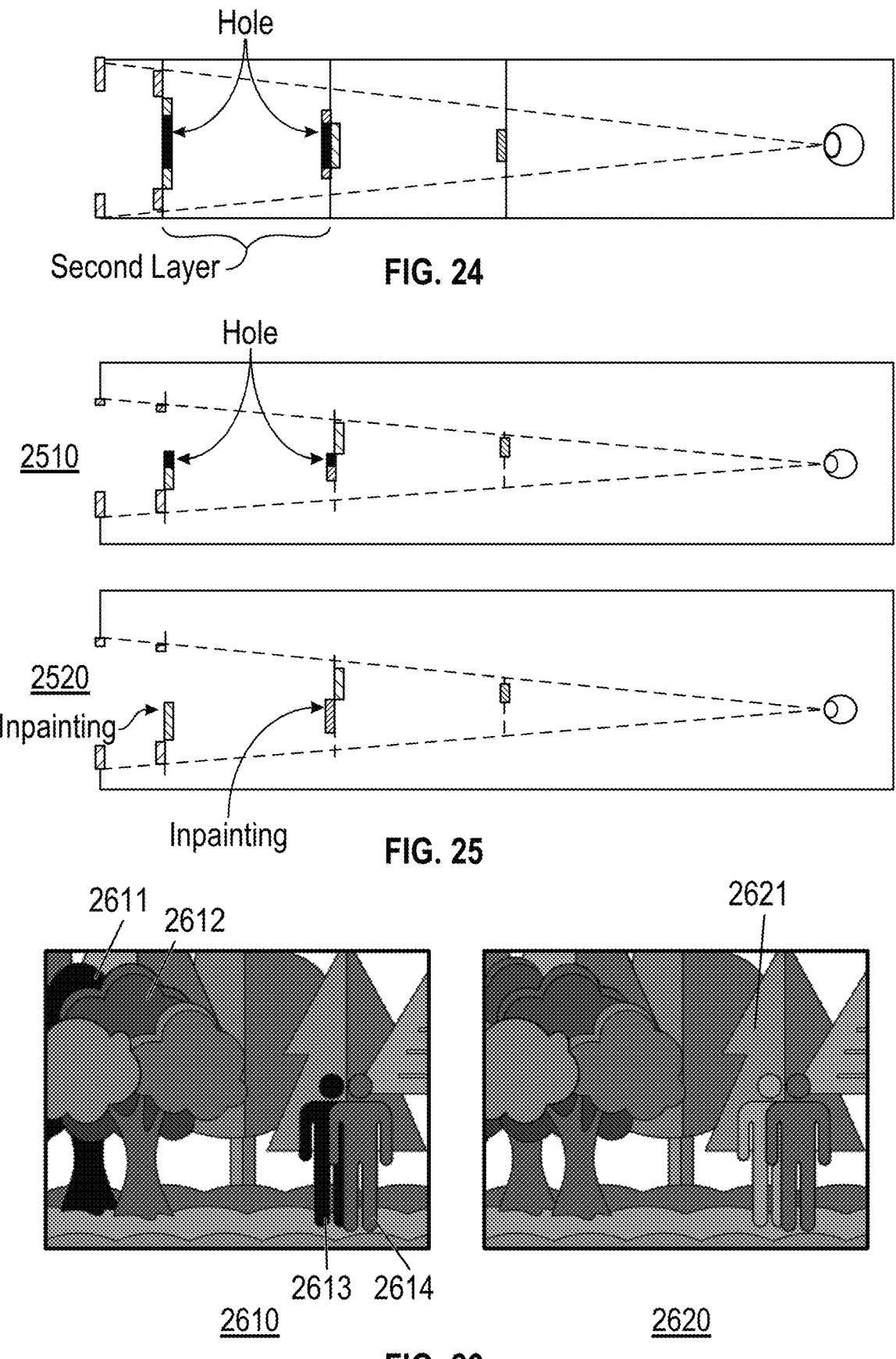
FIG. 24 shows an example where no texture and/or depth information has been captured behind occluding foreground objects, in accordance with some embodiments of this disclosure.
FIG. 25 shows an example of inpainting holes, caused by moving foreground layers, in accordance with some embodiments of this disclosure.
FIG. 26 shows an example of ghost inpainting method, in accordance with some embodiments of this disclosure.

FIG. 24 shows an example where no texture and/or depth information has been captured behind occluding foreground objects, in accordance with some embodiments of this disclosure. Even though several RGBD cameras may be used for data capture, moving foreground layers may reveal holes. Holes may refer to areas where color and depth data has not been captured, as shown in FIG. 24. This may be corrected by inpainting the missing pixels/areas with interpolation or extrapolation methods. Various inpainting methods may be used for reducing the visibility of holes or disocclusions. These include various interpolation and/or extrapolation methods for predicting missing color values due to moved objects.

In some approaches, inpainting may not have any depth information. However, when using layered focal planes, inpainting can be applied to the correct depth level. FIG. 24 shows a situation where no information was captured on the second layer, causing both front and back focal plane to have pixels with no information.

FIG. 25 shows an example of inpainting holes, caused by moving foreground layers, in accordance with some embodiments of this disclosure. At 2510, holes may become visible when the front layer has been moved. At 2520, the hole can be filled by inpainting the second layer front and back focal planes.

When using layered focal planes, both color and luminance values of the hole may be handled. In addition to inpainting methods, luminance values of the added pixel values may be blended so that the pixels on the front and back focal planes of a layer have correct amount of luminance. This can be done by interpolating or extrapolating the luminance values on both front and back focal planes, using luminance values on the hole edges as start values for the interpolation/extrapolation.

FIG. 26 shows an example of ghost inpainting method, in accordance with some embodiments of this disclosure. A ghost inpainting method may fill a hole by a copy of the object that occludes the background object. In some use cases, for example when a hole is created by an object of similar pattern than the background, the result may appear natural. In 2610, a tree 2612 is occluding the forest, in which a hole 2611 is created by an object of a similar pattern than the background. In 2620, ghost inpainting is used by filling the tree shaped hole 2611 with a copy of the tree 2612 itself. In 2620, a hole 2613 in a human shape has been filled by a copy of the human shape 2614 and then recolored, to not stick out from the background as much. For example, a color of the hole 2613 filled in with a human shape 2614 may not be filled in with a same color as the human shape 2614 but may be filled in with a color more similar or the same as the background (e.g., color of tree 2621 in a forest background).

In some embodiments, using the ghost inpainting is applied without using layered focal planes. The ghost inpainting method may be applied to any application where inpainting is used.

In some embodiments, a display is implemented for focal plane rendering. In some embodiments, an accommodative display is used such as a near eye display (NED), for example, glasses type of display. With glasses, focal plane rendering is naturally binocular. However, unlike stereoscopic (S3D) rendering, focal plane rendering may not require two eyes for 3D and depth perception. The focal plane glasses may be able to synthesize the similar effect like a person without glasses focusing with one open eye on real-world objects at varying distances.

A user position may be tracked so that the new viewpoint position can be calculated. Tracking may be implemented using e.g. one or more (RGBD) cameras or if the user is wearing near-eye-display glasses, using cameras embedded to the glasses.

In another variation, a new viewpoint position may be given by an input device, simulating user position change.

If the display supports stereoscopic rendering, small viewpoint changes may be implemented by shifting/scaling focal planes within each layer by a small amount. A method for producing stereoscopic viewpoints with focal planes can be directly applied to the layered focal planes.

Approaches mimicking perception in the real-world but based on 2D captures may suffer from flattening and bill-boarding. Supporting 3D motion parallax in such approaches may ease up detecting flattening or emphasize it, particularly if the result is viewed by (stereoscopic) glasses.

Some conventional approaches may not support detecting 3D shapes of objects, and synthesizing small viewpoint changes (e.g., for motion parallax, binocular parallax, stereoscopy) with high quality at object edges (e.g., with reduced disocclusions or shearing).

Some approaches supporting large viewpoint changes may suffer from unnaturally corrected disocclusions or large disocclusions (holes) in areas, where background has been blocked and image information has not been obtained. This may occur in spite that inpainting, filtering or other means are used to reduce resulting distortions.

Using multiple focal planes, the disclosed techniques may support both 3D perception of segmented objects, and better quality at their edges. MFPs may be able to support natural eye focus with accommodative glasses displays.

The disclosed techniques may not require changes (e.g., major changes) to an existing front end (e.g., capture, formation, coding, and transmission of video plus depth format content) and may be able to support 3D cues and freedom for user mobility (e.g., viewing the received content from varying viewpoints). All processing required by the disclosed techniques may be made in the receiver or it may be shared between a thin client and a transmitter or an edge server.

The disclosed techniques may better support depth perception by using focal planes, in contrast to approaches that poorly support depth perception by moving billboard type layers without any depth information.

The disclosed techniques may be an enhancement of rendering 2D video frames or objects into a virtual scene with helpful 3D cues. Instead of rendering frames or objects as billboards, the disclosed techniques may support rendering 3D shapes of the objects, as well as synthesizing viewpoints with high quality motion parallax.

In a VR rendering approach, a new viewpoint to a modelled or 3D captured view may be formed by warping its 3D surface and by texturing it with corresponding pixel colors. A successful result may avoid the need to gather texture and depth data from the occluded sides of objects, which in real-world would normally require using several cameras to capture side viewpoints for reducing disocclusions.

In the disclosed techniques, a captured view (e.g., panorama view) may be segmented into objects, which may be compiled into a new configuration, approximating desired changes in 3D viewing geometry. When compiling the segments, their facades may be kept towards the changed viewpoint, avoiding the need for capturing information from the sides of objects, in case they would be warped.

Information which is not contained into segmented objects may form a background panorama or canvas, over which segmented objects may be compiled. Moving and scaling objects may produce holes and/or disocclusions (areas revealed by moving foreground objects), which can be mitigated by known methods.

Small viewpoint changes (e.g., for forming stereoscopic views or supporting high quality motion parallax) may be supported by shifting and scaling multiple focal planes (MFPs). MFPs may be used for supporting natural eye focus/accommodation with (emerging) accommodative displays. In order to form MFPs, a depth map for a compiled scene may be formed by z-buffering, supporting occlusions between multiple segmented objects moved in 3D. In a VR approach, z-buffering may be used for supporting occlusions in one warped 3D scene.

Demand for supporting immersion and interaction in content delivery systems may be increasing rapidly. Viewing in the real world may be a gold standard for visual perception, but achieving naturalness and freedom in 3D viewing may be restricted by various technical and economic challenges.

In some approaches, 2D content rendering with support for motion parallax may be used to increase naturalness in viewing content (e.g., for use in video games, broadcast and telepresence applications). However, these approaches may be improved by better support for 3D perception, while retaining cost benefits. The disclosed techniques may be an example for such an improvement towards more natural 3D perception and interaction and may include support for natural accommodation/eye-focus.

In the disclosed techniques, a captured view may be transformed into focal planes and only focal planes may be used when new viewpoints are simulated. Moving and scaling objects may produce holes and/or disocclusions (areas revealed by moving foreground objects), which can be mitigated, but in the case of layered focal planes the inpainted areas may also have depth information.

Differing further from a VR approach, small viewpoint changes, e.g., for forming stereoscopic views or supporting high quality motion parallax may be supported by shifting and scaling focal planes. Focal planes can even be used for supporting natural eye focus/accommodation with accommodative displays.

In some embodiments, focal planes are divided to stacks of transparent, depth blended layers that enable depth perception within each layer. Vergence-accommodation conflict (VAC) may be a problem for NED. Use of transparent blended layers may mitigate VAC. In some embodiments, layered focal plane approaches may save in computation by not having to recompute a depth map when an eye point is moved. In some approaches, layered depth images may be represented by multiple depths for a single line of sight. In some embodiments, layered depth images may be used for storing layered focal planes. In some embodiments, a particular type of layers may be used, where for a single line of sight, depths are present on/for a limited depth range.

Figure 27:
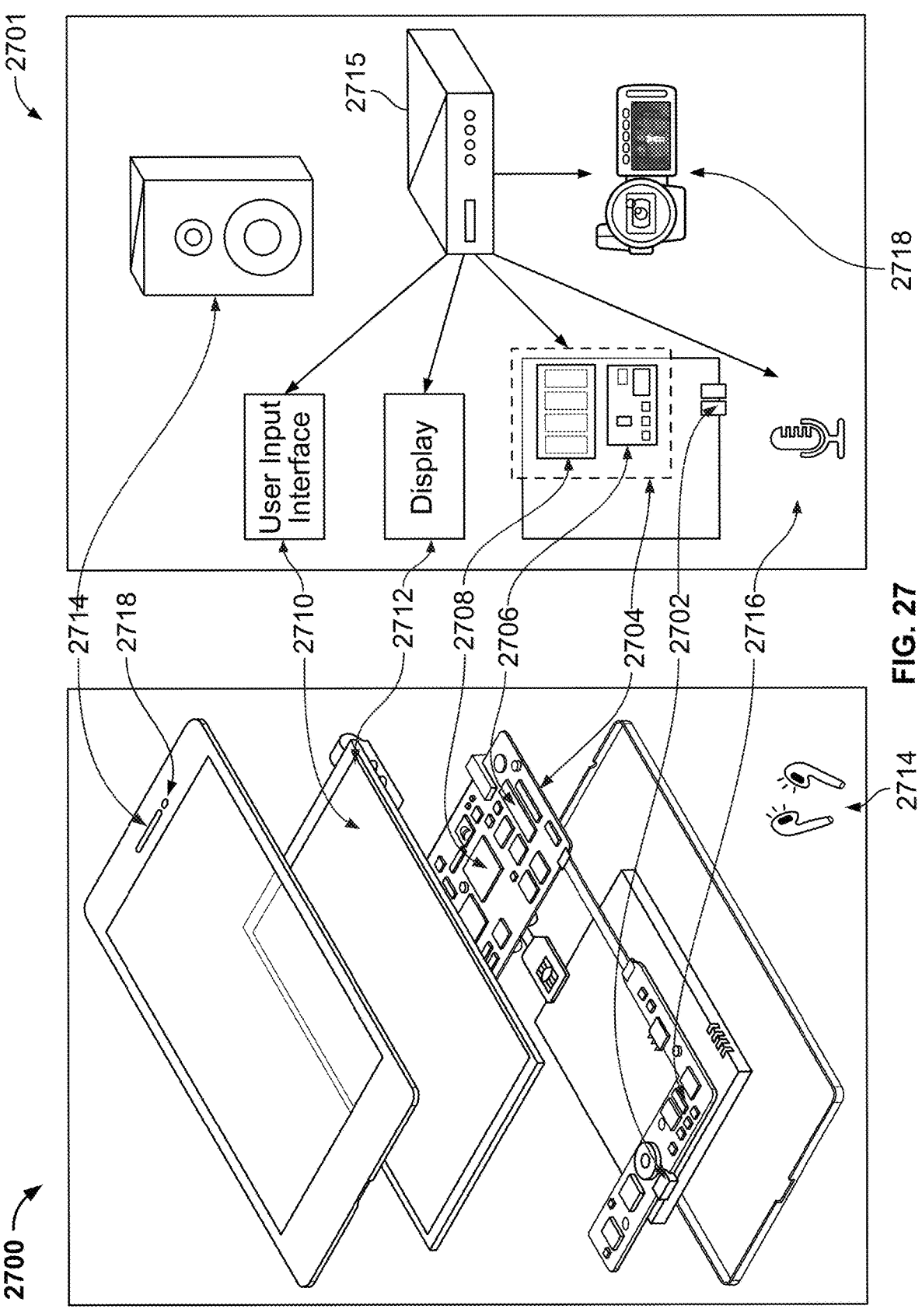
FIG. 27 shows generalized embodiments of illustrative user equipment devices which may perform the functions described herein.
Figure 28:
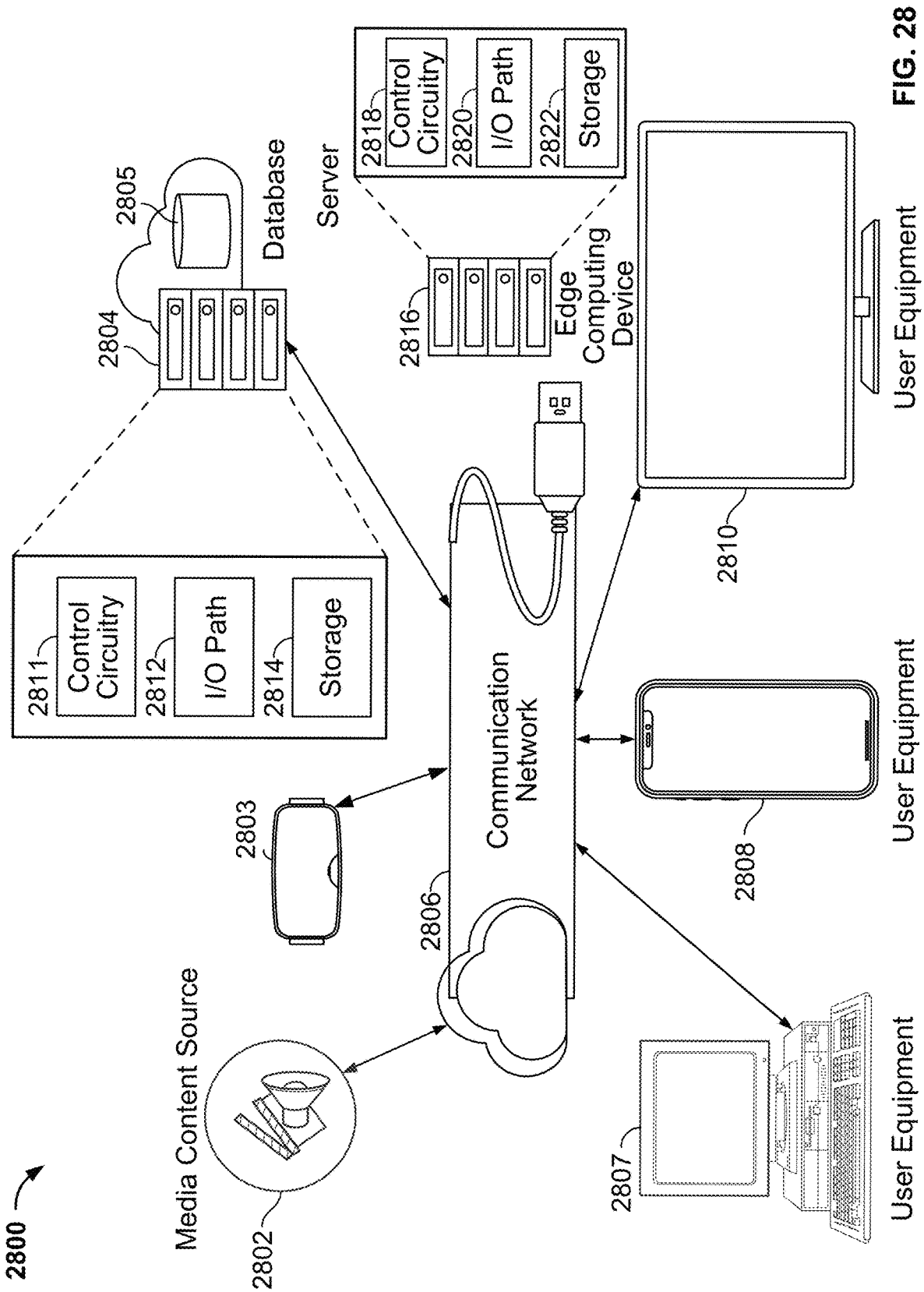
FIG. 28 is a diagram of an illustrative system for encoding/decoding, in accordance with some embodiments of this disclosure.

FIGS. 27-28 depict illustrative devices, systems, servers, and related hardware for image encoding/decoding. FIG. 27 shows generalized embodiments of illustrative user equipment devices which may perform the functions described herein. User equipment device 2700 may be a smartphone device, a tablet, a virtual reality or augmented reality device, or any other suitable device capable of processing video data. In another example, user equipment device 2701 may be a user television equipment system or device. User television equipment device 2701 may include set-top box 2715. Set-top box 2715 may be communicatively connected to microphone 2716, audio output equipment (e.g., speaker or headphones 2714), and display 2712. In some embodiments, display 2712 may be a television display or a computer display. In some embodiments, set-top box 2715 may be communicatively connected to user input interface 2710. In some embodiments, user input interface 2710 may be a remote-control device. Set-top box 2715 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path.

Each one of user equipment device 2700 and user equipment device 2701 may receive content and data via input/output (I/O) path (e.g., circuitry) 2702. I/O path 2702 may provide content (e.g., broadcast programming, on-demand programming, Internet content, content available over a local area network (LAN) or wide area network (WAN), and/or other content) and data to control circuitry 2704, which may comprise processing circuitry 2706 and storage 2708. Control circuitry 2704 may be used to send and receive commands, requests, and other suitable data using I/O path 2702, which may comprise I/O circuitry. I/O path 2702 may connect control circuitry 2704 (and specifically processing circuitry 2706) to one or more communications paths (described below). I/O functions may be provided by one or more of these communications paths, but are shown as a single path in FIG. 27 to avoid overcomplicating the drawing. While set-top box 2715 is shown in FIG. 27 for illustration, any suitable computing device having processing circuitry, control circuitry, and storage may be used in accordance with the present disclosure. For example, set-top box 2715 may be replaced by, or complemented by, a personal computer (e.g., a notebook, a laptop, a desktop), a smartphone (e.g., device 2700), a tablet, a network-based server hosting a user-accessible client device, a non-user-owned device, any other suitable device, or any combination thereof.

Control circuitry 2704 may be based on any suitable control circuitry such as processing circuitry 2706. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 2704 executes instructions for the codec application stored in memory (e.g., storage 2708). Specifically, control circuitry 2704 may be instructed by the codec application to perform the functions discussed above and below. In some implementations, processing or actions performed by control circuitry 2704 may be based on instructions received from the codec application.

In client/server-based embodiments, control circuitry 2704 may include communications circuitry suitable for communicating with a server or other networks or servers. The codec application may be a stand-alone application implemented on a device or a server. The codec application may be implemented as software or a set of executable instructions. The instructions for performing any of the embodiments discussed herein of the codec application may be encoded on non-transitory computer-readable media (e.g., a hard drive, random-access memory on a DRAM integrated circuit, read-only memory on a BLU-RAY disk, etc.). For example, in FIG. 27, the instructions may be stored in storage 2708, and executed by control circuitry 2704 of a device 2700.

In some embodiments, the codec application may be a client/server application where only the client application resides on device 2700, and a server application resides on an external server (e.g., server 2804 and/or server 2816). For example, the codec application may be implemented partially as a client application on control circuitry 2704 of device 2700 and partially on server 2804 as a server application running on control circuitry 2811. Server 2804 may be a part of a local area network with one or more of devices 2700 or may be part of a cloud computing environment accessed via the internet. In a cloud computing environment, various types of computing services for performing searches on the internet or informational databases, providing encoding/decoding capabilities, providing storage (e.g., for a database) or parsing data are provided by a collection of network-accessible computing and storage resources (e.g., server 2804 and/or edge computing device 2816), referred to as "the cloud." Device 2700 may be a cloud client that relies on the cloud computing capabilities from server 2804 to determine whether processing (e.g., at least a portion of virtual background processing and/or at least a portion of other processing tasks) should be offloaded from the mobile device, and facilitate such offloading. When executed by control circuitry of server 2804 or 2816, the codec application may instruct control circuitry 2811 or 2818 to perform processing tasks for the client device and facilitate the encoding/decoding.

Control circuitry 2704 may include communications circuitry suitable for communicating with a server, edge computing systems and devices, a table or database server, or other networks or servers. The instructions for carrying out the above-mentioned functionality may be stored on a server (which is described in more detail in connection with FIG. 9). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 9). In addition, communications circuitry may include circuitry that enables peer-to-peer communication of user equipment devices, or communication of user equipment devices in locations remote from each other (described in more detail below).

Memory may be an electronic storage device provided as storage 2708 that is part of control circuitry 2704. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 2708 may be used to store various types of content described herein as well as codec application data described above. Nonvolatile memory may also be used (e.g., to launch a boot-up routine and other instructions). Cloud-based storage, described in relation to FIG. 27, may be used to supplement storage 2708 or instead of storage 2708.

Control circuitry 2704 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 2704 may also include scaler circuitry for upconverting and downconverting content into the preferred output format of user equipment 2700. Control circuitry 2704 may also include digital-to-analog converter circuitry and analog-to-digital converter circuitry for converting between digital and analog signals. The tuning and encoding circuitry may be used by user equipment device 2700, 2701 to receive and to display, to play, or to record content. The tuning and encoding circuitry may also be used to receive video data for encoding/decoding data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 2708 is provided as a separate device from user equipment device 2700, the tuning and encoding circuitry (including multiple tuners) may be associated with storage 2708.

Control circuitry 2704 may receive instruction from a user by way of user input interface 2710. User input interface 2710 may be any suitable user interface, such as a remote control, mouse, trackball, keypad, keyboard, touch screen, touchpad, stylus input, joystick, voice recognition interface, or other user input interfaces. Display 2712 may be provided as a stand-alone device or integrated with other elements of each one of user equipment device 2700 and user equipment device 2701. For example, display 2712 may be a touch-screen or touch-sensitive display. In such circumstances, user input interface 2710 may be integrated with or combined with display 2712. In some embodiments, user input interface 2710 includes a remote-control device having one or more microphones, buttons, keypads, any other components configured to receive user input or combinations thereof. For example, user input interface 2710 may include a handheld remote-control device having an alphanumeric keypad and option buttons. In a further example, user input interface 2710 may include a handheld remote-control device having a microphone and control circuitry configured to receive and identify voice commands and transmit information to set-top box 2715.

Audio output equipment 2714 may be integrated with or combined with display 2712. Display 2712 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 2712. Audio output equipment 2714 may be provided as integrated with other elements of each one of device 2700 and equipment 2701 or may be stand-alone units. An audio component of videos and other content displayed on display 2712 may be played through speakers (or headphones) of audio output equipment 2714. In some embodiments, audio may be distributed to a receiver (not shown), which processes and outputs the audio via speakers of audio output equipment 2714. In some embodiments, for example, control circuitry 2704 is configured to provide audio cues to a user, or other audio feedback to a user, using speakers of audio output equipment 2714. There may be a separate microphone 2716 or audio output equipment 2714 may include a microphone configured to receive audio input such as voice commands or speech. For example, a user may speak letters or words that are received by the microphone and converted to text by control circuitry 2704. In a further example, a user may voice commands that are received by a microphone and recognized by control circuitry 2704. Camera 2718 may be any suitable video camera integrated with the equipment or externally connected. Camera 2718 may be a digital camera comprising a charge-coupled device (CCD) and/or a complementary metal-oxide semiconductor (CMOS) image sensor. Camera 2718 may be an analog camera that converts to digital images via a video card.

The codec application may be implemented using any suitable architecture. For example, it may be a stand-alone application wholly-implemented on each one of user equipment device 2700 and user equipment device 2701. In such an approach, instructions of the application may be stored locally (e.g., in storage 2708), and data for use by the application is downloaded on a periodic basis (e.g., from an out-of-band feed, from an Internet resource, or using another suitable approach). Control circuitry 2704 may retrieve instructions of the application from storage 2708 and process the instructions to provide encoding/decoding functionality and perform any of the actions discussed herein. Based on the processed instructions, control circuitry 2704 may determine what action to perform when input is received from user input interface 2710. For example, movement of a cursor on a display up/down may be indicated by the processed instructions when user input interface 2710 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the codec application is a client/server-based application. Data for use by a thick or thin client implemented on each one of user equipment device 2700 and user equipment device 2701 may be retrieved on-demand by issuing requests to a server remote to each one of user equipment device 2700 and user equipment device 2701. For example, the remote server may store the instructions for the application in a storage device. The remote server may process the stored instructions using circuitry (e.g., control circuitry 2704) and generate the displays discussed above and below. The client device may receive the displays generated by the remote server and may display the content of the displays locally on device 2700. This way, the processing of the instructions is performed remotely by the server while the resulting displays (e.g., that may include text, a keyboard, or other visuals) are provided locally on device 2700. Device 2700 may receive inputs from the user via input interface 2710 and transmit those inputs to the remote server for processing and generating the corresponding displays. For example, device 2700 may transmit a communication to the remote server indicating that an up/down button was selected via input interface 2710. The remote server may process instructions in accordance with that input and generate a display of the application corresponding to the input (e.g., a display that moves a cursor up/down). The generated display is then transmitted to device 2700 for presentation to the user.

In some embodiments, the codec application may be downloaded and interpreted or otherwise run by an interpreter or virtual machine (run by control circuitry 2704). In some embodiments, the codec application may be encoded in the ETV Binary Interchange Format (EBIF), received by control circuitry 2704 as part of a suitable feed, and interpreted by a user agent running on control circuitry 2704. For example, the codec application may be an EBIF application. In some embodiments, the codec application may be defined by a series of JAVA-based files that are received and run by a local virtual machine or other suitable middleware executed by control circuitry 2704. In some of such embodiments (e.g., those employing MPEG-2 or other digital media encoding schemes), codec application may be, for example, encoded and transmitted in an MPEG-2 object carousel with the MPEG audio and video packets of a program.

FIG. 28 is a diagram of an illustrative system 2800 for encoding/decoding, in accordance with some embodiments of this disclosure. User equipment devices 2803, 2807, 2808, 2810 (e.g., which may correspond to one or more of computing device may be coupled to communication network 2806). Communication network 2806 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 2806) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 28 to avoid overcomplicating the drawing.

Although communications paths are not drawn between user equipment devices, these devices may communicate directly with each other via communications paths as well as other short-range, point-to-point communications paths, such as USB cables, IEEE 994 cables, wireless paths (e.g., Bluetooth, infrared, IEEE 702-11x, etc.), or other short-range communication via wired or wireless paths. The user equipment devices may also communicate with each other directly through an indirect path via communication network 2806.

System 2800 may comprise media content source 2802, one or more servers 2804, and one or more edge computing devices 2816 (e.g., included as part of an edge computing system). In some embodiments, the codec application may be executed at one or more of control circuitry 2811 of server 2804 (and/or control circuitry of user equipment devices 2803, 2807, 2808, 2810 and/or control circuitry 2818 of edge computing device 2816). In some embodiments, a data structure transmitted by transmitter 702 of FIG. 7A may be stored at database 2805 maintained at or otherwise associated with server 2804, and/or at storage 2822 and/or at storage of one or more of user equipment devices 2803, 2807, 2808, 2810.

In some embodiments, server 2804 may include control circuitry 2811 and storage 2814 (e.g., RAM, ROM, Hard Disk, Removable Disk, etc.). Storage 2814 may store one or more databases. Server 2804 may also include an input/output path 2812. I/O path 2812 may provide encoding/decoding data, device information, or other data, over a local area network (LAN) or wide area network (WAN), and/or other content and data to control circuitry 2811, which may include processing circuitry, and storage 2814. Control circuitry 2811 may be used to send and receive commands, requests, and other suitable data using I/O path 2812, which may comprise I/O circuitry. I/O path 2812 may connect control circuitry 2811 (and specifically control circuitry) to one or more communications paths.

Control circuitry 2811 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 2811 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 2811 executes instructions for an emulation system application stored in memory (e.g., the storage 2814). Memory may be an electronic storage device provided as storage 2814 that is part of control circuitry 2811.

Edge computing device 2816 may comprise control circuitry 2818, I/O path 2820 and storage 2822, which may be implemented in a similar manner as control circuitry 2811, I/O path 2812 and storage 2824, respectively of server 2804. Edge computing device 2816 may be configured to be in communication with one or more of user equipment devices 2803, 2807, 2808, 2810 and server 2804 over communication network 2806, and may be configured to perform processing tasks (e.g., for encoding/decoding) in connection with ongoing processing of video data. In some embodiments, a plurality of edge computing devices 2816 may be strategically located at various geographic locations, and may be mobile edge computing devices configured to provide processing support for mobile devices at various geographical regions.

FIGS. 29-33 are flowcharts of illustrative processes, in accordance with some embodiments of this disclosure. In various embodiments, the individual steps of process 2900, 3000, 3015, 3100, 3200, 3215, and 3300 may be implemented by one or more components of the devices and systems of FIGS. 1A-1B, 2A-2C, and 28-29. Although the present disclosure may describe certain steps of the process (and of other processes described herein) as being implemented by certain components of the devices and systems of FIGS. 1A-C, 2A-2C, and 28-29 this is for purposes of illustration only, and it should be understood that other components of the devices and systems of FIGS. 1A-1B, 2A-2C, and 28-29 may implement those steps instead.

FIG. 29 is a flowchart of an illustrative process 2900 for transmitting an image, in accordance with some embodiments of this disclosure.

At step 2902, the process begins (e.g., when a server 2702 or 2752 begins to encode image data for transmission for a session).

At step 2904, input/output circuitry (e.g., circuitry 2920 of FIG. 29) of a computing device (e.g., server 2702 or 2752) captures (or retrieves, receives) texture and depth data from a capture point. In some embodiments, input/output circuitry captures texture and depth data only from one camera viewpoint. However, in other embodiments, there is a set of cameras capturing a view from several viewpoints to capture more complete data (e.g., to reduce possible disocclusions when synthesizing new viewpoints).

At step 2906, control circuitry (e.g., circuitry 2918 of FIG. 29) encodes the captured data. In some embodiments, the transmitter sends the encoded captured data to a receiver. In some embodiments, the transmitter stores the encoded captured data. The stored, encoded captured data may be transmitted at a later time.

At step 2908, the control circuitry determines whether enough images were captured. If so, the process proceeds to step 2910 to end the process. If not, the process proceeds to step 2902 to start the process again.

FIG. 30A is a flowchart of an illustrative process 3000 for accessing an image and generating an enhanced image to a viewpoint, in accordance with some embodiments of this disclosure.

At step 3002, the process begins (e.g., when a server 2702 or 2752 begins to decode image data received for a session).

At step 3004, input/output circuitry (e.g., circuitry 2920 of FIG. 29) of a computing device (e.g., server 2702 or 2752) receives coded data. Control circuitry (e.g., circuitry 2918 of FIG. 29) decodes the coded data to texture and depth components of a view.

At step 3006, the control circuitry segments objects in the view using color, depth, or both. The control circuitry forms a background panorama. For example, the background panorama may be formed by combining distant image areas after segmenting out or removing foreground objects. The control circuitry uses hole filling methods for reducing the visibility of occluded areas behind removed foreground objects. For example, the occluded areas behind removed foreground objects may be voids where data has not been captured. The control circuitry stores the color and depth data for each segment together with its 3D coordinate(s). The control circuitry stores the color data for the background.

At step 3008, the control circuitry tracks a user's position for deducing a change in viewpoint, and/or input/output circuitry (e.g., circuitry 2920 of FIG. 29) accesses or receives input of a new viewpoint using an interface.

At step 3010, the control circuitry arranges segments into a new configuration using a changed viewpoint and laws of 3D geometry. The control circuitry simplifies the view synthesis. For example, the control circuitry may assume segments are rigid except for their position and scale. The control circuitry chooses a policy for avoiding the need for side views/data of objects. For example, a policy may be 1) keeping the geometry of the facades of objects fixed towards any new viewpoint, or 2) treating the objects as pictures with orientation and depth.

At step 3012, the control circuitry compiles pixel distances or depths of the synthesized view into a z-buffer containing zero, one, or more depth values per pixel, depending on whether there are disocclusions or voids, unambiguously moved, or overlapping depth values.

At step 3014, the control circuitry processes the depth values by z-buffering to form a synthesized depth map. For example, the control circuitry may select the closest depth values of the overlapping depth values and keep the unambiguous depth values unchanged.

FIG. 30B is a flowchart of an illustrative process 3015 for accessing an image and generating an enhanced image to a viewpoint, in accordance with some embodiments of this disclosure. In some embodiments, process 3015 continues from process 3000.

At step 3016, the control circuitry uses the known correspondences between depth and texture, form a synthesized texture (color) view corresponding the z-buffered depth values. For example, control circuitry may compile the texture corresponding to the output from step 3014.

At step 3018, the control circuitry reduces the visibility of disocclusions by chosen inpainting methods. For example, a chosen inpainting method may be substituting missing color and depth values in disoccluded areas by their predictions (e.g., interpolations and extrapolations). In some embodiments, step 3018 is optional.

At step 3019, the control circuitry may generate a background using a background prediction method based on collecting areas of still background behind moving objects which may generate a more complete background, thus further reducing the holes. In some embodiments, step 3019 is used alternatively or in addition to the generation of the background panorama in step 3006, and the control circuitry stores the color data or updated color data for the background panorama. In some embodiments, step 3019 is optional.

At step 3020, the control circuitry processes the synthesized texture and depth views by depth blending for forming a chosen number of multiple focal planes (MFP) as seen from the (tracked or input) new user viewpoint to the synthesized (and processed) view.

At step 3022, the control circuitry tracks or receives input of a viewer's position and synthesizes by shifting and scaling MFPs e.g., 1) high-quality motion parallax for small viewpoint changes, 2) two stereoscopic viewpoints, or 3) (binocular) accommodative viewpoints.

At step 3024, the control circuitry renders the stack of MFPs on a chosen display to support improved motion parallax and perception of 3D shape. In some embodiments, the control circuitry may offer an option for supporting natural eye focus. Display options may include, e.g., 1) monoscopic display with improved motion parallax, 2) stereoscopic display with improved motion parallax and perception of S3D shape (e.g., stereoscopic 3D), and 3) accommodative display with processed MFPs rendered at different distances.

At step 3026, the control circuitry determines whether all received images are processed. If not, the process proceeds to start at 3002. If so, the process proceeds to end at 3028.

FIG. 31 is a flowchart of another illustrative process 3100 for accessing an image and generating an enhanced image to a viewpoint, in accordance with some embodiments of this disclosure.

At step 3102, input/output circuitry (e.g., circuitry 2920 of FIG. 29) of a computing device (e.g., server 2702 or 2752) accesses first image data comprising texture data and depth data from a first viewpoint.

At step 3104, control circuitry (e.g., circuitry 2918 of FIG. 29) of the computing device segments one or more objects of the first image data from the first viewpoint.

At step 3106, the control circuitry identifies a second viewpoint.

At step 3108, the control circuitry arranges at least one of the one or more segmented objects into a configuration based on the second viewpoint.

At step 3110, the control circuitry compiles, based on the segment depth data for each segmented object in the configuration, depth data corresponding to each pixel location in the configuration based on the second view.

At step 3112, the control circuitry forms a synthesized depth map based at least in part on a closest depth value for each overlapping depth value at each pixel location of the compiled depth data.

At step 3114, the control circuitry forms a synthesized texture map based on correspondence between segment depth data and respective segment texture data.

At step 3116, the control circuitry generates multiple focal planes (MFPs) based on the synthesized texture map and the synthesized depth map to enable generating for display second image data based on the MFPs.

At step 3118, the input/output circuitry may generate for display the second image data based on the MFPs.

Figure 32A:
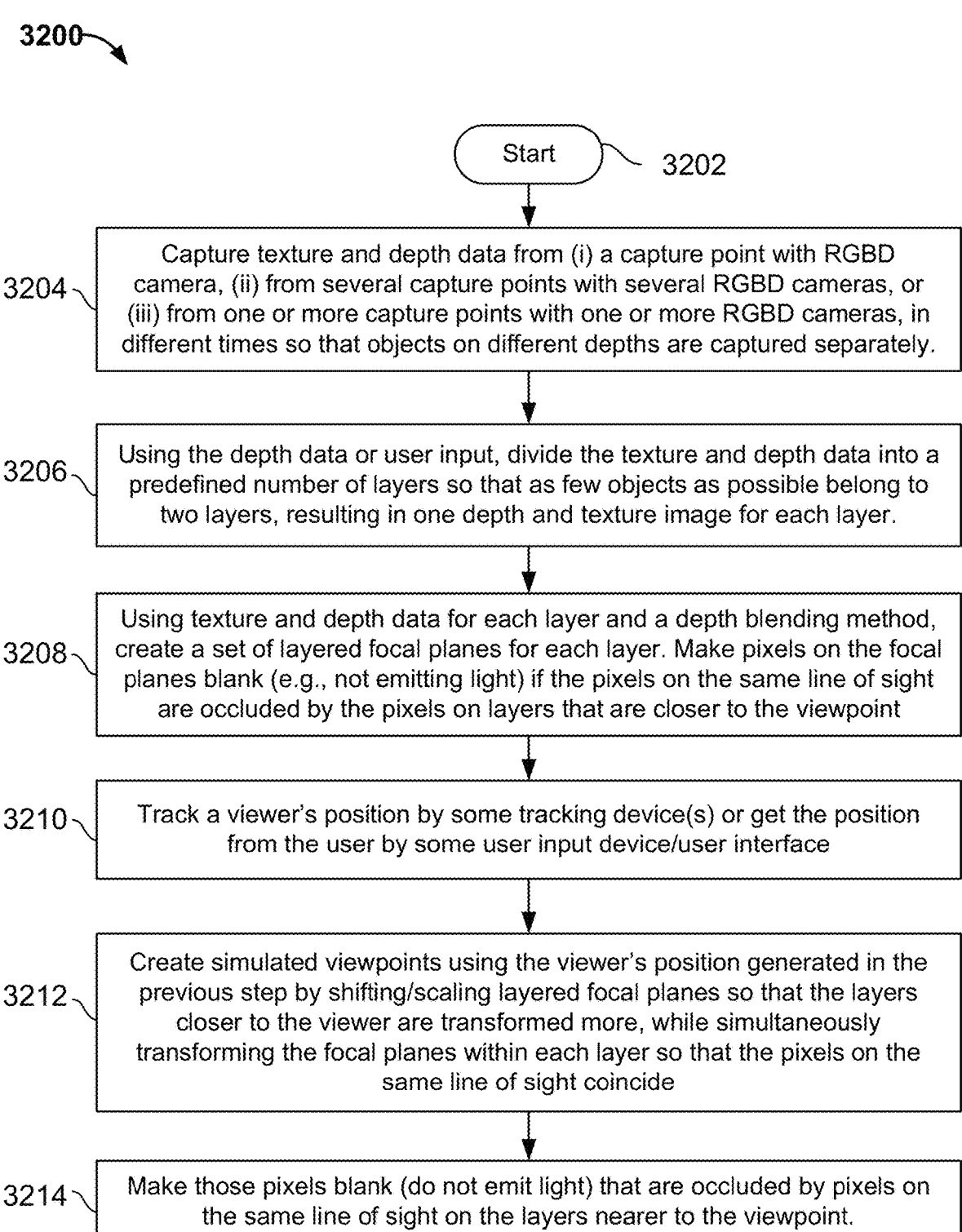
FIG. 32A is a flowchart of another illustrative process for accessing an image and generating an enhanced image to a viewpoint, in accordance with some embodiments of this disclosure.

FIG. 32A is a flowchart of another illustrative process 3200 for accessing an image and generating an enhanced image to a viewpoint, in accordance with some embodiments of this disclosure.

At step 3202, the process 3200 begins (e.g., when a server 2702 or 2752 begins to access texture and depth data).

At step 3204, control circuitry (e.g., circuitry 2918 of FIG. 29) of a computing device (e.g., server 2702 or 2752) captures texture and depth data from (i) a capture point with RGBD camera, (ii) from several capture points with several RGBD cameras, or (iii) from one or more capture points with one or more RGBD cameras, in different times so that objects on different depths are captured separately.

At step 3206, the control circuitry, by using the depth data or user input, divides the texture and depth data into a predefined number of layers so that as few objects as possible belong to two layers, resulting in one depth and texture image for each layer.

At step 3208, the control circuitry, by using texture and depth data for each layer and a depth blending method, creates a set of layered focal planes for each layer. The control circuitry makes pixels on the focal planes blank (e.g., not emitting light) if the pixels on the same line of sight are occluded by the pixels on layers that are closer to the viewpoint.

At step 3210, the control circuitry tracks a viewer's position by some tracking device(s) or get the position from the user by some user input device/user interface.

At step 3212, the control circuitry creates simulated viewpoints using the viewer's position generated in the previous step by shifting/scaling layered focal planes so that the layers closer to the viewer are transformed more, while simultaneously transforming the focal planes within each layer so that the pixels on the same line of sight coincide.

At step 3214, the control circuitry makes those pixels blank (do not emit light) that are occluded by pixels on the same line of sight on the layers nearer to the viewpoint.

FIG. 32B is a flowchart of another illustrative process 3215 for accessing an image and generating an enhanced image to a viewpoint, in accordance with some embodiments of this disclosure. In some embodiments, process 3215 follows from process 3200.

At step 3216, if the transformation revealed holes (areas where there are not texture/depth data), the control circuitry (e.g., circuitry 2918 of FIG. 29) of a computing device (e.g., server 2702 or 2752) fills the holes on the focal planes for each layer e.g. using inpainting. The system updates luminance values of the inpainted pixels so that depth blending is correct, using e.g., interpolation between the luminance values on the hole edges.

At step 3217, the control circuitry may generate a background using a background prediction method based on collecting areas of still background behind moving objects which may generate a more complete background, thus further reducing the holes. In some embodiments, step 3217 is optional.

At step 3218, input/output circuitry (e.g., circuitry 2920 of FIG. 29) of the computing device renders the stack of MFPs on a chosen display to support improved motion parallax and perception of 3D shape, with option for supporting natural eye-focus. Display options include, e.g., 1) monoscopic display with improved motion parallax, 2) stereoscopic display with improved motion parallax and perception of S3D shape, and 3) accommodative display with processed MFPs rendered at different distances.

At step 3220, the control circuitry determines if all received images are processed. If so, the process proceeds to step 3222 to end the process. If not, the process proceeds to step 2202 to start the process again.

FIG. 33 is a flowchart of another illustrative process 3300 for accessing an image and generating an enhanced image to a viewpoint, in accordance with some embodiments of this disclosure.

At step 3302, input/output circuitry (e.g., circuitry 2920 of FIG. 29) of a computing device (e.g., server 2702 or 2752) accesses first image data comprising texture data and depth data from a first viewpoint.

At step 3304, control circuitry (e.g., circuitry 2918 of FIG. 29) of the computing device segments the texture data and the depth data into a plurality of layers.

At step 3306, the control circuitry generates respective multiple focal planes (MFPs) for each respective layer based on the segmented texture data and the segmented depth data.

At step 3308, the control circuitry blanks out pixels on the respective MFPs for each respective layer that are occluded by pixels on layers that are closer to the first viewpoint.

At step 3310, the control circuitry identifies a second viewpoint.

At step 3312, the control circuitry generates second image data for the second viewpoint to enable display of the second image data by: shifting and scaling the respective MFPs for each respective layer corresponding to the second viewpoint, wherein layers closer to an origin of the second viewpoint are shifted and scaled more than layers farther from the origin of the second viewpoint; and blanking out pixels on the shifted and scaled respective MFPs for each respective layer that are occluded by pixels on layers that are closer to the second viewpoint.

At step 3314, the input/output circuitry may generate for display the second image data.

The processes discussed above are intended to be illustrative and not limiting. One skilled in the art would appreciate that the steps of the processes discussed herein may be omitted, modified, combined and/or rearranged, and any additional steps may be performed without departing from the scope of the disclosure. More generally, the above disclosure is meant to be illustrative and not limiting. Only the claims that follow are meant to set bounds as to what the present disclosure includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   accessing first image data comprising texture data and depth data from a first viewpoint;

segmenting one or more objects of the first image data from the first viewpoint, wherein at least one segmented object of the one or more segmented objects is an occluding object;

generating respective segment texture data and segment depth data for each segmented object of the one or more segmented objects;

identifying a second viewpoint;

arranging at least one of the one or more segmented objects into a configuration by:

updating texture data corresponding to the occluding object to move the occluding object to a position based on the second viewpoint relative to a previous position of the occluding object in the texture data;

identifying at least one hole in the texture data caused by the moving of the occluding object; and filling the at least one hole in the texture data based at least in part on at least one pixel prediction method;

compiling, based on the segment depth data for each segmented object in the configuration, updated depth data corresponding to each pixel location in the configuration based on the second viewpoint;

forming a synthesized depth map for the updated depth data with the at least one hole caused by the moving of the occluding object based at least in part on a closest depth value for each overlapping depth value at each pixel location of the compiled depth data;

forming a synthesized texture map based on correspondence between the updated depth data and the updated texture data; and generating multiple focal planes (MFPs) based on the synthesized texture map and the synthesized depth map to enable generating for display second image data based on the MFPs.

2. The method of claim 1, wherein accessing the first image data comprises:

receiving coded data and decoding the coded data to the texture data and the depth data.

3. The method of claim 1, wherein segmenting the one or more objects of the first image data from the first viewpoint is based on color, depth, or both color and depth.

4. The method of claim 1, further comprising:

generating a background image by removing at least one object from the first image data with corresponding depth data closer to the first viewpoint than other depth data of the first image data and combining areas of the first image data with corresponding depth data farther away from the first viewpoint, and by using a background prediction method based on collecting areas of still background behind moving objects.

5. The method of claim 4, wherein the at least one pixel prediction method comprises:

using spatial interpolation or extrapolation to predict missing texture data of pixels.

6. The method of claim 1, further comprising:

tracking a position of a user, wherein the identifying the second viewpoint is based on the tracking.

7. The method of claim 1, further comprising:

identifying a third viewpoint; and in response to determining that the third viewpoint is less than a threshold distance from the second viewpoint:

generating modified MFPs by shifting and scaling the MFPs based on the third viewpoint; and generating for display modified image data based on the modified MFPs.

8. The method of claim 1, wherein the arranging comprises:

moving the at least one segmented object based on the second viewpoint, wherein the moving is based on 3D coordinates of the at least one segmented object and a scaling factor to define a position and a size of the at least one segmented object as viewed from the second viewpoint.

9. The method of claim 1, wherein the arranging comprises:

moving the at least one segmented object in a fixed pose.

10. The method of claim 1, wherein the arranging comprises:

moving the at least one segmented object to have a same orientation relative to the second viewpoint as a previous orientation relative to the first viewpoint.

11. A system comprising:

input/output circuitry configured to:

access first image data comprising texture data and depth data from a first viewpoint; and control circuitry configured to:

segment one or more objects of the first image data from the first viewpoint, wherein at least one segmented object of the one or more segmented objects is an occluding object;

generate respective segment texture data and segment depth data for each segmented object of the one or more segmented objects;

identify a second viewpoint;

arrange at least one of the one or more segmented objects into a configuration by:

updating texture data corresponding to the occluding object to move the occluding object to a position based on the second viewpoint relative to a previous position of the occluding object; and identifying at least one hole in the texture data based at least in part on at least one pixel prediction method;

compile, based on the segment depth data for each segmented object in the configuration, updated depth data corresponding to each pixel location in the configuration based on the second viewpoint;

form a synthesized depth map for the updated depth data with the least one hole caused by the moving of the occluding object based at least in part on a closest depth value for each overlapping depth value at each pixel location of the compiled depth data; and form a synthesized texture map based on correspondence between the updated depth data and the updated texture data to enable generating multiple focal planes (MFPs) based on the synthesized texture map and the synthesized depth map to enable generating for display second image data based on the MFPs.

12. The system of claim 11, wherein:

the input/output circuitry is configured to access the first image data by receiving coded data, and the control circuitry is further configured to decode the coded data to the texture data and the depth data.

13. The system of claim 11, wherein the control circuitry is further configured to:

segment the one or more objects of the first image data from the first viewpoint is based on color, depth, or both color and depth.

14. The system of claim 11, wherein the control circuitry is further configured to:

generate a background image by removing at least one object from the first image data with corresponding depth data closer to the first viewpoint than other depth data of the first image data and combining areas of the first image data with corresponding depth data farther away from the first viewpoint, and by using a background prediction method based on collecting areas of still background behind moving objects.

15. The system of claim 14, wherein the at least one pixel prediction method comprises:

using spatial interpolation or extrapolation to predict missing texture data of pixels.

16. The system of claim 11, wherein the control circuitry is further configured to:

track a position of a user, wherein the control circuitry is configured to identify the second viewpoint based on the tracking.

17. The system of claim 11, wherein the control circuitry is further configured to:

identify a third viewpoint; and in response to determining that the third viewpoint is less than a threshold distance from the second viewpoint:

generate modified MFPs by shifting and scaling the MFPs based on the third viewpoint; and generate for display modified image data based on the modified MFPs.

18. The system of claim 11, wherein the control circuitry is configured to arrange the at least one of the one or more segmented objects into the configuration based on the second viewpoint by:

moving the at least one segmented object based on the second viewpoint, wherein the moving is based on 3D coordinates of the at least one segmented object and a scaling factor to define a position and a size of the at least one segmented object as viewed from the second viewpoint.

19. The system of claim 11, wherein the control circuitry is configured to arrange the at least one of the one or more segmented objects into the configuration based on the second viewpoint by:

moving the at least one segmented object in a fixed pose.

20. The system of claim 11, wherein the control circuitry is configured to arrange the at least one of the one or more segmented objects into the configuration based on the second viewpoint by:

moving the at least one segmented object to have a same orientation relative to the second viewpoint as a previous orientation relative to the first viewpoint.

* * * * *